United States Patent
Kim et al.

(10) Patent No.: US 10,803,452 B2
(45) Date of Patent: Oct. 13, 2020

(54) METHOD AND APPARATUS FOR PERFORMING PAYMENT

(71) Applicant: Samsung Electronics Co., Ltd., Suwon-si, Gyeonggi-do (KR)

(72) Inventors: Eun Jik Kim, Suwon-si (KR); Heegyu Jin, Suwon-si (KR); Sridhar Rajiv Kavuri, Yongin-si (KR); Janghyuk Kim, Yongin-si (KR); Cholseo Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/750,413

(22) Filed: Jan. 23, 2020

(65) Prior Publication Data

US 2020/0160325 A1    May 21, 2020

Related U.S. Application Data

(63) Continuation of application No. 15/259,609, filed on Sep. 8, 2016, now Pat. No. 10,546,291.

(Continued)

(30) Foreign Application Priority Data

Nov. 11, 2015    (KR) .................. 10-2015-0158476

(51) Int. Cl.
*G06Q 20/38* (2012.01)
*G06Q 20/10* (2012.01)
*G06Q 20/32* (2012.01)

(52) U.S. Cl.
CPC ........... *G06Q 20/382* (2013.01); *G06Q 20/10* (2013.01); *G06Q 20/3278* (2013.01); *G06Q 2220/00* (2013.01)

(58) Field of Classification Search
None
See application file for complete search history.

(56) References Cited

U.S. PATENT DOCUMENTS

| 8,628,012 B1 | 1/2014 | Wallner |
| 8,814,046 B1 | 8/2014 | Wallner |

(Continued)

FOREIGN PATENT DOCUMENTS

| CN | 102243739 A | 11/2011 |
| CN | 102831734 A | 12/2012 |

(Continued)

OTHER PUBLICATIONS

ARM Limited, "ARM Security Technology Building a Secure System using TrustZone Technology", XP055333570, Apr. 1, 2009.

(Continued)

*Primary Examiner* — Kristy A Haupt
(74) *Attorney, Agent, or Firm* — Jefferson IP Law, LLP

(57) ABSTRACT

An electronic device and a method of payment are provided. The electronic device includes a secure module capable of storing at least one token, a first communication module, a second communication module, and at least one processor functionally or operatively connecting the secure module, the first and second communication modules to each other. The at least one processor is configured to control for determining at least one of the first and second communication modules as a communication module for performing a payment, and transmitting payment information containing a token related to the at least one of the first and second communication modules, from among the at least one token, to an external electronic device.

20 Claims, 51 Drawing Sheets

Related U.S. Application Data

(60) Provisional application No. 62/216,041, filed on Sep. 9, 2015.

(56) References Cited

U.S. PATENT DOCUMENTS

| | | | |
|---|---|---|---|
| 10,546,291 B2* | 1/2020 | Kim | G06Q 20/3278 |
| 2008/0027815 A1 | 1/2008 | Johnson et al. | |
| 2008/0029593 A1 | 2/2008 | Hammad et al. | |
| 2008/0224825 A1 | 9/2008 | Nystrom et al. | |
| 2011/0140841 A1 | 6/2011 | Bona et al. | |
| 2012/0135681 A1 | 5/2012 | Adams et al. | |
| 2013/0041700 A1 | 2/2013 | Fisher | |
| 2013/0262317 A1 | 10/2013 | Collinge et al. | |
| 2013/0346222 A1* | 12/2013 | Ran | G06Q 20/204 705/17 |
| 2014/0246492 A1 | 9/2014 | Hill et al. | |
| 2015/0100788 A1 | 4/2015 | Chastain et al. | |
| 2015/0142665 A1 | 5/2015 | Dicker et al. | |
| 2015/0180836 A1 | 6/2015 | Wong et al. | |
| 2015/0248671 A1 | 9/2015 | Mages et al. | |
| 2016/0042263 A1 | 2/2016 | Gaddam et al. | |
| 2016/0171480 A1 | 6/2016 | O'Regan et al. | |

FOREIGN PATENT DOCUMENTS

| | | |
|---|---|---|
| KR | 10-0944202 B1 | 2/2010 |
| WO | 2010/022129 A1 | 2/2010 |
| WO | 2015-025282 A2 | 2/2015 |

OTHER PUBLICATIONS

European Search Report dated May 29, 2019; European Appln. No. 19170815.5-1222.

Chinese Office Action with English translation dated Apr. 30, 2020; Chinese Appln. No. 201610814064.4.

* cited by examiner

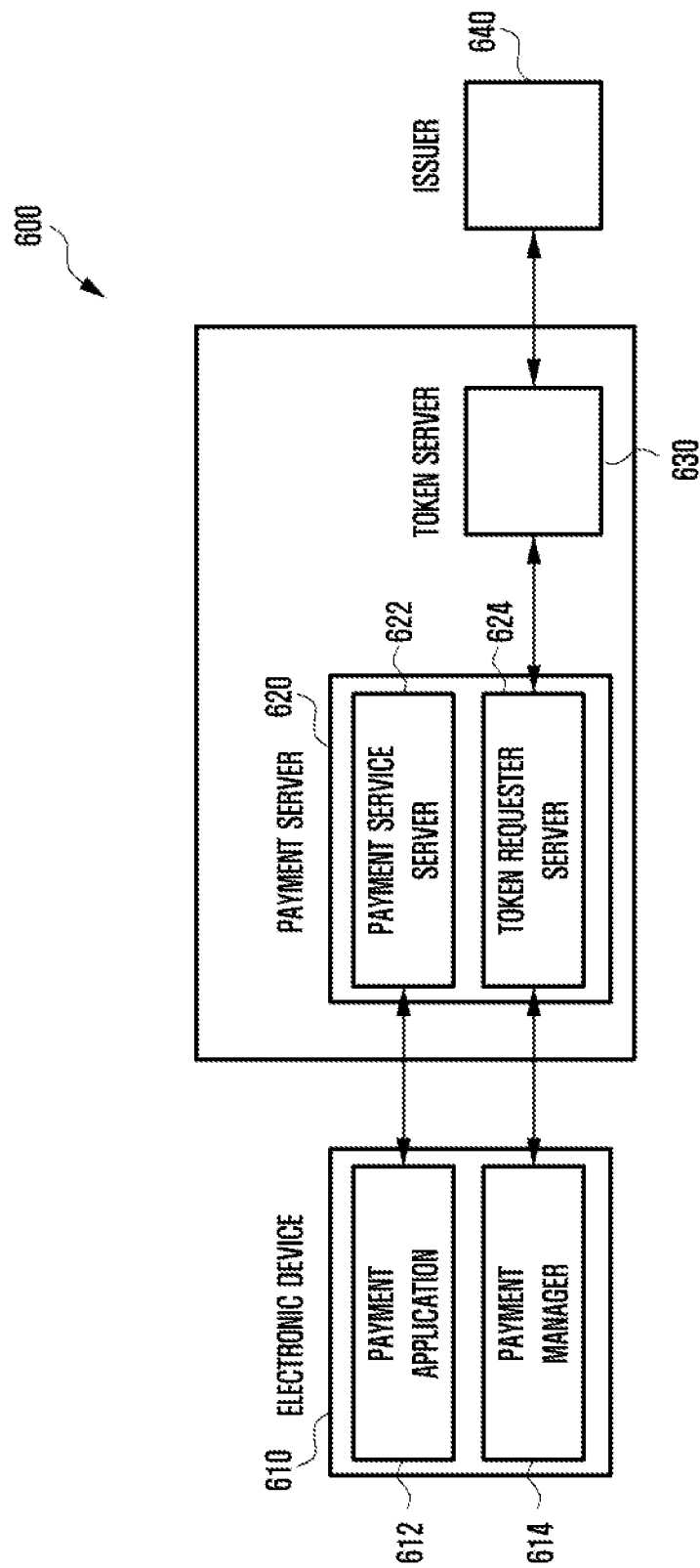

FIG. 38

Track 1: | SS | FC | PAN | FS | NAME | FS | ADDITIONAL DATA | DISCRETIONARY DATA | ES | LRC |

Track 2: | SS | PAN | FS | ADDITIONAL DATA | DISCRETIONARY DATA | ES | LRC |

Track 3: | SS | FC | PAN | FS | USE AND SECURITY DATA | DISCRETIONARY DATA | ES | LRC |

FIG. 39

Track 2

| SS | PAN (19 digits Max) | FS | ADDITIONAL DATA<br>NO. of characters<br>Expiration date (YYMM) 4<br>Service Code 3 | DISCRETIONARY DATA<br>• PVKI 1<br>• PVV or Oset 4<br>• CVV or •CVC 3<br>Some or all of the above<br>elds may be found with<br>the discretionary data<br>Card Data Format – Track 3<br>(ISO 4909)<br>104 NUMERIC DATA CHARACTERS<br>SS | ES | LRC |
|---|---|---|---|---|---|---|
| ; | 1234123412341234 | = | 1905201 | 000001190000 | ? | LRC |

METHOD AND APPARATUS FOR PERFORMING PAYMENT

CROSS-REFERENCE TO RELATED APPLICATION(S)

This application is a continuation application of prior application Ser. No. 15/259,609, filed on Sep. 8, 2016, which claimed the benefit under 35 U.S.C. § 119(e) of a U.S. Provisional application filed on Sep. 9, 2015 in the U.S. Patent and Trademark Office and assigned Ser. No. 62/216, 041, and under 35 U.S.C. § 119(a) of a Korean patent application filed on Nov. 11, 2015 in the Korean Intellectual Property Office and assigned Serial number 10-2015-0158476, the entire disclosure of each of which is hereby incorporated by reference.

TECHNICAL FIELD

The present disclosure relates to electronic devices. More particularly, the present disclosure relates to electronic devices with a controller that is capable of performing a payment, and a method and apparatus for an electronic commerce payment system.

BACKGROUND

With the development of mobile communication technology, electronic devices have been developed to perform various types of data communication functions as well as voice call functions. Electronic devices, e.g., mobile devices or user equipment, are capable of providing various types of services via various applications. Electronic devices are capable of providing network-based communication services, multimedia services, a music service, a moving image service, a digital broadcasting service, a call service, a wireless Internet, short message service (SMS), multimedia messaging service (MMS), etc. Electronic devices have evolved to perform various functions, such as payment, Internet, distribution, etc., from communication via simple communication media, so that they can be widely used in various fields of industry, such as, social life, culture, finance, distribution industry, etc. For example, electronic devices are equipped with a mobile payment function. That is, electronic devices using a mobile payment method are replacing traditional payment methods such as a cash payment method or a plastic card payment method. For example, electronic devices provide a payment function that allows users to purchase services or products using a mobile payment service as if the users purchase services or products on-line or off-line at a store or a restaurant and make a payment. Electronic devices have also been equipped with a communication function for performing the transmission or reception of payment information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of transmitting verification information via at least one communication module, in order to provide a mobile payment service, and an electronic device adapted to the method.

Another aspect of the present disclosure is to provide a method of creating and transmitting payment information with a relatively high security level, using time information, in order to provide a mobile payment service, and an electronic device adapted to the method.

In accordance with an aspect of the present disclosure, an electronic device is provided. The electronic device includes a secure module capable of storing at least one token, a first communication module, a second communication module, and at least one processor functionally or operatively connecting the secure module, the first and second communication modules to each other. The at least one processor is configured to control for determining at least one of the first and second communication modules as a communication module for performing a payment, and transmitting payment information containing a token related to the at least one of the first and second communication modules, from among the at least one token, to an external electronic device.

In accordance with another aspect of the present disclosure, a method for an electronic device to secure payment information is provided. The electronic device includes a first secure world, a second secure world and at least one payment signal module. The method includes storing, in the first secure world, at least one token which corresponds to at least one payment signal module respectively, creating a timestamp in at least one of the first and second secure worlds, creating a payment signal in the second secure world, based on at least one of the time stamp and the at least one token corresponding to the at least one payment signal module, from among the at least one token, and transmitting the payment signal to an external electronic device.

In accordance with another aspect of the present disclosure, a non-transitory computer-readable recording medium is provided. The non-transitory computer-readable recording medium stores a software program that, when executed, causes at least one processor in an electronic device that includes a secure world and at least one payment signal module, to perform a method, the method including storing, in the secure world, at least one token corresponding to at least one payment signal module respectively, creating a timestamp in the secure world, creating a payment signal in the secure world, based on at least part of the time stamp and the at least one token corresponding to the at least one payment signal module, from among the at least one token, and transmitting the payment signal to an external electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a diagram showing a payment system according to various embodiments of the present disclosure;

FIGS. 37 to 39 show an example of the structure of a payment means (e.g., a card) according to various embodiments of the present disclosure;

Throughout the drawings, it should be noted that like reference numbers are used to depict the same or similar elements, features, and structures.

DETAILED DESCRIPTION

Figure 1:
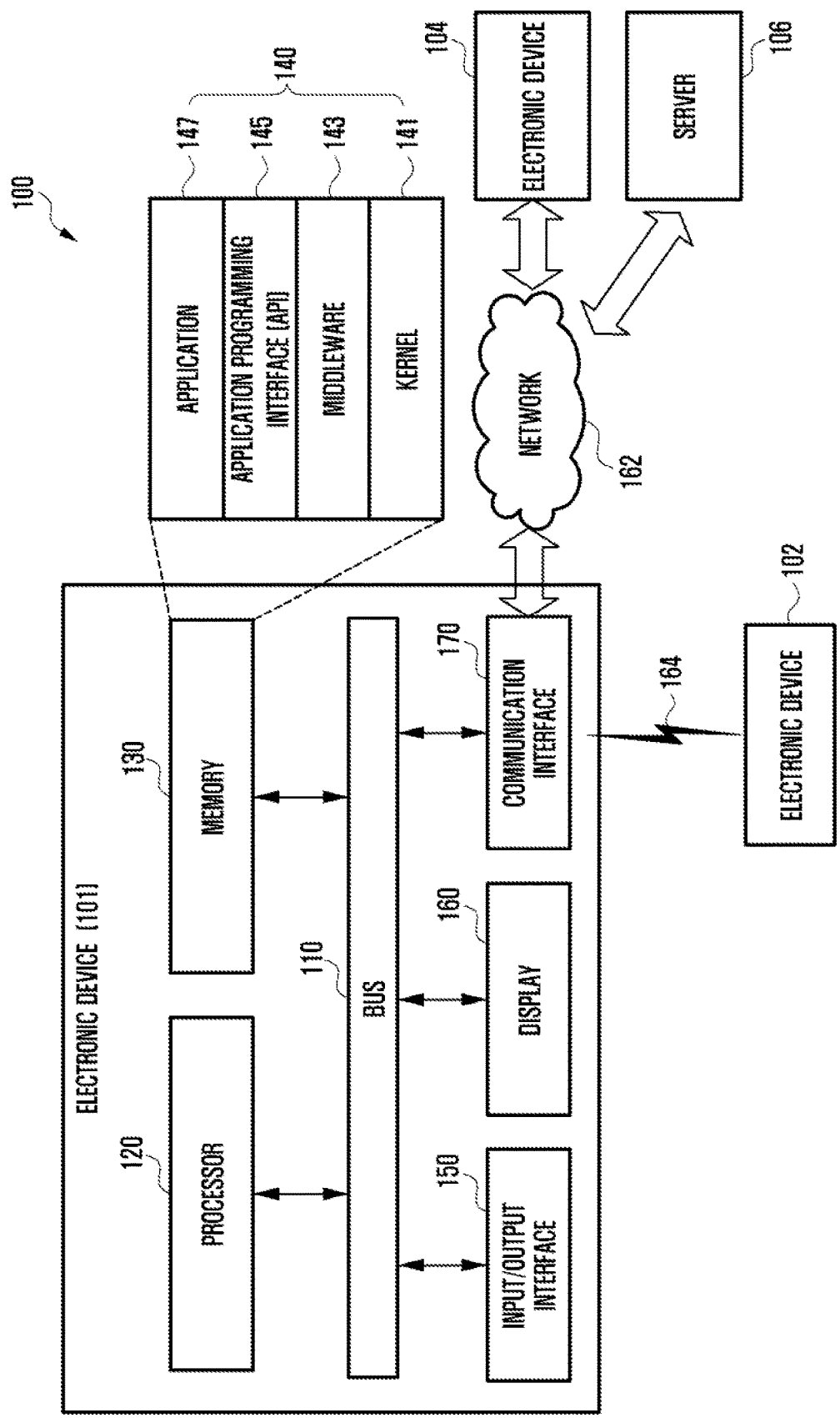
FIG. 1 is a block diagram showing a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the description, the expressions such as "to have," "to be capable of having," "may have," "to include," and "to be capable of including", "may include" are used to represent the presence of the features (e.g., numerical values, functions, operations, elements, etc.) and do not exclude the existence of the additional features.

In the present disclosure, the expression "and/or" includes any and all combinations of the associated listed words. For example, the expression "A or B," "at least one of A and B," "at least one of A or B" may refer to all the following cases: (1) at least one A; (2) at least one B; and (3) at least one A and at least one B.

In the present disclosure, the expressions including ordinal numbers, such as "first" and "second," etc., may modify various elements, without limiting the sequence and/or importance of the components. The above expressions are used merely for the purpose of distinguishing an element from the other elements, without limiting the elements. For example, a first electronic device and a second electronic device indicate different electronic devices, regardless of the sequence or importance. For example, a first element could be termed a second element, and similarly, a second element could be also termed a first element without departing from the scope of the present disclosure.

When a component (e.g., a first component) is referred to as being "operatively or communicatively coupled with/to" or "connected to" any other component (e.g., a second component), it should be understood that the component (first component) may be connected/coupled to the other component (second component) directly or via another component (e.g., a third component). In contrast, when a component (e.g., a first component) is referred to as being "directly coupled with/to" or "directly connected to" any other component (e.g., a second component), it should be understood that there is no component (e.g., a third component) between the component (the first component) and other components (a third component).

In the present disclosure, the expression "configured (set or implemented) to do" may be interchangeable with, for example, "suitable for doing," "having the capacity to do," "designed to do" "adapted to do," "made to do," or "capable of doing." The expression "configured (set or implemented) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., central processing unit (CPU) or application processor (AP)) that may execute one or more software programs stored in a memory device to perform corresponding functions.

The terms used in the present disclosure are only used to describe a specific embodiment and may not be intended to limit the scope of other embodiments. Singular forms are intended to include plural forms unless the context clearly indicates otherwise. Unless otherwise defined, all terms including technical and/or scientific terms used herein have the same meaning as commonly understood by one of ordinary skill in the art to which the present disclosure pertains. The terms as those defined in a generally used dictionary are to be interpreted to have meanings equal to the contextual meanings in the relevant field of art, and are not to be interpreted to have ideal or excessively formal meanings unless clearly defined in the present disclosure. Although some terms are defined in the present disclosure, it should be understood that the terms are not interpreted to exclude the embodiments.

An electronic device according to various embodiments of the present disclosure may include one or more of the following: a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an 1\fP3 player, a mobile medical device, a camera, a wearable device, etc. In various embodiments of the present disclosure, the wearable device may include one or more of the following: an accessory type, e.g., watch, ring, bracelet, anklet, necklace, eyeglasses, contact lens, and head-mounted-device (HMD); a clothes or clothing integral type, e.g., electronic clothing; a body attachment type, e.g., skin pad or tattoo; a bio chip implant type, e.g., an implantable circuit; etc.

An electronic device according to an embodiment may be home appliances. Home appliances may include at least one of a television, a digital versatile disc (DVD) player, an audio system, a refrigerator, an air-conditioner, a cleaning device, an oven, a microwave oven, a washing machine, an air cleaner, a set-top box, a home automation control panel, a secure control panel, a TV box (e.g., Samsung HomeSync®, Apple TV®, or Google TV®), a game console (e.g., Xbox®, PlayStation®), an electronic dictionary, an electronic key, a camcorder, an electronic album, etc.

An electronic device according to an embodiment may include at least one of various medical devices (e.g., various portable medical applications (e.g., a blood glucose monitor, a heart rate monitor, a blood pressure monitor, a temperature monitor, etc.), magnetic resonance angiography (MRA), magnetic resonance imaging (MRI), computed tomography (CT), a scanning machine, an ultrasonic wave device, etc.), a navigation device, a global navigation satellite system (GNSS), an event data recorder (EDR), a flight data recorder (FDR), a vehicle infotainment device, electronic equipment for ships (e.g., navigation equipment for ships, gyrocompass, etc.), avionics, a secure device, a head unit for vehicle, an industrial or home robot, an automatic teller's machine (ATM), a point of sales (POS) system, Internet of Things (IoT) (e.g., lights, various sensors, an electric meter, a gas meter, a sprinkler system, street lights, a toaster, fitness equipment, a hot water tank, a heater, a boiler, etc.), and so on.

An electronic device according to embodiments may include one or more of furniture or a portion of a building/structure, an electronic board, an electronic signature receiving device, a projector, various measuring instruments (e.g., a water meter, an electric meter, a gas meter and a wave meter), etc. In various embodiments of the present disclosure, an electronic device may also include a combination of the components listed above. An electronic device according to an embodiment may be a flexible electronic device. It is obvious to those skilled in the art that the electronic device according to various embodiments of the present disclosure is not limited to the aforementioned devices and may also include new devices as technology is developed.

Hereinafter, electronic devices according various embodiments are described in detail with reference to the accompanying drawings. In the description, the term a 'user' is referred to as a person who uses an electronic device or a device (e.g., an artificial intelligent electronic device) that uses an electronic device.

FIG. 1 is a block diagram 100 showing a network environment according to various embodiments of the present disclosure.

Referring to FIG. 1, the electronic device 101, 102 or 104 and the server 106 are connected to each other via a network 162 or a short-range communication 164. The electronic device 101 is capable of including a bus 110, a processor 120, a memory 130, an input/output interface 150, a display 160, and a communication interface 170. In an embodiment of the present disclosure, the electronic device 101 may be implemented in such a way as to remove at least one of the above described components therefrom or to further include another component therein.

The bus 110 may be a circuit for connecting the above described components 110 to 170 to each other and transmitting communications (e.g., control messages and/or data) between the above described components.

The processor 120 is capable of including one or more of a central processing unit (CPU), an application processor (AP), and a communication processor (CP). The processor 120 is capable of controlling at least one of the other components of the electronic device 101 and/or processing data or operations related to communication.

The memory 130 is capable of including volatile memory and/or non-volatile memory. The memory 130 is capable of storing data or commands related to at least one of the other components of the electronic device 101. According to an embodiment, the memory 130 is capable of storing software and/or a program module 140. For example, the program module 140 is capable of including a kernel 141, middleware 143, application programming interface (API) 145, application programs (or applications) 147, etc. The kernel 141, middleware 143 or at least part of the API 145 may be called an operating system (OS).

The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access the individual components of the electronic device 11 and to control/manage the system resources.

The middleware 143 is capable of mediating between the API 145 or application programs 147 and the kernel 141 so that the API 145 or the application programs 147 can communicate with the kernel 141 and exchange data therewith.

The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests.

The API 145 refers to an interface configured to allow the application programs 147 to control functions provided by the kernel 141 or the middleware 143. For example, the API 145 is capable of including at least one interface or function (e.g., instructions) for file control, window control, image process, text control, or the like.

The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display module 160 is capable of including a liquid crystal display (LCD), a light emitting diode (LED) display, an organic light emitting diode (OLED) display, a plastic OLED (POLED) display, micro-electro-mechanical systems (MEMS) display, an electronic paper display, etc. The display module 160 is capable of displaying various types of content (e.g., texts, images, videos, icons, symbols, etc.). The display module 160 may also be implemented with a touch screen. In this case, the display module 160 is capable of receiving touches, gestures, proximity inputs or hovering inputs, via a stylus pen, or a user's body.

The communication interface 170 is capable of establishing a communication channel between the electronic device 101 and an external device (e.g., a first external device 102, a second electronic device 104, or a server 106). For example, the communication interface 170 is capable of communicating with an external device (e.g., a second external device 104 or a server 106) connected to the network 162 via wired or wireless communication.

Wireless communication may employ, as cellular communication protocol, at least one of long-term evolution (LTE), LTE advance (LTE-A), code division multiple access (CDMA), wideband CDMA (WCDMA), universal mobile telecommunications system (UMTS), wireless broadband (Wi-Bro), and Global System for Mobile Communication (GSM). Wireless communication may also include a short-range communication 164. The short-range communication 164 may include at least one of wireless fidelity (Wi-Fi), Bluetooth (BT), near field communication (NFC), magnetic secure transmission (MST), and Global Navigation Satellite System (GNSS).

MST is capable of creating pulses corresponding to transmission data, using electromagnetic signals, and converting the pluses into magnetic field signals. The electronic device 101 transmits the magnetic field signals to a point of sales (POS) terminal. The POS terminal detects the magnetic field signals via the MST reader and converts the detected magnetic field signals into electrical signals, thereby restoring the data.

The GNSS may include at least one of global positioning system (GPS), global navigation satellite system (Glonass), Beidou navigation satellite system (hereinafter called 'Beidou'), Galileo, the European global satellite-based navigation system, according to GNSS using areas, bandwidths, etc. In the present disclosure, "GPS" and "GNSS" may be used interchangeably. Wired communication may include at least one of universal serial bus (USB), high definition multimedia interface (HDMI), recommended standard 232 (RS-232), and plain old telephone service (POTS). The network 162 may include at least one of a telecommunications network, e.g., a computer network (e.g., LAN or WAN), the Internet, and a telephone network.

Referring to FIG. 1, it should be understood that the first and second external electronic devices 102 and 104 may be identical or different in type to or from the electronic device 101. In an embodiment of the present disclosure, the server 106 may include one or more groups of servers. According to various embodiments of the present disclosure, part or all of the operations executed on the electronic device 101 may also be executed on one or more electronic devices (e.g., electronic devices 102 and 104 or a server 106). According to an embodiment, when the electronic device 101 needs to provide a function or service in an automatic manner or according to a request, it may not perform the function or service, but instead request other devices (e.g., electronic devices 102 and 104 or a server 106) to execute at least part of the functions related to the function or service. In this case, the other devices (e.g., electronic devices 102 and 104 or a server 106) execute the requested function or additional function and may transmit the results to the electronic device 101. The electronic device 101 may process the received result or may further process the received result with additional processes and may provide the processed, request function or service. To this end, the devices may employ cloud computing, distribution computing or client-server computing technology.

Figure 2:
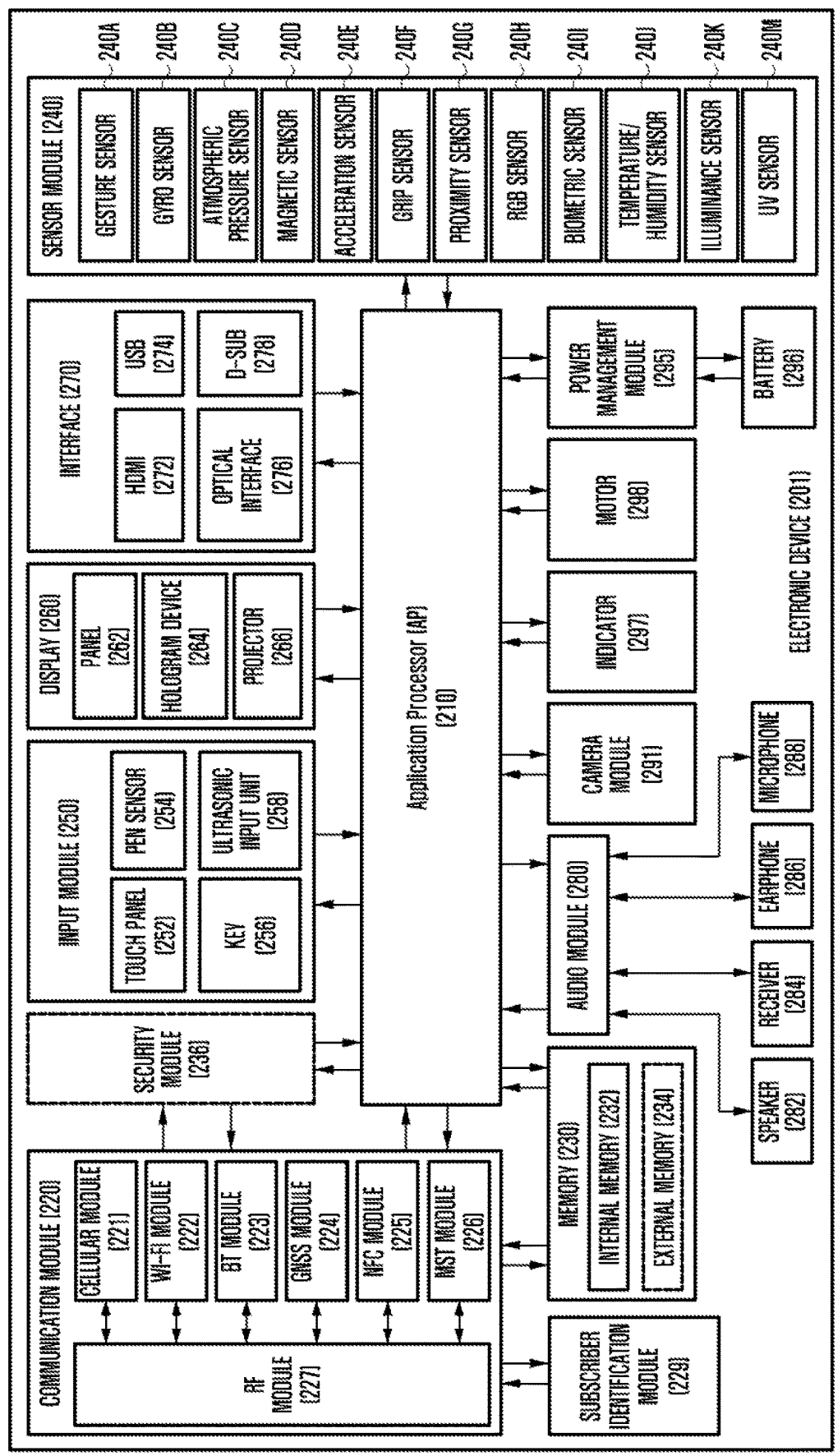
FIG. 2 is a block diagram showing an electronic device according to various embodiments of the present disclosure.

FIG. 2 is a block diagram 200 showing an electronic device 201 according to various embodiments of the present disclosure. The electronic device 201, for example, may include all or part of the electronic device 101 shown in FIG. 1.

Referring to FIG. 2, the electronic device 201 is capable of including one or more of a processor 210 (e.g., application processor (AP)), a communication module 220, a subscriber identity module (SIM) module 229, a memory 230, a sensor module 240, an input unit 250, a display 260, an interface 270, an audio module 280, a camera module 291, a power management module 295, a battery 296, an indicator 297, and a motor 298.

The processor 210 may run an operating system or an application program to control a number of hardware or software components connected, and may perform data processing and operations. The processor 210 may be implemented as a system on chip (SoC). According to an embodiment, the processor 210 may further include a graphic processing unit (GPU) and/or an image signal processor. The processor 210 may include at least part of the components shown in FIG. 2 (e.g., a cellular module 221). The processor 210 may load a command or data received from at least one of the other components (e.g., a non-volatile memory) on a volatile memory, and process the loaded command or data. The processor 210 may store data on a volatile memory.

The communication module 220 may be identical or different in configuration to or from the communication interface 170 shown in FIG. 1. For example, the communication module 220 is capable of including a cellular module 221, a Wi-Fi module 222, a Bluetooth (BT) module 223, a GNSS module 224 (e.g., a GPS module, Glonass module, Beidou module or Galileo module), an NFC module 225, an MST module 226, and a radio frequency (RF) module 227.

The cellular module 221 is capable of providing a voice call, a video call, a messaging service, an Internet service, etc., through a communication network. According to an embodiment, the cellular module 221 is capable of identifying and authenticating an electronic device 201 in a communication network by using a subscriber identification module (SIM) 229 (e.g., a SIM card). According to an embodiment, the cellular module 221 is capable of performing at least part of the functions provided by the processor 210. According to an embodiment, the cellular module 221 is also capable of including a communication processor (CP).

Each of the Wi-Fi module 222, the BT module 223, the GNSS module 224, the NFC module 225 and the MST module 226 is capable of including a processor for processing data transmitted or received through the corresponding module. The MST module 128 is capable of including a processor for processing data transmitted or received through the corresponding module. According to embodiments, at least part (e.g., two or more modules) of the cellular module 221, Wi-Fi module 222, BT module 223, GNSS module 224, NFC module 225, and MST module 226 may be included in one integrated chip (IC) or one IC package.

The RF module 227 is capable of performing the transmission/reception of communication signals, e.g., RF signals. The RF module 227 is capable of including a transceiver, a power amp module (PAM), a frequency filter, a low noise amplifier (LNA), an antenna, etc. According to another embodiment, at least one of the following modules: cellular module 221, Wi-Fi module 222, BT module 223, GNSS module 224, NFC module 225, and MST module 226 is capable of performing the transmission/reception of RF signals through a separate RF module.

The SIM module 229 is capable of including a card including a SIM and/or an embodied SIM. The SIM module 229 is also capable of containing unique identification information, e.g., integrated circuit card identifier (ICCID), or subscriber information, e.g., international mobile subscriber identity (IMSI).

The memory 230 (e.g., memory 130 shown in FIG. 1) is capable of including a built-in memory 232 or an external memory 234. The built-in memory 232 is capable of including at least one of a volatile memory, e.g., a dynamic RAM (DRAM), a static RAM (SRAM), a synchronous dynamic RAM (SDRAM), etc., and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.), a hard drive, a solid state drive (SSD), etc.

The external memory 234 is capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally, operatively and/or physically, through various interfaces.

A secure module 236 refers to a module that includes a storage space which needs a relatively higher level of security than the memory 230. The secure module 236 may be a circuit that is capable of storing data safely and guaranteeing a protected execution environment. For example, the electronic device is capable of encrypting data which needs a relatively higher level of security (e.g., biometric information, personal information, card information, etc.) and storing a key used for the encryption in the secure module 236. The secure module 236 may be implemented as a separate circuit, including a separate processor. The secure module 236 may be contained in a detachable smart chip or a secure digital (SD) card. Alternatively, the secure module 236 may be implemented in such a way that the electronic device 201 includes an embedded secure element (eSE) in the fixed chip. The secure module 236 may be operated by an operating system (OS) that differs from that of the electronic device 201. For example, the secure module 236 may run based on the Java card open platform (JCOP).

The sensor module 240 is capable of measuring/detecting a physical quantity or an operation state of the electronic device 201, and converting the measured or detected information into an electronic signal. The sensor module 240 is capable of including at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 is capable of including the following sensors (not shown): an electronic nose (E-nose) sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the additional processor is capable of controlling the sensor module 240.

The input unit 250 is capable of including a touch panel 252, a digital stylus or (digital) pen sensor 254, a key 256, or an ultrasonic input module 258. The touch panel 252 may be implemented with at least one of a capacitive touch system, a resistive touch system, an infrared touch system, and an ultrasonic touch system. The touch panel 252 may further include a control circuit. The touch panel 252 may also further include a tactile layer to provide a tactile response to the user.

The (digital) pen sensor 254 may be implemented with a part of the touch panel or with a separate recognition sheet. The key 256 may include a physical button, an optical key, or a keypad. The ultrasonic input module 258 is capable of detecting ultrasonic waves, generated in an input tool, through a microphone 288, and identifying data corresponding to the detected ultrasonic waves.

The display 260 (e.g., the display 160 shown in FIG. 1) is capable of including a panel 262, a hologram module 264, or a projector 266. The panel 262 may include the same or similar configurations as the display 160 shown in FIG. 1. The panel 262 may be implemented to be flexible, transparent, or wearable. The panel 262 may also be incorporated into one module together with the touch panel 252. The hologram module 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram module 264, or the projector 266.

The interface 270 is capable of including a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multi-media card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, a microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing the power of the electronic device 201. According to an embodiment, the power management module 295 is capable of including a power management integrated circuit (PMIC), a charger integrated circuit (IC), or a battery or fuel gauge. The PMIC may employ wired charging and/or wireless charging systems. Examples of the wireless charging system are magnetic resonance charging, magnetic induction charging, and electromagnetic charging. To this end, the PIMC may further include additional circuit components for wireless charging, such as a coil loop, a resonance circuit, a rectifier, etc. The battery gauge is capable of measuring the residual capacity, voltage, current, or temperature of the battery 296, during the charging. The battery 296 may include a rechargeable battery or a solar battery.

The indicator 297 is capable of displaying a specific status of the electronic device 201 or a part of the electronic device 201 (e.g., the processor 210), e.g., a boot-up status, a message status, a charging status, etc. The motor 298 is capable of converting an electrical signal into mechanical vibrations, such as, a vibration effect, a haptic effect, etc. Although it is not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo', etc.

Each of the elements described in the present disclosure may be formed with one or more components, and the names of the corresponding elements may vary according to the type of the electronic device. In various embodiments of the present disclosure, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 3:
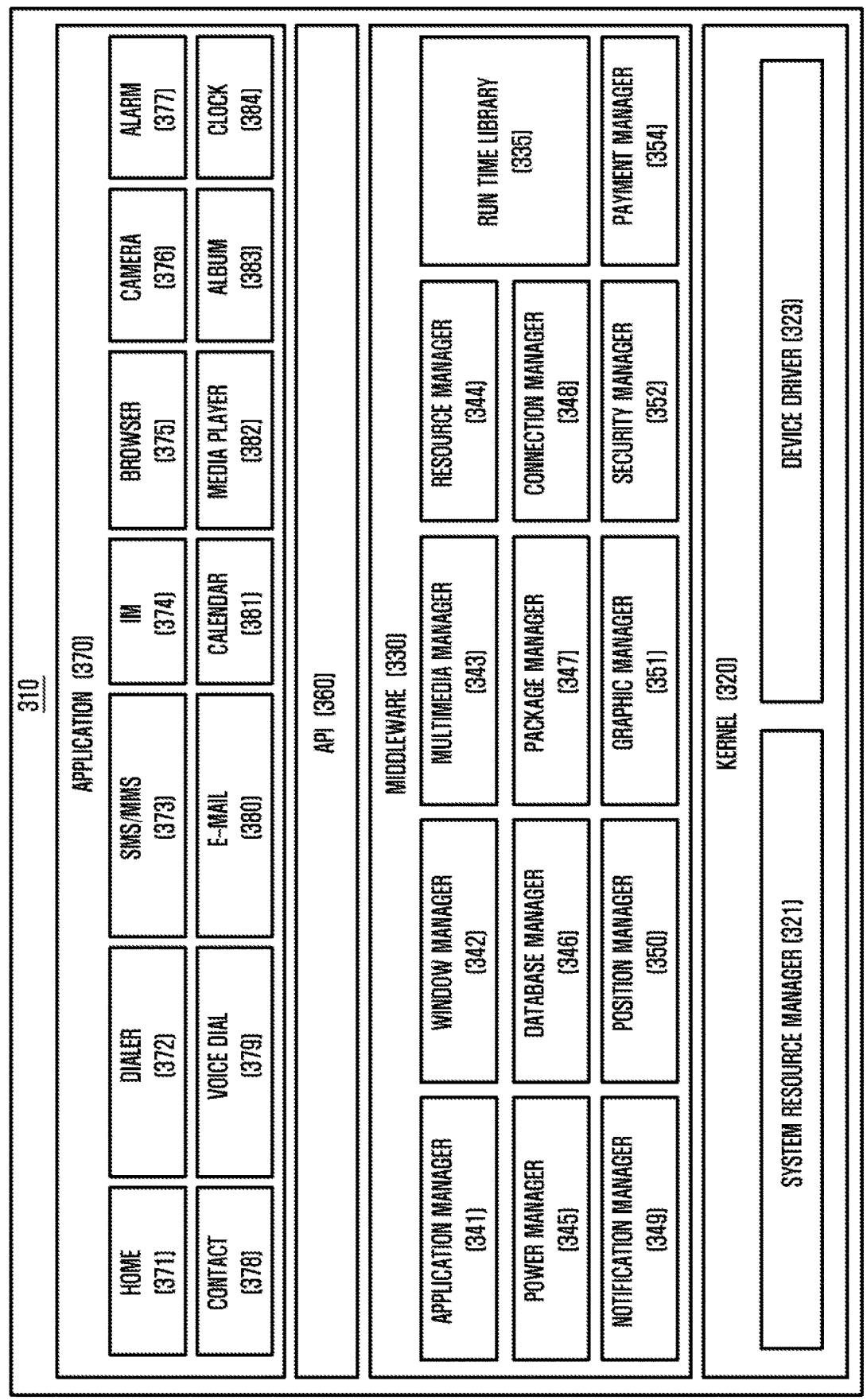
FIG. 3 is a block diagram showing a program module according to various embodiments of the present disclosure.

FIG. 3 is a block diagram 300 showing a program module 310 according to various embodiments of the present disclosure.

Referring to FIG. 3, the program module 310 (e.g., program module 140 shown in FIG. 1) is capable of including an OS for controlling resources related to the electronic device (e.g., electronic device 101 shown in FIG. 1) and/or various applications (e.g., application program 147 shown in FIG. 1) running on the OS. The OS may be, for example, Android®, iOS®, Windows®, Symbian®, Tizen®, Bada®, etc.

The program module 310 is capable of including a kernel 320, middleware 330, application programming interface (API) 360 and/or application 370. At least part of the program module 310 may be preloaded on the electronic device or downloaded from an external electronic device (e.g., electronic devices 102 and 104, a server 106 shown in FIG. 1).

The kernel 320 (e.g., kernel 141 shown in FIG. 1) is capable of including, e.g., a system resource manager 321 and/or a device driver 323. The system resource manager 321 is capable of performing the control, allocation/assignment, reclamation, etc. on system resources. According to an embodiment, the system resource manager 321 is capable of including a processor manager, a memory manager, a file system manager, etc. The device driver 323 is capable of including various drivers for, e.g., displays, cameras, Bluetooth, shared memory, USB, keypads, Wi-Fi, audio systems, inter-process communication (IPC), etc.

Referring to FIG. 3, the middleware 330 is capable of providing functions commonly required for the application 370, or providing various functions to the application 370 via the API 360 so that the application 370 can efficiently use limited system resources in the electronic device. According to an embodiment, the middleware 330 (e.g., middleware 143 shown in FIG. 1) may include at least one of a run time library 335, an application manager 341, a window manager 342, a multimedia manager 343, a resource manager 344, a power manager 345, a database manager 346, a package manager 347, a connectivity manager 348, a notification manager 349, a location or position manager 350, a graphic manager 351, a secure manager 352, and a payment manager 354.

The run time library 335 is capable of including, for example, a library module that a compiler uses to add a new function via a programming language while the application 30 is running. The run time library 335 is capable of performing input/output management, memory management, operations for arithmetic functions, etc.

The application manager 341 is capable of managing the life cycle of at least one of the applications in the application 370. The window manager 342 is capable of managing GUI resources used for the screen. The multimedia manager 343 is capable of detecting a format to play back various media files and encoding or decoding a media file by using a codec corresponding to the format. The resource manager 344 is capable of managing resources such as memory or storage space, a source code of at least one of the applications in the application 370, etc.

The power manager 345 is capable of managing the battery or the electric power source, based on the cooperation with the basic input/output system (BIOS), etc., and providing electric power information required for the operations of the electronic device, etc. The database manager 346 is capable of creating, searching for or altering a database to be used by at least one of the applications in the application 370. The package manager 347 is capable of managing the installation or update of applications distributed in the form of package file.

The connectivity manager 348 is capable of managing the wireless connectivity, such as Wi-Fi, Bluetooth, etc. The notification manager 349 is capable of displaying or notifying the user of events such as a received message, a schedule, a proximity notification, etc., in a mode without disturbing the user. The location manager 350 is capable of managing the location information regarding the electronic device. The graphic manager 351 is capable of managing a graphic effect to be provided to the user or a user interface related to the graphic effect. The secure manager 352 is capable of providing various secure functions required for system security, the user authentication, etc. According to an embodiment, when the electronic device (e.g., electronic device 101 shown in FIG. 1) includes a phone function, the middleware 330 may further include a telephony manager for managing a voice or video call function in the electronic device. The payment manager 354 is capable of relaying payment information from the application 370 to a kernel 320 or the application 370. The payment manger 354 is capable of storing payment-related information received from an external device in the electronic device 200 or transferring the stored information to an external device.

The middleware 330 is capable of creating middleware modules forming a combination of various functions of the modules listed above. The middleware 330 is capable of providing modules specialized according to types of operating systems in order to provide distinctive functions. The middleware 330 may be implemented in such a way as to dynamically remove part of the existing components or include new components.

The API 360 (e.g., API 145 shown in FIG. 1) is a set of API programming functions and may be provided in different configurations according to types of operating systems. For example, when the operating system is Android® or iOS®, the API 360 may be configured to provide each platform with one API set; and when the operating system is Tizen®, the API 360 may be configured to provide each platform with two or more API sets.

The application 370 (e.g., application program 147 shown in FIG. 1) is capable of including one or more applications for providing functions, for example, home 371, dialer 372, SMS/MMS 373, instant message (IM) 374, browser 375, camera 376, alarm 377, contact 378, voice dialer or voice dial 379, e-mail 380, calendar 381, media player 382, album 383, clock 384, payment 385, and additional applications (not shown), such as health care (e.g., measurement of the amount of exercise, blood sugar, etc.), environment information (e.g., atmospheric pressure, humidity, temperature, etc.), and so on.

According to an embodiment, the application 370 may include an application (called an 'information exchange application) for supporting information exchange between the electronic device (e.g., electronic device 101 shown in FIG. 1) and external electronic devices (e.g., electronic devices 102 and 104 shown in FIG. 1). The information exchange application may include a notification relay application for relaying specific information to the external electronic devices or a device management application for managing the external electronic devices.

For example, the notification relay application may include a function to relay notification information, generated by any other application of the electronic device (e.g., the SMS/MMS application, the email application, the health care application, the environment information application, etc.), to external electronic devices (e.g., electronic devices 102 and 104). The notification relay application may also receive notification information from an external electronic device and provide the received information to the user.

The device management application may manage (e.g., install, remove or update): at least one of the functions of an external electronic device (e.g., electronic device 102 or 104) communicating with the electronic device (e.g., a function of turning-on/turning-off the external electronic device (or part of the components) or a function of adjusting the brightness (or resolution) of the display); an application running on the external electronic device; or a service (e.g., a call service or a message service) offered by the external electronic device.

According to an embodiment, the application 370 may include an application (e.g., a health care application for a mobile medical device) specified according to attributes of an external electronic device (e.g., electronic devices 102 and 104). According to an embodiment, the application 370 may include applications received from external electronic devices (e.g., a server 106 or electronic devices 102 and 104). According to an embodiment, the application 370 may include a preloaded application or a third party application downloaded from a server. It should be understood that the names of components in the program module 310 of the embodiments may vary according to types of operating systems.

According to various embodiments of the present disclosure, at least part of the program module 310 may be implemented with software, firmware, hardware, or any combination thereof. In addition, at least part of the program module 310 may be implemented (executed) with a processor (e.g., a processor 210 shown in FIG. 2). At least part of the program module 310 may include modules, programs, routines, sets of instructions or processes, etc., in order to perform one or more functions.

In the present disclosure, the terminology 'module' refers to a 'unit' including hardware, software, firmware or a combination thereof. For example, the terminology 'module' is interchangeable with 'unit,' logic, 'logical block,' 'component,' 'circuit,' or the like. A 'module' may be the smallest unit or a part of an integrated component. A 'module' may be the smallest unit or a part thereof that can perform one or more functions. A 'module' may be implemented in mechanical or electronic mode. For example, a 'module' may include at least one of an application specific integrated circuit (ASIC) chip, field-programmable gate array (FPGAs) and a programmable-logic device that can perform functions that are known or will be developed.

At least part of the method (e.g., operations) or devices (e.g., modules or functions) according to various embodiments may be implemented with instructions which can be stored, as a form of program module, in computer-readable storage media. One or more processors (e.g., processor 210) can execute the instructions, thereby performing the functions. An example of the computer-readable storage media may be memory 130.

Examples of the computer-readable storage media include: magnetic media, such as hard disks, floppy disks, magnetic tape, etc.; optical media such as compact disc read only memory (CD-ROM), DVD, etc.; magneto-optical media, such as floptical disks; and hardware devices such as read-only memory (ROM), random access memory (RAM), flash memory, etc. Examples of program instructions include machine code instructions generated by assembly languages, such as a compiler, and code instructions generated by a high-level programming language executable in computers using an interpreter, etc. The described hardware devices may be configured to act as one or more software modules to perform the operations of various embodiments described above, or vice versa.

Modules or program modules according to various embodiments may include one or more components, remove part of them described above, or further include new components. The operations performed by modules, program modules, or other components, according to various embodiments of the present disclosure, may be executed in serial, parallel, repetitive or heuristic fashion. Part of the operations can be executed in any other order, skipped, or executed with additional operations. The embodiments of the present disclosure are merely provided to assist in a comprehensive understanding of the present disclosure and not suggestive of limitation. Therefore, it should be understood that many variations and modifications of the basic inventive concept herein described will still fall within the spirit and scope of the embodiments of the present disclosure.

Figure 4:
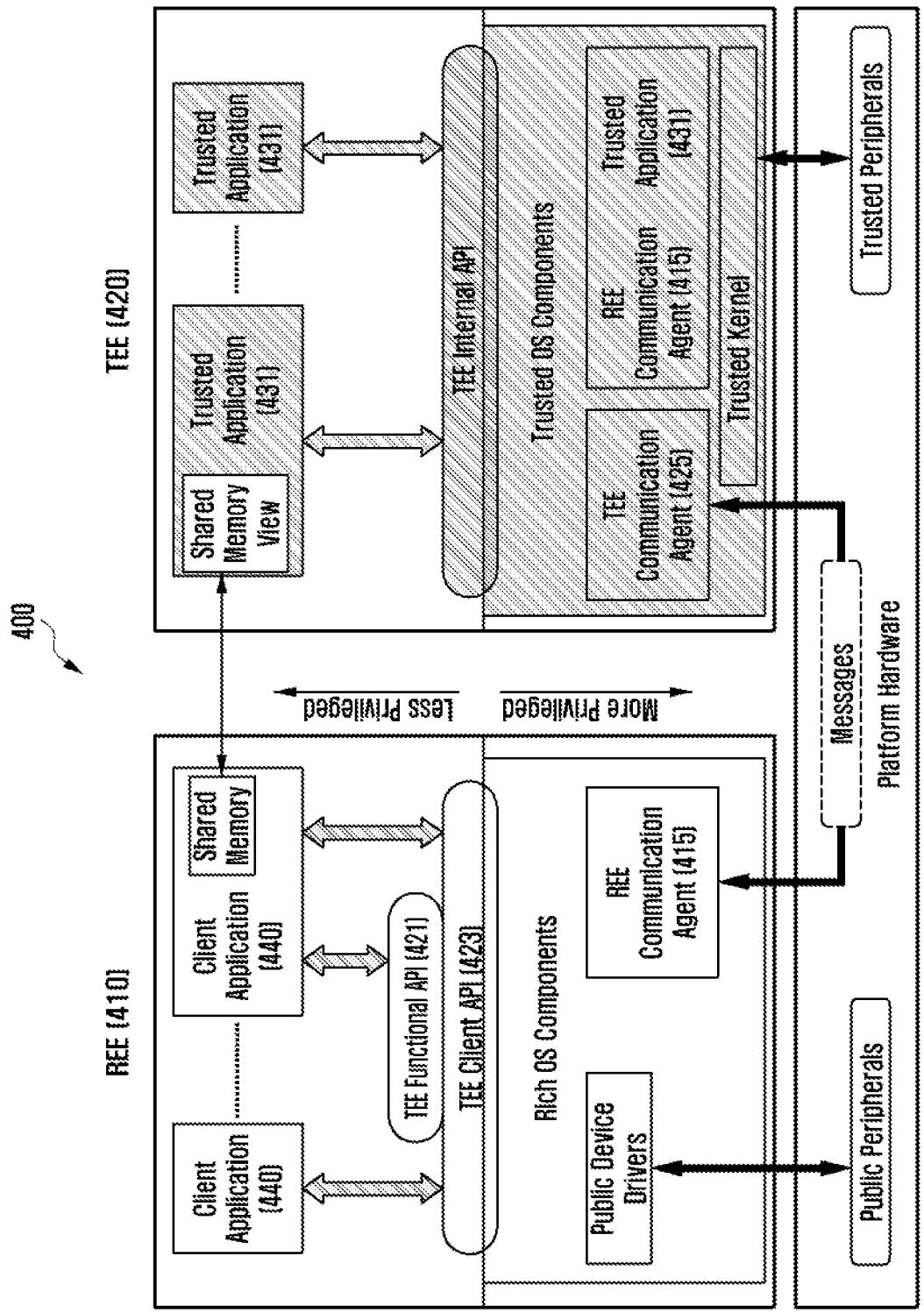
FIG. 4 is a block diagram showing a number of execution environments operated in an electronic device according to various embodiments of the present disclosure.

FIG. 4 is a block diagram 400 showing a rich execution environment (REE) 410 and a trusted execution environment (TEE) 420 operated in an electronic device (e.g., electronic device 101 shown in FIG. 1) according to various embodiments of the present disclosure.

Referring to FIG. 4, the electronic device is capable of operating an execution environment having a number of security levels to enforce the security (need to know). The execution environments may include REE 410 and TEE 420. The REE 410 may be a first execution environment having a first security level. The TEE 420 may be a second execution environment having a second security level which differs from (or is higher than) the first security level. In an environment, the electronic device 101 may include an additional execution environment having a third security level (e.g., a third execution environment), but is not limited thereto.

The TEE 420 refers to an environment which can safely store data which needs a relatively high security level and performs the related operations. The TEE 420 operates on an application processor of an electronic device. The TEE 420 may also operate based on the reliable hardware architecture which is determined in the process of manufacturing electronic devices. The TEE 420 is capable of dividing the application or the memory into a normal world and a secure world and operates in the secure world. The TEE 420 may be set so that software or hardware, required for security, operates in a secure world. The electronic device is capable of operating the TEE 420 through the physical modification of hardware or the logical modification of software.

TEE 420 and REE 410 may be separated from each other in hardware, and operate separately. Although TEE 420 and REE 410 are in the same hardware, they may be separated from each other logically in software, and operate separately. At least one application (e.g., payment, contact, email, browser, etc.) running on REE 410 may use an API (e.g., TEE functional API 421 or TEE client API 423 shown in FIG. 4) allowed for the access to TEE 420. At least one application running on REE 410 is capable of transmitting, by using the API, a message from an REE communication agent 415 to a TEE communication agent 425. The message may be implemented so that it can only be transmitted to only TEE 420 by hardware. The TEE communication agent 425 receives the message and transmits the received message to a trusted application (TA) 431 (e.g., digital rights management (DRM), secure payment module, secure biometric module, etc.) related to the received message. The trusted application 431 is capable of performing operations related to the message and transmitting the operation results to the REE communication agent 415 via the TEE communication agent 425. The REE communication agent 415 is capable of transmitting the result to at least one application 440 operating in the REE 410.

Figure 5A:
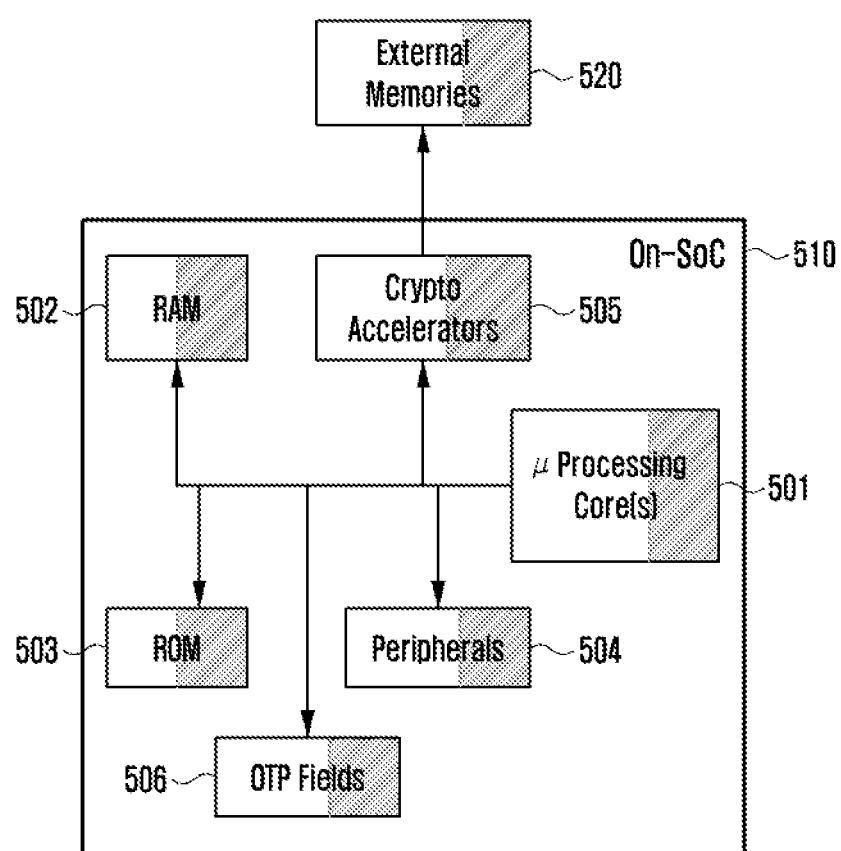
FIGS. 5A to 5C show the hardware architectures of trusted execution environment (TEE) according to various embodiments of the present disclosure.
Figure 5B:
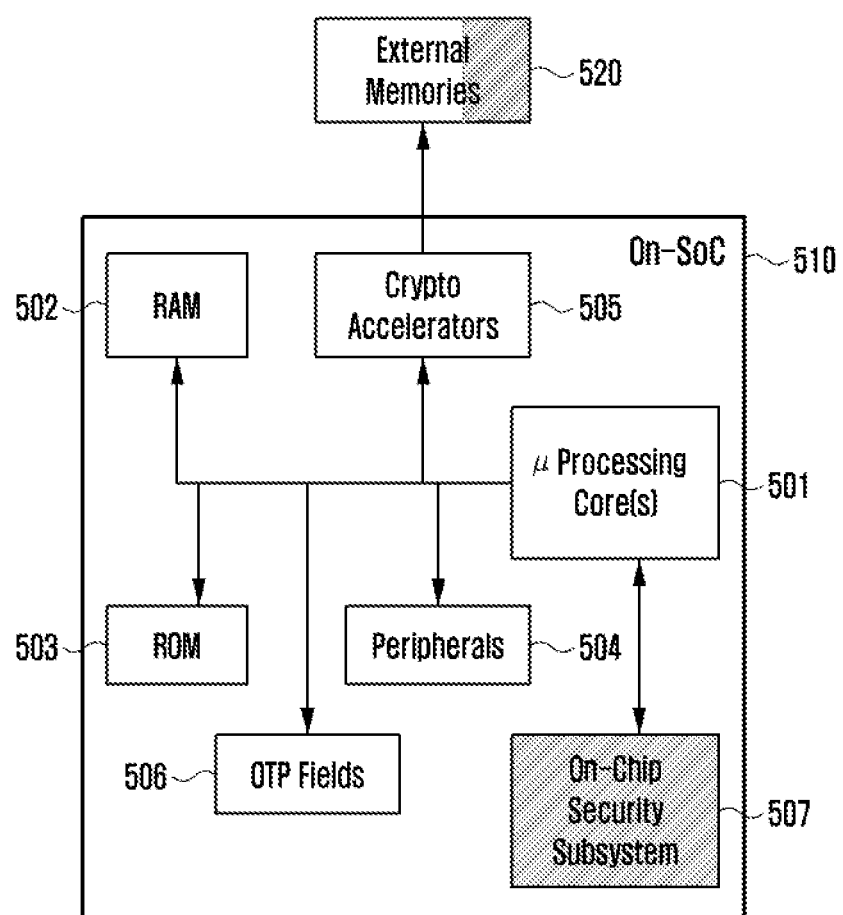
Figure 5C:
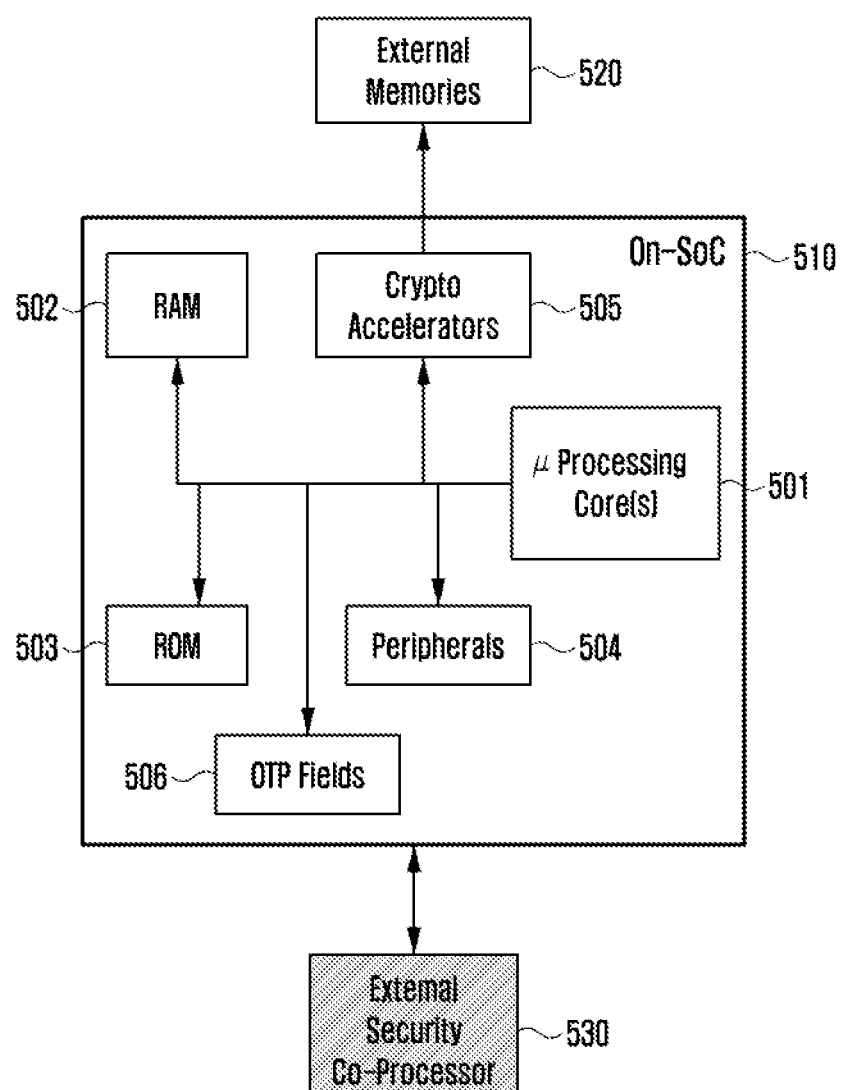

FIGS. 5A to 5C are block diagrams 500 showing the hardware architectures of TEE according to various embodiments of the present disclosure.

FIG. 5A, shows a diagram of a case (e.g., ARM TrustZone (TZ)) that uses one processor and one memory which are each divided into an REE and a TEE in hardware. In an embodiment of the present disclosure, the hardware architecture of TEE is capable of including an On-SoC 510 and external memories 520. The on-SoC 510 is capable of including a micro-processing core 501, a RAM 502, a ROM 503, a peripheral 504, a crypto accelerator 505 or OTP fields 506. The Trustzone may be used in such a way that the processor is divided into two in a time divisional manner in order to operate two or more execution environments, the REE and TEE. Alternatively, the Trustzone may also be used in such a way that one memory is divided into an area allowed for the access to the REE and an area allowed for the access to the TEE.

FIG. 5B shows a diagram of a case where a processor for operating a TEE and a processor for operating an REE are implemented in a form of on-chip but with separate processing core sets. In an embodiment of the present disclosure, the on-SoC 510 is capable of including a micro-processing core 501 and an on-chip secure subsystem 507 with one or more processors. In this case, the on-SoC 510 operates the REE and the on-chip secure subsystem 507 operates the TEE. Like the diagram shown in FIG. 5A, the TrustZone shown in FIG. 5B may be used in such a way that one memory is divided into an area allowed for the access to the REE and an area allowed for the access to the TEE.

FIG. 5C is a diagram of a case where a processor for operating a TEE is implemented as a hardware chip, separated from a chip of a processor for operating an REE.

Referring to FIG. 5C, the on-SoC 510 operates an REE, and one or more external secure co-processors 530, installed outside the on-SoC 510, operates a TEE.

FIG. 6 is a block diagram showing a payment system 600 according to various embodiments of the present disclosure.

Referring to FIG. 6, the payment system 600 is capable of including an electronic device (device) 610 and/or a server. The server is capable of including a payment server 620, a token server (a token service provider) 630, or an issuer 640. The electronic device 610 is capable of including a payment application (or wallet application) 612 and/or a payment manager 614. The payment server 620 is capable of including a payment service server 622 and/or a token requester server (token requester) 624.

In various embodiments of the present disclosure, the payment application 612 may include a payment application 612, e.g., Samsung Pay™ application. The payment application 612 is capable of providing user interface (UI) or user experience (UX) related to payment. The payment-related user interface may include wallet UI/UX. For example, the payment application 612 may provide user interface related to card registration, payment, transaction, etc. The payment application 612 is capable of providing interface related to card registration using an optical character reader/recognition (OCR) or external inputs (e.g., user inputs). The payment application 612 is capable of providing interface related to user authentication via Identification & Verification (ID&V).

In various embodiments of the present disclosure, the payment application 612 is capable of performing a payment transaction, using the payment application 612. For example, the payment application 612 may provide the user with a payment function by executing a preset application, Simple Pay or Quick Pay. The user runs the payment application 612 to make a payment function and is provided with information related to the payment function.

In various embodiments of the present disclosure, the payment manager 614 is capable of including information related to card issuing companies. For example, the payment manger 614 is capable of including a software development kit (SDK) of a card issuing company.

In various embodiments of the present disclosure, the payment server 620 is capable of including a management server configured to perform an electronic payment or a mobile payment. The payment server 620 is capable of receiving payment-related information from the electronic device 610 and transmitting the information to the outside or processing the information.

In various embodiments of the present disclosure, the payment server 620 is capable of performing the transmission/reception of information between the electronic device 610 and the token server 630, using the payment service server 622 and/or the token requester server 624. The payment service server 622 is capable of including a payment server 620 (e.g., a Samsung payment server). The payment service server 622 is capable of managing card information associated with a user's account or service account (e.g., Samsung account). The payment service server 622 is capable of including an application program interface (API) server related to the payment application 612. The payment service server 622 is capable of providing an account managing module (e.g., account integration or Samsung account integration).

In various embodiments of the present disclosure, with reference to FIG. 6, the token requester server 624 is capable of providing interface for processing payment-related information. For example, the token requester server 624 is capable of issuing, deleting or activating payment-related information (e.g., token). The token requester server 624 is capable of controlling information required for payment, while being functionally or operatively connected with the payment manager 414.

In various embodiments of the present disclosure, the payment application 612 of the electronic device 610 is functionally or operatively connected to the payment service server 622 of the payment server 620. For example, the payment application 612 is capable of transmitting/receiving payment-related information to/from the payment server 620. In an embodiment of the present disclosure, the payment manager 614 of the electronic device 610 is functionally or operatively connected to the token requester server 624 of the payment server 620. For example, the payment manager 614 is capable of transmitting/receiving payment-related information to/from the token requester server 624.

In various embodiments of the present disclosure, the token server 630 is capable of issuing or managing payment-related information (e.g., a token). For example, the token server 630 is capable of controlling a life cycle of a token and performing generation, modification and deletion of a token during the life cycle of a token. The token server 630 is capable of including a token management server. In this case, the token server 630 is capable of performing token-provisioning, Identification & Verification (ID&V), replenishment, management of life cycle, and integration of information related to an issuer.

In various embodiments of the present disclosure, the payment server 620 and/or the token server 630 may be located in the same area or a similar area or in separated individual areas. For example, the payment server 620 may be included in a first server and the token server 630 may be included in a second server. Alternatively, the payment server 620 and/or the token server 630 may be implemented within one server (e.g., a first server or a second server), but distinguished from each other therein.

In various embodiments of the present disclosure, the issuer 640 is capable of issuing cards. For example, the issuer 640 is capable of including a card issuing banking server. The issuer 640 is capable of creating payment-related information to be provided to users. The user may store the payment-related information generated by the issuer 640 in the electronic device 610 by using the payment application 612. The issuer 640 is functionally or operatively connected to the token server 630 and transmits/receives the payment-related information thereto/therefrom.

Figure 7:
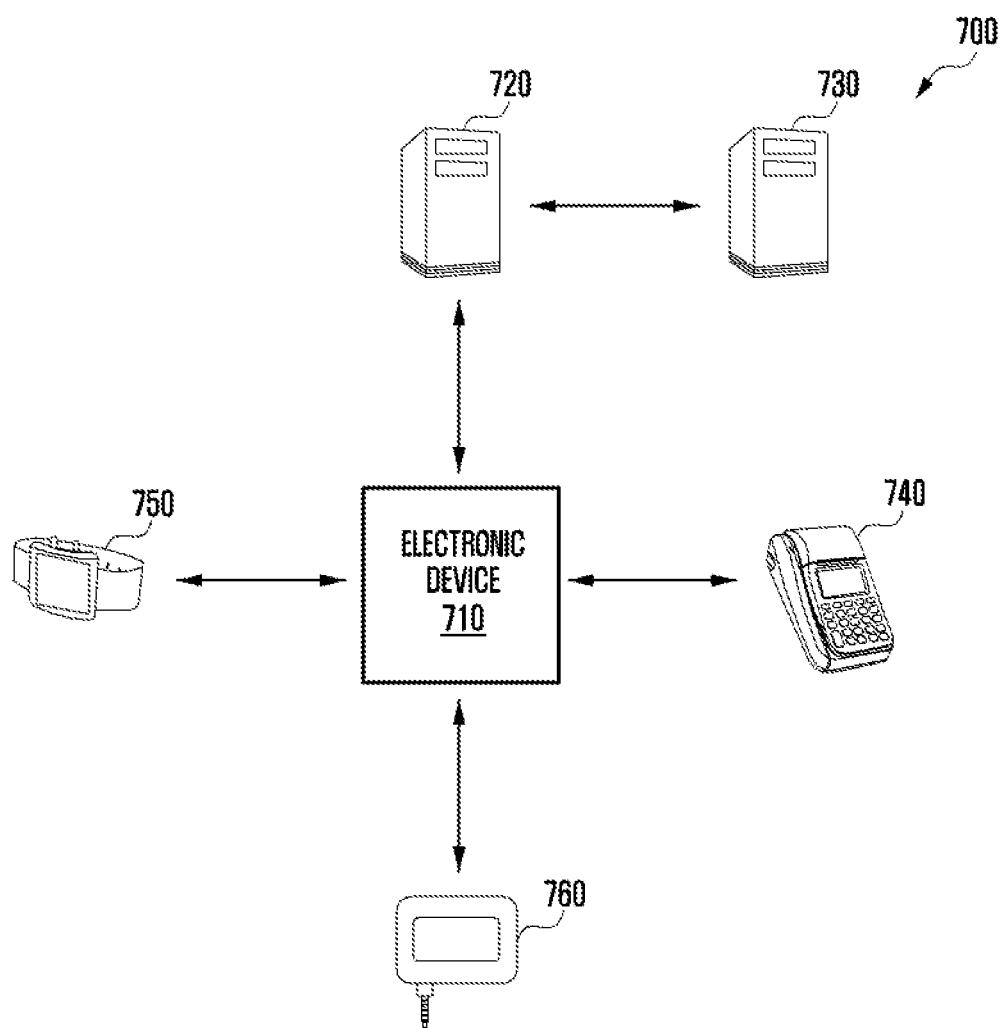
FIG. 7 is a diagram showing a payment system for performing payment according to various embodiments of the present disclosure.

FIG. 7 is a block diagram 700 showing a payment system configured to perform a payment according to various embodiments of the present disclosure.

Referring to FIG. 7, the payment system is capable of including an electronic device 710 (e.g., electronic device 101 shown in FIG. 1), a payment server 720 (e.g., a server 106), a token service provider (TSP) 730 (e.g., a server 106 or another server not shown) and a point of sales (POS) terminal 740 (e.g., an electronic device 102). In an embodiment of the present disclosure, the payment system may further include one or more electronic devices 750, 760, which are may be a wearable device 750 (e.g., a smart watch) functionally or operatively connected (e.g., via communication) to the electronic device 710 or an accessory 760 (e.g., LoopPay™ fob). In an embodiment of the present disclosure, LoopPay™ fob may include an external payment module which is connected to the electronic device 710 via a microphone.

In an embodiment of the present disclosure, the electronic device 710 is capable of performing a payment function. The electronic device 710 is capable of registering a payment card (e.g., credit cards such as a Master® card, a Visa® card, etc.) therein or in the payment server 720. The payment server 720 is capable of managing information regarding a number of cards, e.g., the card registered by the electronic device 710, another card registered by another electronic device (e.g., electronic device 750) of the user of the electronic device 710, cards registered by other users' electronic devices, etc.

In an embodiment of the present disclosure, the payment server 720 is capable of obtaining token information corresponding to the registered card information from the TSP 730 and transmitting the token information to the electronic device 710. The payment server 720 is capable of including a payment service server or a token requester server. The payment service server is capable of managing information regarding a user's cards. The payment server 720 is capable of providing payment-related services based on accounts. The token requester server is capable of requesting token information required to perform a payment from the TSP 730 and obtaining the information therefrom.

The TSP 730 is capable of issuing a token used in the payment process. In an embodiment of the present disclosure, a token refers to a value substituting a primary account number (PAN) as information regarding a card. In an embodiment of the present disclosure, a token may be generated by using a bank identification number (BIN), etc. The generated token may be encoded by the TSP 730. Alternatively, the generated token may be transferred, without being encoded, to the payment server 720, and then encoded by the payment server 720. The encoded token information is transmitted to the electronic device 710 via the payment server 720. The electronic device 710 is capable of decoding the encoded token. In an embodiment of the present disclosure, the token is generated and encoded in the TSP 730, and the processed token is transmitted to the electronic device 710, not through the payment server 720. In another embodiment, the payment server 720 may be equipped with a token creating function. In this case, the payment system may not employ the TSP 730.

When the electronic device 710 functionally or operatively connects to other electronic devices 750 and 760 via short-range communication (e.g., Bluetooth (BT) or Wi-Fi), the electronic device 710 is capable of making a payment using at least one of the other electronic devices 750 and 760. In an embodiment, of the present disclosure an example of the other electronic device 750 is a wearable device (e.g., a smart watch). In this case, the electronic device 710 is capable of transmitting a token, received from the TSP 730, to the wearable device. In an embodiment of the present disclosure, an example of the other electronic device 760 is an accessory (e.g., LoopPay™ fob). In this case, the electronic device 710 is functionally or operatively connected to the accessory (e.g., LoopPay™ fob) via the input/output interface 150 (e.g., earphones 286).

Figure 8:
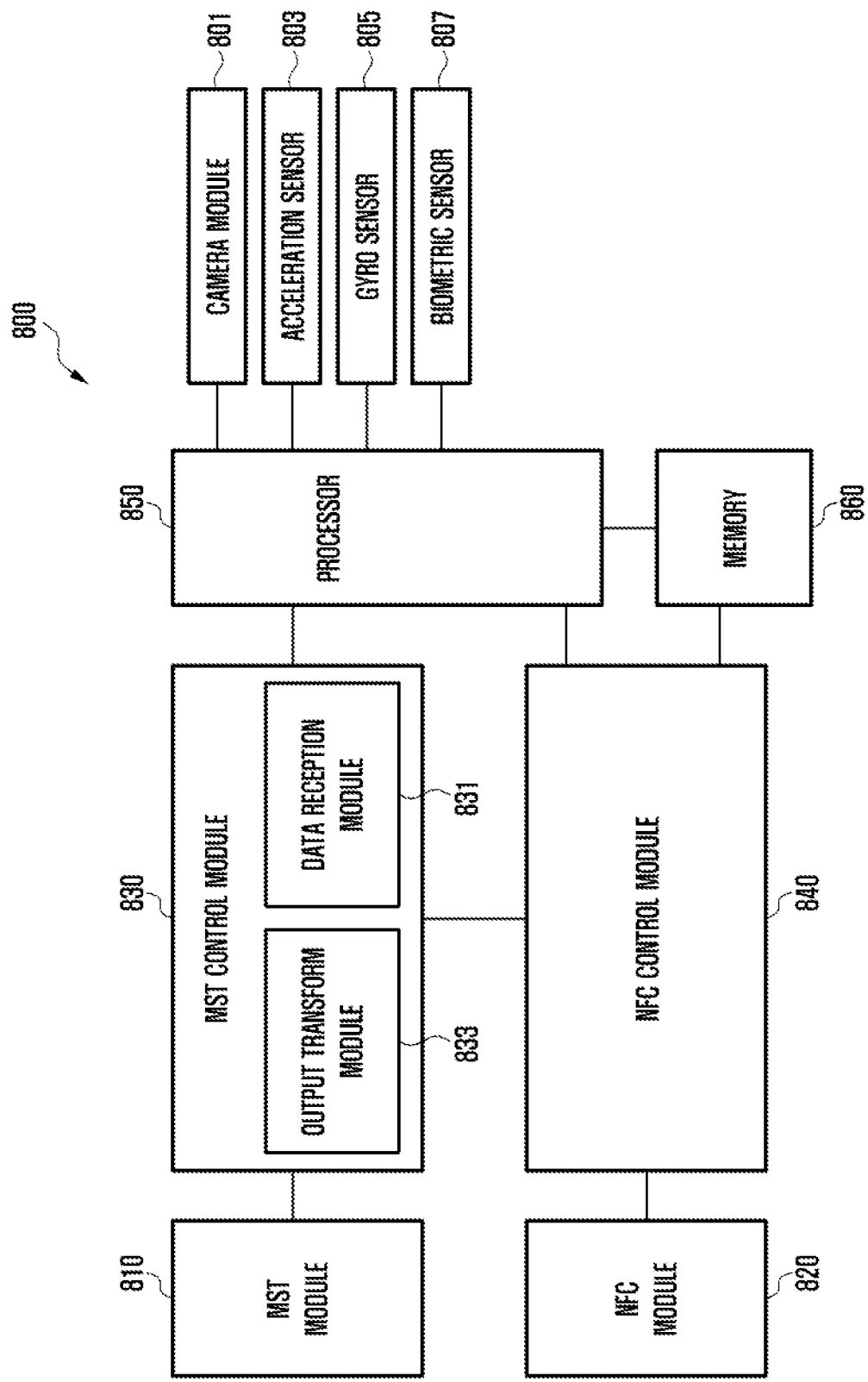
FIG. 8 is a diagram showing the hardware of an electronic device according to various embodiments of the present disclosure.

FIG. 8 is a block diagram 800 showing the hardware architecture of an electronic device (e.g., electronic device 101 shown in FIG. 1) capable of performing a payment function according to an embodiment of the present disclosure.

Referring to FIG. 8, the electronic device is capable of including a camera module 801, an acceleration sensor 803, a gyro sensor 805, a biometric sensor 807, an MST module 810, an NFC module 820, an MST control module 830, an NFC control module 840, a processor 850, and a memory 860. The camera module 801 takes an image of a card to make a payment and obtains the card information. The camera module 801 is capable of recognizing card information (e.g., a card issuing company, a card number, an expiration date, a card holder, etc.), recorded in a card, via an optical character reader (OCR) function. Alternatively, a user may directly input card information to his/her electronic device, using an input unit of the electronic device, e.g., a touch panel, a pen sensor, keys, an ultrasonic input system, a microphone, etc.

In an embodiment of the present disclosure, the acceleration sensor 803 or gyro sensor 805 is capable of obtaining a position state regarding the electronic device (e.g., electronic device 101) when payment is performed, and transferring the obtained position state to the processor 850. The processor 850 controls the intensity of magnetic field (the amount of current) emitted from the MST module 810 to a POS terminal, based on the obtained position state regarding the electronic device. Alternatively, when the MST module 810 has a number of coil antennas, the processor 850 may select a coil antenna to be used. In an embodiment of the present disclosure, the MST control module 830 is capable of including a data reception module 831 and an output transform module 833. The data reception module 831 is capable of receiving a logical high/low pulse signal containing payment information transmitted from the processor 850 or a secure module (e.g., an eSE). In an embodiment of the present disclosure, the data received by the data reception module 831 may have a format of track data recorded on a magnetic stripe of a magnetic card. For example, the received data may be formed in such a way that a token and authentication verification data is inserted into one or more of the formats of a magnetic stripe, track 1, track 2, and track 3.

Referring to FIG. 8, the output transform module 833 is capable of including a circuit for transforming data, recognized by the data reception module 831, to a corresponding format of data to be transmitted to the MST module 810. The circuit may include an H-bridge configured to alternate the polarity of voltage supplied to both ends of, for example, the MST module 810. The H-bridge may be configured with four switching devices connected to each other as in the letter 'H.'

In an embodiment of the present disclosure, the electronic device is capable of: receiving payment information (e.g., track 1, track 2, track 3 or token information), contained in the magnetic stripe of the magnetic card, from a card issuing company/bank server, via a communication module (not shown), based on card information received via the camera module 801 or an input unit (e.g., a touch panel, a pen sensor, etc.); and storing the payment information in a corresponding format in the memory 860 or a separate secure module 236 (e.g., an eSE).

In an embodiment of the present disclosure, a token, transmitted from the same card to the POS terminal, may vary according to the MST module 810 and the NFC module 820. For example, when the last four digits of a token (e.g., a digital card number) of a card, transmitted to an external device (e.g., a POS terminal), is 1111 via the MST module 810, the last four digits of a token (e.g., a digital card number) of the same card, transmitted to an external device (e.g., a POS terminal), is 2222 via the NFC module 820.

Figure 9:
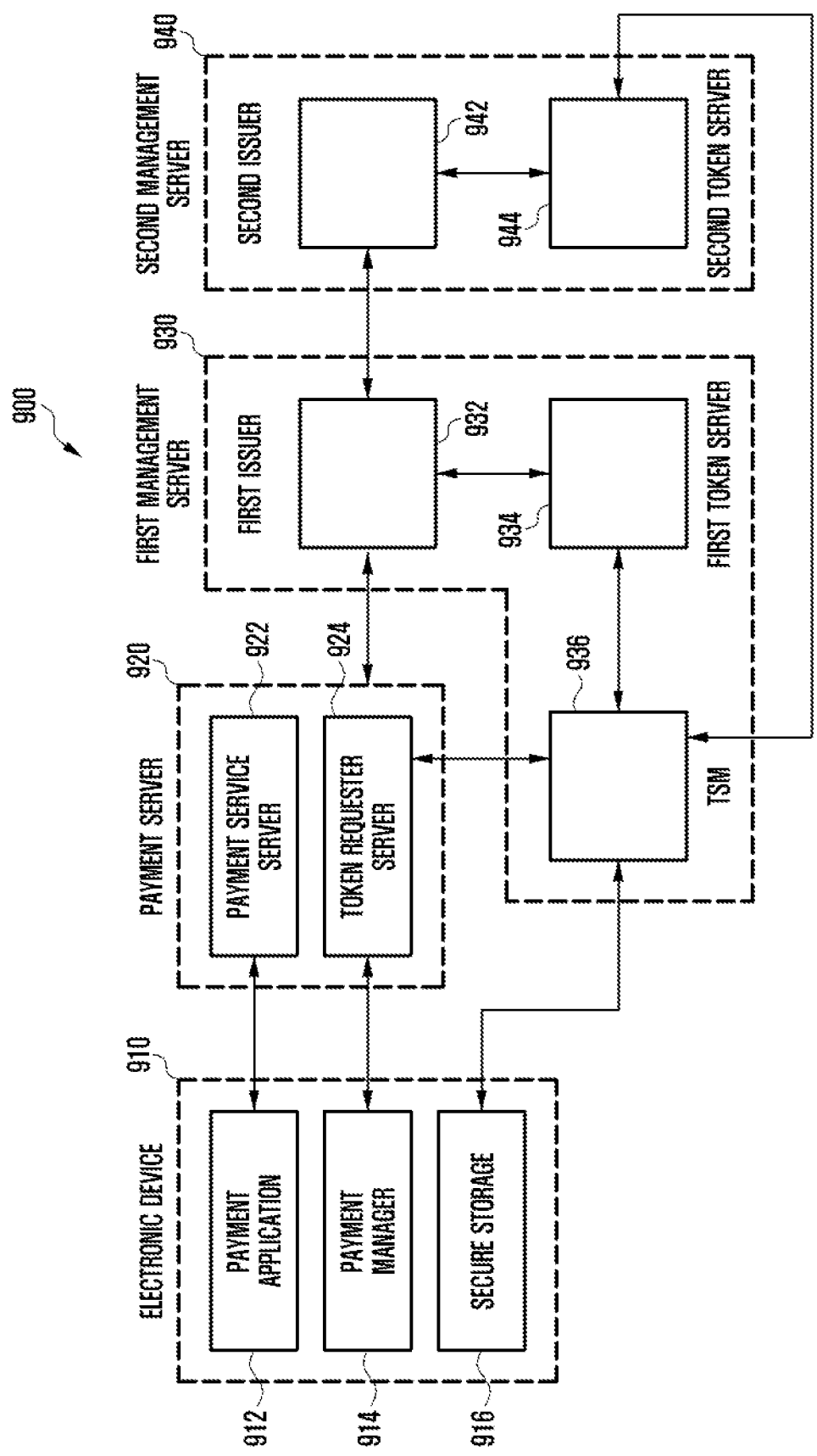
FIG. 9 is a block diagram showing a payment system configured to manage tokens according to various embodiments of the present disclosure.

FIG. 9 is a block diagram showing a payment system 900 according to an embodiment of the present disclosure.

Referring to FIG. 9, the payment system 900 is capable of including an electronic device 910 and/or a number of servers. The servers include a payment server 920, a first token server (a first token service provider) 934, a second token server (a second token service provider) 944, a first issuer (a first card network) 932, a second issuer (a second card network) 942, a trusted service manager (TSM) 936. The electronic device 910 is capable of including a payment application (a wallet application) 912, a payment manager 914 and/or a secure storage 916. The payment server 920 is capable of including a payment service server 922 and/or a token requester server (a token requester) 924. The components in the first issuer 932, the first token server 934, and the TSM 936 may be combined to configure another server (e.g., a first management server 930). In this case, the first management server 930 may be configured as one of the combinations of: a first issuer with a first token server; a first issuer with a TSM; a first token server with a TSM; a first issuer with a TSM; and a first issuer, a first token server with a TSM. Similarly, the second issuer 942 and the second token server 944 are combined to form a server (e.g., a second management server 940).

In various embodiments of the present disclosure, with reference to FIG. 9, the payment application 912 (e.g., payment application 612 shown in FIG. 6) may include Samsung Pay™ Application. The payment application 912 is capable of providing user interface (UI) or user experience (UX) related to payment. The payment-related user interface may include wallet UI/UX. For example, the payment application 912 may provide user interface related to card registration, payment, transaction, etc. The payment application 912 is capable of providing interface related to card registration using an optical character reader/recognition (OCR) or external inputs (e.g., user inputs). The payment application 912 is capable of providing interface related to user authentication via Identification & Verification (ID&V).

In various embodiments of the present disclosure, the payment application 912 is capable of performing a payment transaction, using the payment application 912. For example, the payment application 912 is capable of providing the user with a payment function by executing a preset application, e.g., Simple Pay or Quick Pay. The user runs the payment application 912 to execute a payment function and is provided with information related to the payment function.

In various embodiments of the present disclosure, the payment manager 914 is capable of including information related to card issuing companies. For example, the payment manger 914 is capable of including a software development kit (SDK) of a card issuing company.

In various embodiments of the present disclosure, the secure storage 916 is capable of including a secure module 236 and a secure world, e.g., a TEE. A payment applet (e.g., applet, trusted application, etc.), issued from a first issuer or a second issuer, may be installed to the secure storage 916. In an embodiment of the present disclosure, the payment applet is capable of creating payment information (e.g., a token, a token cryptogram, a time verification code, the number of payments) to be emitted via MST, in the format of track data of a magnetic card. For example, the time verification code refers to a value to check the validity of payment information, employing a specified time value for creating the time verification code. In an embodiment of the present disclosure, a specified time value may employ coordinated universal time (UTC) information. For example, the electronic device is capable of obtaining UTC information via network identity and time zone (NITZ) or network time protocol (NTP). When an external server (e.g., a first management server) obtains UTC information, it synchronizes with the electronic device, thereby verifying the time verification code. The external server is also capable of obtaining a specified time value in the same method as the electronic device (e.g., NITZ or NTP).

The secure storage 916 is capable of storing the payment information (e.g., a key for creating a token cryptogram, a token, etc.) therein.

The TSM 936 is capable of communicating with the payment applet installed to the secure storage 916, and performing the storage and management of payment information (e.g., deletion, replenishment, etc.).

In various embodiments of the present disclosure, the payment server 920 is capable of including a management server for electronic payment or mobile payment. The payment server 920 is capable of receiving payment-related information from the electronic device 910. The payment server 920 is capable of transmitting the received payment-related information to the outside or processing it.

In various embodiments of the present disclosure, the payment server 920 is capable of transferring information (e.g., a token issuing request) between the electronic device 910 and the first issuer 932, via the payment service server 922 and/or the token requester server 924. The payment service server 922 is capable of including a payment server 920 (e.g., a Samsung payment server). The payment service server 922 is capable of managing card information associated with a service account (e.g., a Samsung account) or a user account. The payment service server 922 is capable of including an application program interface (API) server related to the payment application 912. The payment service server 922 is capable of providing the account management module (e.g., account integration or Samsung account integration).

In various embodiments of the present disclosure, the token requester server 924 is capable of providing an interface for processing payment-related information. For example, the token requester server 924 is capable of issuing, deleting or activating payment-related information (e.g., token). The token requester server 924 is capable of controlling information required for payment, while being functionally or operatively connected with the payment manager 914.

In various embodiments of the present disclosure, the payment application 912 of the electronic device 910 is functionally or operatively connected to the payment service server 922 of the payment server 920. For example, the payment application 912 is capable of transmitting/receiving payment-related information to/from the payment server 920. In an embodiment of the present disclosure, the payment manager 914 of the electronic device 910 is functionally or operatively connected to the token requester server 924 of the payment server 920. For example, the payment manager 914 is capable of transmitting/receiving payment-related information to/from the token requester server 924.

In various embodiments of the present disclosure, the first issuer 932 and the second issuer 942 are capable of managing data used to issue payment-related information (e.g., token). For example, the first issuer 932 is capable of requesting the first token server 934 to issue second payment information associated with the first payment information that the second token server has issued. When requesting the issue of a token from the first token server 934, the first issuer 932 is capable of storing and managing information (e.g., token ID) to identify whether a first token and a second token are related to each other.

In an embodiment of the present disclosure, the first payment information (e.g., a digital card number, a key for creating a token cryptogram and/or a token) and the second payment information (e.g., a digital card number, a key for creating a token cryptogram and/or a token) may be a token issued from the electronic device 910, where the token varies according to the transmission modes for payment (e.g., MST and NFC). For example, the first payment information may be used for payment in MST mode and the second payment information may be used for payment in NFC mode. It should also be understood that the first payment information and the second payment information may be used for payment in NFC mode and payment in MST mode, respectively. Alternatively, the embodiment may also be implemented in such a way that the first payment information and the second payment information are identical to each other. The token may refer to a digital card number substituting a primary account number (PAN). At least part of the first payment information or at least part of the second payment information is transmitted from the electronic device 910 to a POS terminal at a store or to the outside via a network. In this case, the issuer identifies the token and determines whether it approves of payment.

In various embodiments of the present disclosure, the first token server 934 and the second token server 944 are capable of issuing or managing payment-related information (e.g., token). For example, the first token server 934 is capable of controlling a life cycle of a token and performing generation, modification and deletion of a token during the life cycle of a token. The first token server 934 is capable of including a token management server. In this case, the first token server 934 is capable of performing token-provisioning, Identification & Verification (ID&V), replenishment, management of life cycle, and integration of information related to an issuer.

In various embodiments of the present disclosure, the TSM 936 is capable of installing a first token and/or a second token, issued from the first token server 934 and the second token server 944, in the secure storage 916. The TSM 936 is also capable of installing, in the secure storage 916, a payment-related program for creating and managing payment information containing a corresponding token.

Figure 10:
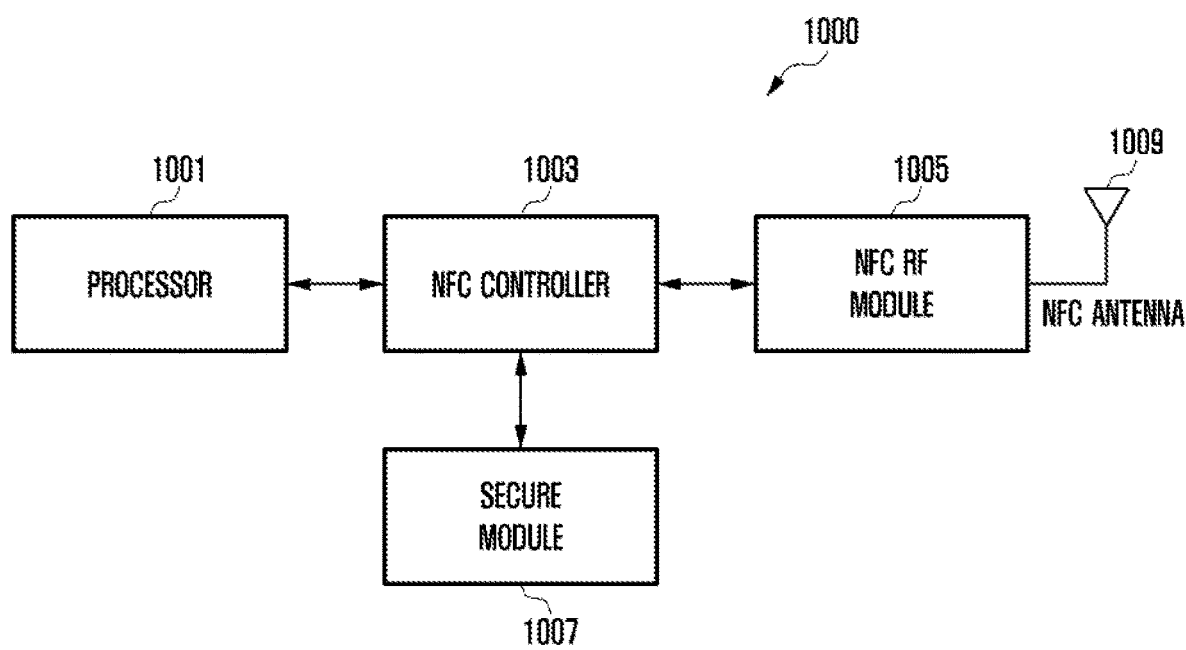
FIG. 10 is a block diagram showing an electronic device configured to support a payment mode via near field communication (NFC) according to various embodiments of the present disclosure.

FIG. 10 is a block diagram showing an electronic device configured to support a payment mode via near field communication (NFC) according to various embodiments of the present disclosure.

Referring to FIG. 10, the electronic device 1000 is capable of including a processor 1001, an NFC controller 1003, an NFC RF module 1005, and a secure module (secure element) 1007.

The processor 1001 is capable of controlling operations of the electronic device 1000. The processor 1001 may be a processor that supports a TEE or a processor that does not support a TEE.

When an electronic device (e.g., smart phone) includes an NFC module, the NFC module may be configured in such a way that it is connected to a rich mobile operating system (mobile OS) or a Rich OS such as Android® and used as an interface connecting a chipset of a low-security OS (or a Rich OS, an OS running on a normal world) and a secure world; however, it should be understood that the NFC module is not limited to the architecture.

The NFC controller 1003 is capable of processing data based on the NFC mode. For example, the NFC controller 1003 is capable of operating in three communication modes, such as card emulation, Reader/Writer, and peer-to-peer (P2P). The card emulation mode refers to a mode that enables the controller to transmit the verification information stored in the secure module 1007 to an external reader, and can be applied to a payment function, a transportation card function, a user authentication function for an identification (ID) card, etc. The reader mode refers to a mode that enables the controller to read external tag information. The P2P mode refers to a mode that enables the controller to support the exchange of data between devices, e.g., electronic business cards, contact information, digital photos, uniform resource locators (URLs), etc.

The NFC RF module 1005 is capable of demodulating a signal, received via an antenna (e.g., NFC antenna 1009), based on a corresponding demodulation scheme, and providing the demodulated signal to the NFC controller 1003. The NFC RF module 1005 is also capable of or modulating data from the NFC controller 1003, based on a corresponding modulation scheme, and transmitting the modulated data via the antenna.

Referring to FIG. 10, the secure world (secure element) module or secure module 1007 is capable of storing information related to authentication or transaction. For example, the information related to authentication or transaction can contain information required for security, such as a primary account number (PAN), a token, an encryption key, etc. The PAN refers to the unique card or credit number, containing information regarding the card or credit card. The unique card or credit card number may not be encrypted. The token may serve to replace the unique credit card number. The PAN or the token is used for an electronic payment. The encryption key is used to encrypt data for payment authentication. The token and the PAN can be transmitted together with the encrypted data.

Only the NFC controller 1003 can access the secure module 1007. The processor 1001 may not be authorized to access the secure element module 1007.

In various embodiments of the present disclosure, the NFC module of the electronic device is connected to the OS of the normal world, and thus serves as an interface for connecting the chipset of the normal world OS and the secure world. The secure world with a relatively high security level can be accessed only through a controller of the NFC module.

The NFC controller 1003, the NFC RF module 1005, and the secure module 1007 may be implemented into a single chip or package. In the following description, a package including the NFC controller 1003, the NFC RF module 1005, and the secure module 1007 may be an NFC module.

Figure 11:
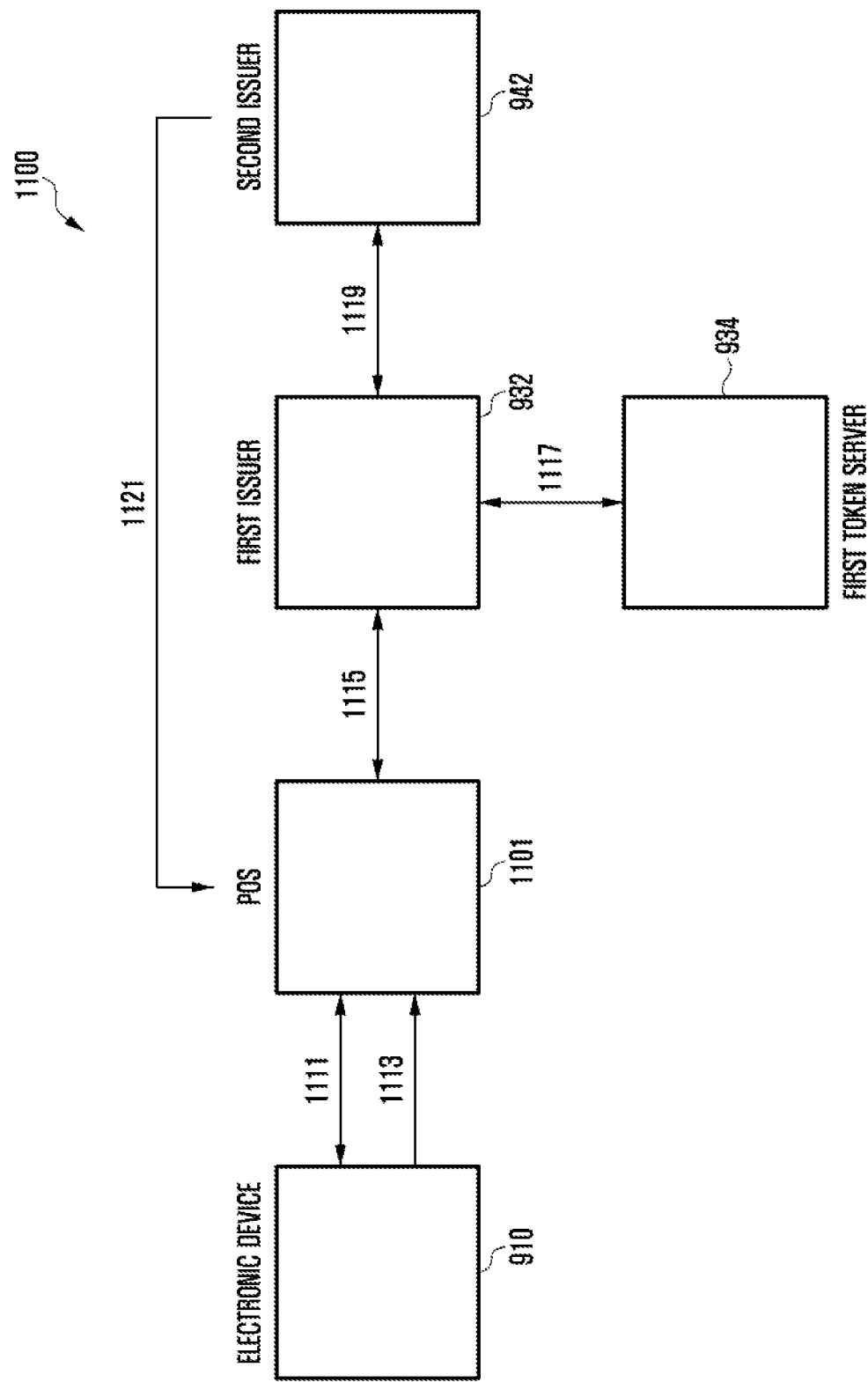
FIG. 11 is a block diagram that describes a method of performing a payment transaction using a token, according to various embodiments of the present disclosure.

FIG. 11 is a block diagram 1000 that describes a method of performing a payment transaction using a token, according to various embodiments of the present disclosure.

Referring to FIG. 11, the components of the embodiment may be identical to those of the payment system described above. In an embodiment of the present disclosure, the electronic device 910 is capable of performing a payment transaction via NFC and/or MST. In the following description, the embodiment describes payment transaction via NFC and/or MST; however, it should be understood that various embodiments of the present disclosure are not limited thereto.

In operation 1111, the electronic device 910 transmits payment information (e.g., a token, a token cryptogram) to the POS 1101 via NFC. For example, when the payment transaction starts, the electronic device 910 may wait detecting an external NFC signal. When receiving an active signal from the POS 1101, the electronic device 910 generates an NFC signal and transmits first payment information via the NFC signal.

In operation 1113, the electronic device 910 transmits payment information (e.g., a token, a token cryptogram) to the POS 1101 via MST. For example, when a payment transaction starts, the electronic device 910 includes second payment information in the Track data format and transmits the MST signal to the magnetic signal reader of the POS 1101. In an embodiment of the present disclosure, the Track data format may contain a verification code generated based on a specified time. For example, the electronic device 910 is capable of: creating a verification code based on a UTC obtained from NITZ or NTP; adding the verification code and second payment information to the Track data; and transmitting the MST signal to the magnetic signal reader of the POS 1101.

In operation 1115, the POS 1101 is capable of transmitting, to the first issuer 932, the first payment information from the electronic device 910 as in operation 1111 or the second payment information from the electronic device 910 as in operation 1113. In an embodiment of the present disclosure, the first issuer 932 is capable of verifying the first payment information in operation 1111 or the second payment information in operation 1113 as in operation 1115. For example, the first issuer 932 checks time information, contained in or transmitted along with the second payment information in operation 1113, or a verification code generated using time information. The first issuer 932 transmits the second payment information in operation 1113 exceeding a preset period of time, as a failure value of payment verification, to an external device (e.g., a POS, a second issuer 942). The second issuer 942 may perform the verification method in a way similar to the way the first issuer 932.

In operation 1117, when the first issuer 932 has received the second payment information, the first token server 934 is capable of altering the second payment information to the first payment information. For example, when the first issuer 932 has received the second payment information, it transmits the second payment information to the first token server 934. The first issuer 932 is capable of issuing the second payment information to match with the first payment information described above referring to FIG. 9. Payment transaction is performed in such a way to check whether the first payment information matches with the second payment information, using the matched information, and to ascertain the first payment information related thereto.

In operation 1119, the first issuer 932 is capable of requesting the verification for the first payment information from the second issuer 942.

In operation 1121, with reference to FIG. 11, the second issuer 942 is capable of transmitting the received verification result for the first payment information to the POS 1101. The POS 1101 may output a receipt of transaction complete or a message of transaction failure, according to the verification results.

Figure 12:
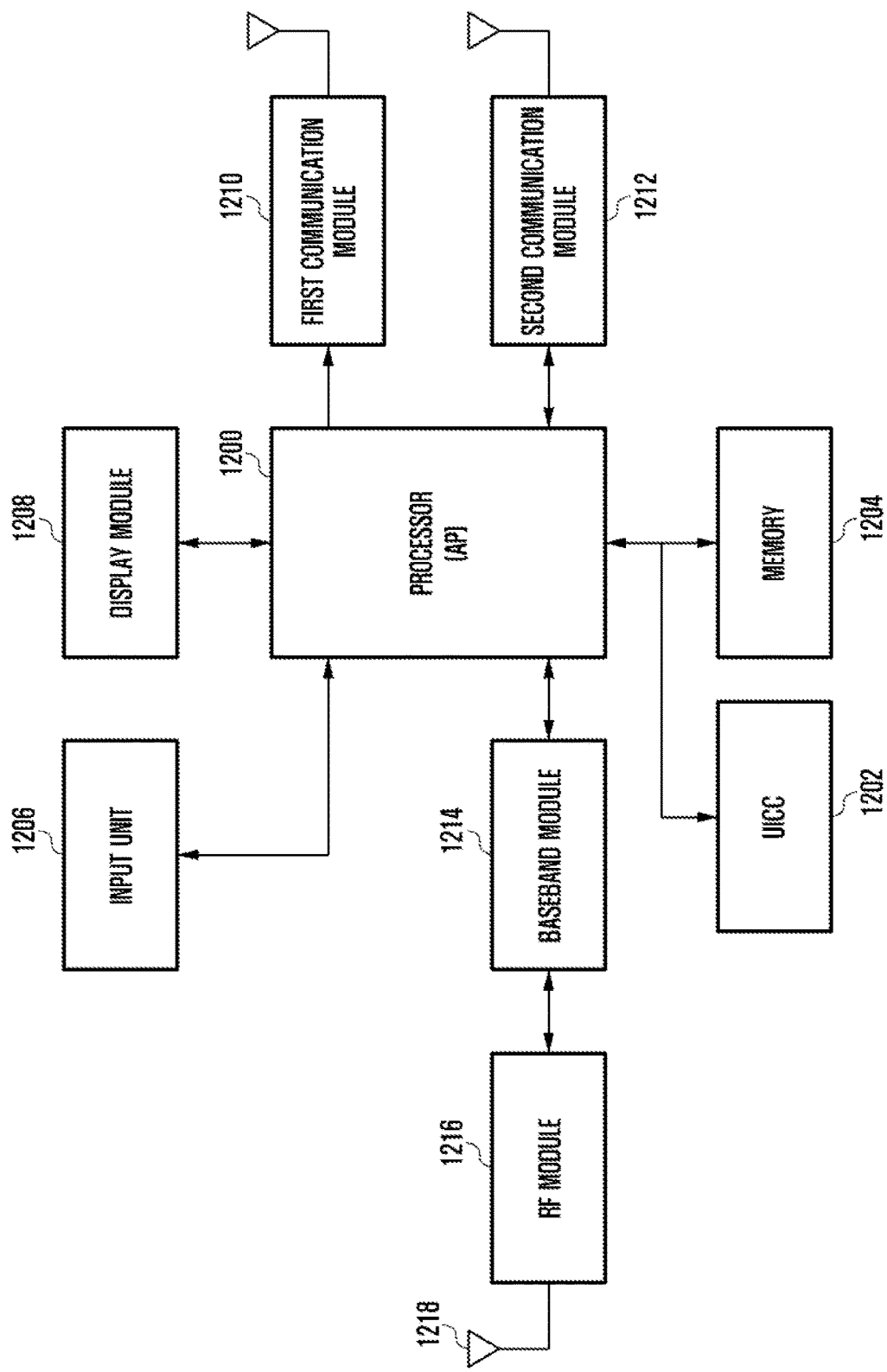
FIG. 12 is a block diagram showing an electronic device according to various embodiments of the present disclosure.

FIG. 12 is a block diagram showing an electronic device according to various embodiments of the present disclosure.

Referring to FIG. 12, the electronic device is capable of including a processor (e.g., an AP) 1200, a Universal IC Card (UICC) 1202, a memory 1204, an input unit 1206, a display module 1208, a baseband module 1214, an RF module 1216, a first communication module 1210, and a second communication module 1212.

The processor 1200 is capable of controlling operations of the electronic device. For example, the processor 1200 is capable of processing and controlling a voice call and data communication. The processor 1200 is also capable of processing a payment service function by running a payment application. The processor 1200 is capable of running in the rich execution environment (REE)/trusted execution environment (TEE). The TEE is capable of storing, executing, and protecting sensitive data, such as verification data, in a safe environment. The REE is capable of processing data in a less secure environment than the TEE.

For example, when the electronic device receives a user input to transmit the verification information or the electronic device approaches or contacts the reader of the POS, the processor 1200 is capable of detecting a request for the transmission of information related to payment or verification. That is, the processor 1200 is capable of receiving a verification information transmission command via the user input (or a user interface), or a verification information request from the POS device. The processor 1200 is also capable of determining a communication mode for transmitting the requested verification information. For example, when the requested verification information is related to a payment system based on the first communication module 1210, the processor 1200 is capable of selecting the first communication module 1210. When the requested verification information is related to a payment system based on the second communication module 1212, the processor 1200 is capable of selecting the second communication module 1212.

In an embodiment of the present disclosure, with reference to FIG. 12, the processor 1200 is capable of obtaining verification information corresponding to the verification information transmission request from the secure module which collects verification information corresponding to individual communication modes. For example, the secure module is capable of storing first verification information used for the payment system based on the first communication module 1210 and second verification information used for the payment system based on the second communication module 1212.

The processor 1200 is capable of transmitting the obtained verification information (e.g., first verification information or second verification information) through the first communication module 1210 or the second communication module 1212.

In an embodiment of the present disclosure, the secure module may be implemented in various types. For example, the secure module may be included in part or all of the Universal IC Card (UICC) 1202 or the built-in memory 1204 of the electronic device. Alternatively, the secure module may be implemented in the first communication module 1210 or the second communication module 1212.

In various embodiments of the present disclosure, the secure module may be implemented as a separate chip serving as an embedded secure element. For example, the secure module may be mounted on a small mobile flash memory card (micro SD).

In an embodiment of the present disclosure, the secure module may be combined with one of the components in the processor 1200 in a single package.

The processor 1200 is capable of accessing the secure world in the TEE, but may not access the secure world in the REE. Although it is not in the TEE, only a particular module (e.g., a first communication module 1210 and a second communication module 1212) may access the secure world.

In response to the transaction or verification information transmission request, at least one piece of verification information is obtained from at least one secure module, which will be described further while referring to FIGS. 14 to 31.

In an embodiment of the present disclosure, the processor 1200 is capable of processing at least one piece of verification information, and transmitting the processed result via at least one communication module (e.g., the first communication module 1210, the second communication module 1212). For example, the electronic device is capable of: creating encryption data using the encryption key of the information related to transaction or verification, such as a PAN, a token, and an encryption key; and transmitting the generated encryption data and the token of the transaction- or verification-related information via the first communication module 1210 and/or the second communication module 1212.

In the following description, general processing and controlling of the processor 1200 is not explained.

The memory 1204 is capable of including a program memory, a data memory, a non-volatile memory, etc. The program memory is capable of storing a program for controlling operations of the electronic device. The program memory may be a flash memory. The data memory is capable of temporarily storing data generated while the electronic device operates. The data memory may be a RANI. The non-volatile memory is capable of storing system parameters and storage data (phone numbers, SMS messages, image data, etc.). The non-volatile memory may be an EEPROM. In various embodiments of the present disclosure, the memory 1204 may be used as the secure world. The memory 1204 may operate in different ways according to the REE/TEE. For example, a memory in the REE and a memory in the TEE may be configured as individual separate hardware chips as shown in FIGS. 5A to 5C. Alternatively, a memory in the REE memory and a memory in the TEE may be used with different addresses in a single hardware chip. In various embodiments of the present disclosure, the memory 1204 may store the verification information. For example, when the verification information is transmitted via the NFC communication module, the verification information may be obtained from the memory 1204 in Host Card Emulation mode. The verification information may be obtained from the memory 1204 in the near field magnetic stripe data transmission. The verification information may be stored in a memory of the REE memory and/or a memory of the TEE.

Referring to FIG. 6, the input unit 1206 is capable of including numeric keys 0~9 and a number of function keys, such as menu, cancel (delete), OK, TALK, END, Internet access key, navigation keys (up/down/left/right), etc. The input unit 1206 is capable of providing the processor 1200 with input data of keys pressed by the user. The display module 1208 is capable of displaying status information generated while the electronic device operates, moving images, still images, etc. The display module 1208 may be implemented with a color liquid crystal display (LCD). In various embodiments of the present disclosure, the display module 1208 is capable of receiving an authentication result from the processor 1200 and displaying it thereon.

A RF module 1216 is capable of down-converting an RF signal received via an antenna 1218 based on a corresponding communication method, providing the down-converted signal to the baseband unit 1214. The RF module 1216 is also capable of up-converting a baseband signal from the baseband unit 1214, and transmitting the up-converted signal over the antenna 1218. The baseband unit 1214 is capable of processing the baseband signals transferred between the RF module 1216 and the processor 1200. Examples of the corresponding communication method are LTE, LTE-A, CDMA, WCDMA, UMTS, GSM, and 5G communication.

The first communication module 1210 is capable of performing unidirectional communication (e.g., transmission). An example of the unidirectional communication is near field magnetic stripe data transmission. The first communication module 1210 is capable of processing first verification information and transmitting the result to the POS terminal.

The second communication module 1212 is capable of performing bidirectional communication (e.g., transmission and reception). An example of the bidirectional communication is NFC. The second communication module 1212 is capable of processing second verification information and transmitting the result to the POS terminal.

In various embodiments of the present disclosure, in a state where an electronic device employs the payment mode based on the bidirectional communication (e.g., the NFC communication module), when the electronic device approaches or contacts the reader of the POS terminal, the second communication module 1212 directly receives the verification information request from the POS terminal, and thus transmits, to the POS terminal, the second verification information corresponding to the payment mode based on the second communication module 1212. In a state where an electronic device employs the payment mode based on the unidirectional communication (e.g., the near field magnetic stripe data transmission), the first communication module 1210 cannot receive data from the POS terminal but can transmit data to the POS terminal. Therefore, the first communication module 1210 can transmit, to the POS terminal, the first verification information corresponding to the payment mode based on the first communication module 1210, according to a verification information transmission command from the processor 1200. The Universal IC Card (UICC) 1202 may be a card including a subscriber identity module (SIM) and be inserted into a slot at a particular location of the electronic device. The UICC 1202 may contain unique identification information, e.g., integrated circuit card identifier (ICCID), or subscriber information, e.g., international mobile subscriber identity (IMSI).

In various embodiments of the present disclosure, the first communication module 1210 or the second communication module 1212 may be implemented in such a way as to be separated from the electronic device. In this case, the first and/or second communication modules may be connected to the electronic device via the connector, e.g., an audio jack (not shown), a USB connector, or the like.

In various embodiments of the present disclosure, the first communication module 1210 is not limited to the near field magnetic stripe data transmission. The first communication module 1210 may be replaced with a module for outputting a barcode, a QR code, or audio data. For example, the first communication module 1210 may be replayed with the display module 1208 for displaying the barcode or the QR code, serving as a unidirectional communication module. Alternatively, a speaker for outputting audio data may be used as a unidirectional communication module.

Similarly, the second communication module 1212 may employ various types of bidirectional communication modes, instead of NFC mode.

Figure 13:
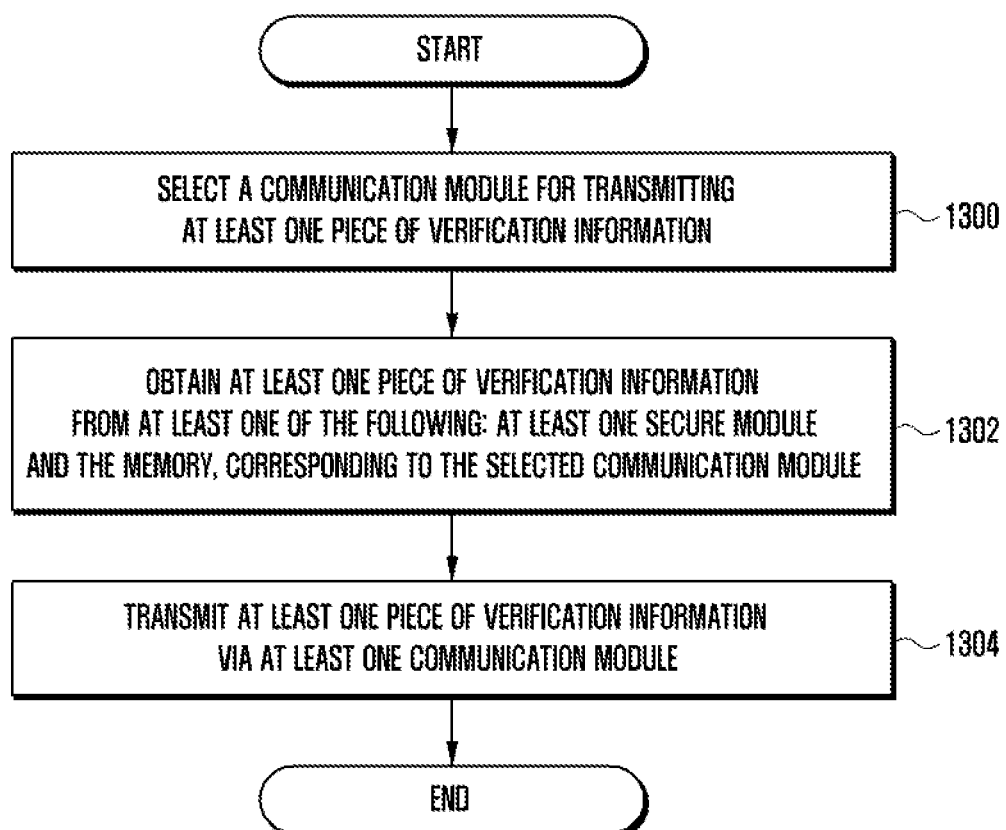
FIG. 13 is a flowchart that describes operations of an electronic device according to various embodiments of the present disclosure.

FIG. 13 is a flowchart that describes operations of an electronic device according to various embodiments of the present disclosure.

Referring to FIG. 13, the electronic device (e.g., the processor 1200 shown in FIG. 12) is capable of selecting a communication module for transmitting at least one piece of verification information in operation 1300. For example, when the electronic device receives a user input for the transmission of verification information or the electronic device approaches or contacts the reader of the POS terminal, it is capable of selecting the communication module for transmitting the corresponding verification information.

For example, when receiving the user input (e.g., fingerprint authentication) for the transmission of verification information, the electronic device is capable of selecting the first communication module 1210. When the electronic device approaches or contacts the reader of the POS terminal, it is capable of selecting the second communication module 1212.

In various embodiments of the present disclosure, when a transaction for the verification information transmission occurs (i.e., when the POS terminal supports the NFC mode and the near field magnetic stripe data transmission), the electronic device is capable of selecting both of the first communication module 1210 and the second communication module 1212.

The electronic device (e.g., the processor 1200 shown in FIG. 12) is capable of obtaining at least one piece of verification information from at least one of at least one secure module and the memory, in response to the transmission request of the transaction-related or verification-related information in operation 1302. The verification information may contain at least one of a PAN, a token, and a key. For example, the token is digital data replacing a user's credit card. When a corresponding credit card is registered, the token may be received from a server of the credit card company. The key may be periodically received from the server of a credit card company or an authentication center which distributes keys. Alternatively, the key may be received from the server according to request, and stored in the secure module and/or the memory. The key may be used to generate the encryption data for authenticating the payment for the goods.

Embodiments for obtaining at least one piece of verification information from at least one secure world will be described later referring to FIGS. 14 to 31.

The electronic device (e.g., the processor 1200 shown in FIG. 12) is capable of processing at least one piece of verification information and transmitting the processed result via at least one communication module (e.g., the first communication module 1210 or the second communication module 1212 shown in FIG. 12) in operation 1304. For example, the electronic device is capable of creating encryption data via the key of the verification information, and transmitting the token of the verification information and the generated encryption data. For example, the token and the encryption data generated with the key may be transmitted in a form of message. The token may be dynamic data. The key may be dynamic data.

The key and/or the token of the verification information may be distinguished from each other according to types of verification. For example, a first token and a first key may be used for a first type of verification. A second token and a second key may be used for a second type of verification. In various embodiments of the present disclosure, the first type of verification may be a payment mode using the near field magnetic stripe data transmission. The second type of verification may be a payment mode using the NFC.

Figure 14:
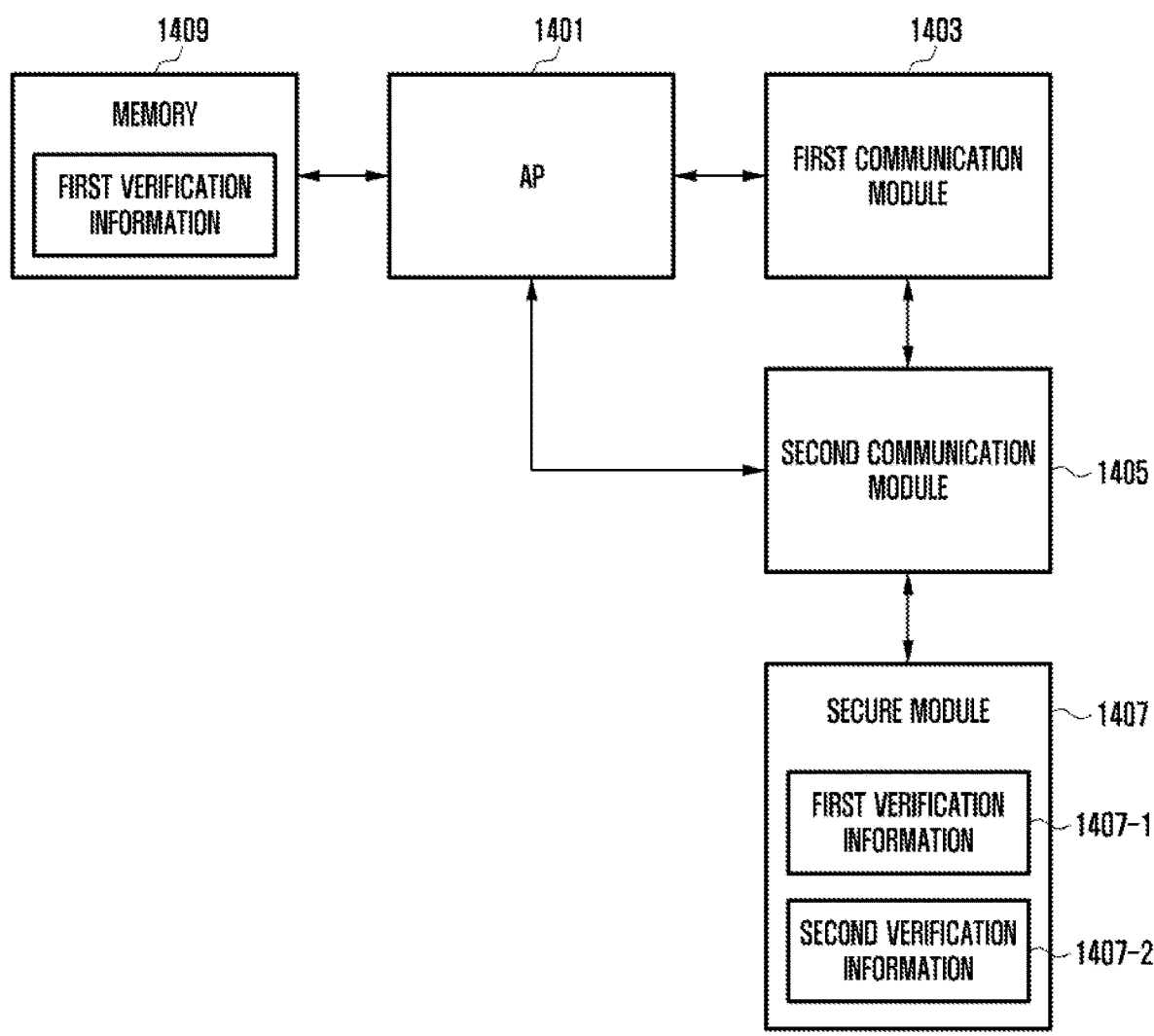
FIG. 14 is a block diagram showing interfaces between components in an electronic device according to various embodiments of the present disclosure.

FIG. 14 is a block diagram showing interfaces between components in an electronic device according to various embodiments of the present disclosure.

Referring to FIG. 14, an application processor (AP) 1401 may correspond to the processor 1200 shown in FIG. 12; a first communication module 1403 may correspond to the first communication module 1210 shown in FIG. 12; and a second communication module 1405 may correspond to the second communication module 1212 shown in FIG. 12. The first communication module 1403 and the second communication module 1405 are electrically connected to the AP 1401. The secure module 1407 is electrically connected to the second communication module 1405. The first communication module 1403 and the second communication module 1405 are functionally or operatively connected to each other.

In various embodiments of the present disclosure, with reference to FIGS. 8 and 14, the first communication module 1403 may be an MST module (e.g., the MST module 810). The second communication module 1405 may be an NFC module (e.g., the NFC module 820). The secure module 1407 may be an embedded secure element (eSE).

The AP 1401 is capable of detecting a first authentication service transaction and transmitting a first authentication service transaction command to the first communication module 1403. In various embodiments of the present disclosure, the first authentication service transaction command may be an instruction to perform the authentication procedure based on the first communication module 1403. For example, the command may be generated by the user.

The AP 1401 is capable of receiving an authentication result corresponding to second verification information 1407-2 from the second communication module 1405 and controlling the display module 1208 to display the authentication result thereon.

When receiving the authentication service transaction command from the AP 1401, the first communication module 1403 requests and receives first verification information 1407-1 from the second communication module 1405. The first communication module 1403 may further process the first verification information 1407-1 and transmit the processed result to the POS terminal. The further process includes the generation of encryption data with the key and the generation of a token and the generated encryption data in a form of message.

When the electronic device approaches or contacts the POS terminal, the second communication module 1405 is capable of detecting a second authentication service transaction and obtaining the second verification information 1407-2 from the secure module 1407. The second communication module 1405 is capable of processing and transmitting the second verification information 1407-2 to the POS terminal. The second communication module 1405 is capable of receiving a feedback of the authentication result and providing the received feedback to the AP 1401.

The secure module 1407 may be a storage space which can be accessed only by the second communication module 1405 but cannot be accessed by the AP 1401 or the first communication module 1403. In the embodiment, the secure module 1407 is capable of containing the first verification information 1407-1 and the second verification information 1407-2.

In various embodiments of the present disclosure, at least one piece of verification information (e.g., the first verification information 1407-1) stored in the secure module 1407 may be stored in a normal memory 1409 electrically connected to the AP 1401. The normal memory 1409 may be accessed by the AP 1401 of the normal world.

Figure 15:
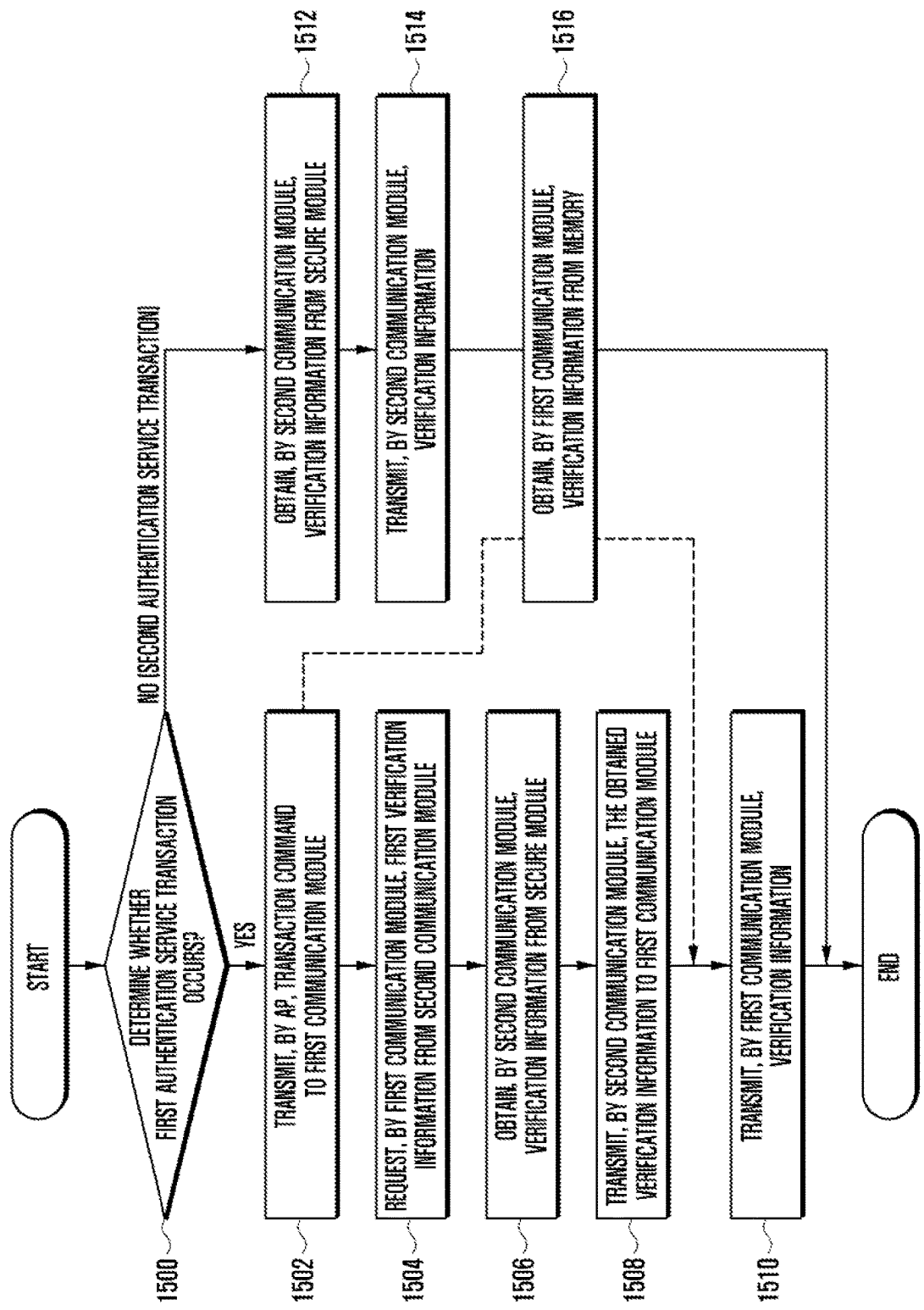
FIG. 15 is a flowchart that describes operations of an electronic device including a number of communication modules for mobile payment services, according to various embodiments of the present disclosure.

FIG. 15 is a flowchart that describes operations of an electronic device including a number of communication modules for short-range mobile payment services, according to various embodiments of the present disclosure.

Referring to FIG. 15, when a first authentication service transaction occurs (e.g., determining whether a first authentication service transaction occurs) in operation 1500, the AP 1401 is capable of transmitting a transaction command of the first authentication service to the first communication module 1403 in operation 1502.

The first communication module 1403 (shown in FIG. 14) is capable of requesting first verification information for payment settlement from the second communication module 1405 (shown in FIG. 14) in operation 1504.

The second communication module 1405 is capable of obtaining the first verification information for the payment settlement from the secure module 1507 in operation 1506.

The second communication module 1405 is capable of transmitting the obtained, first verification information for the payment settlement to the first communication module 1403 in operation 1508.

The first communication module 1403 is capable of processing and transmitting the verification information via the first communication module 1210 in operation 1510.

In various embodiments of the present disclosure, after operation 1502, the first communication module 1403 is capable of obtaining the verification information from the memory 1409 in operation 1516. The obtained, verification information may be transmitted in operation 1510.

On the other hand, when a second authentication service transaction occurs in operation 1500, the second communication module 1405 is capable of obtaining second verification information for payment settlement from the secure module 1407 (shown in FIG. 14) in operation 1512.

The second communication module 1405 is capable of processing the verification information and then transmitting the processed result via the second communication module 1212 (shown in FIG. 12) in operation 1514.

Figure 16:
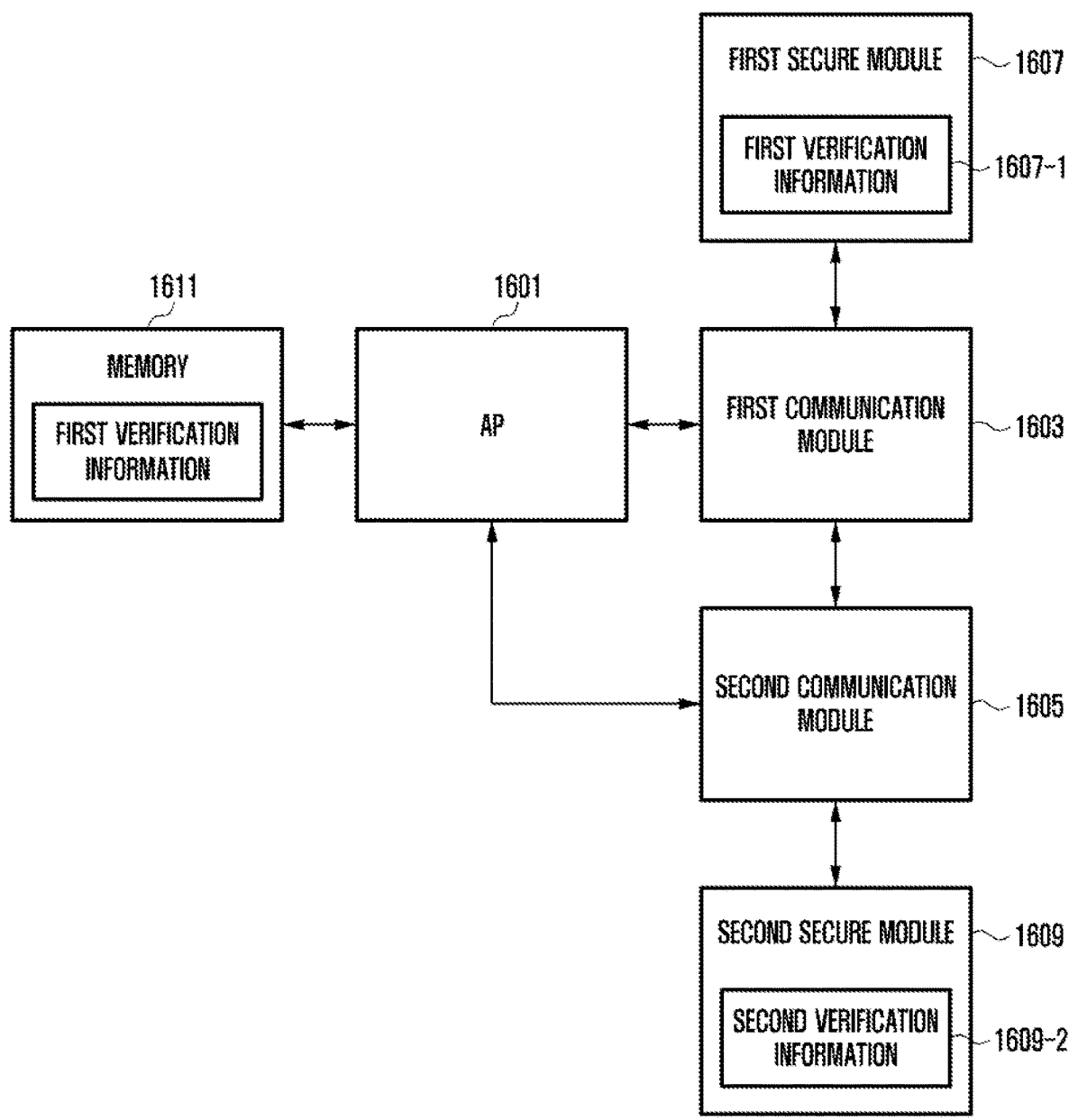
FIG. 16 is a block diagram showing interfaces between components in an electronic device according to various embodiments of the present disclosure.

FIG. 16 is a block diagram showing interfaces between components in an electronic device according to an embodiment of the present disclosure.

Referring to FIG. 16, an application processor (AP) 1601 may correspond to the processor 1200 shown in FIG. 12, a first communication module 1603 may correspond to the first communication module 1210 shown in FIG. 12, and a second communication module 1605 may correspond to the second communication module 1212 shown in FIG. 12. The first communication module 1603 and the second communication module 1605 are electrically connected to the AP 1601. The first secure module 1607 is electrically connected to the first communication module 1603. The second secure module 1609 is electrically connected to the second communication module 1605.

In various embodiments of the present disclosure, the first communication module 1603 may be an MST module (e.g., MST module 810 shown in FIG. 8) and/or an NFC module (e.g., NFC module 820). The second communication module 1605 may be an MST module (e.g., MST module 810) and/or an NFC module (e.g., NFC module 820). The first secure module 1607 may be a first embedded secure element (eSE). The second secure module 1609 may be a second embedded secure element (eSE).

The AP 1601 is capable of detecting a first authentication service transaction, and transmitting a first authentication service transaction command to the first communication module 1603. The AP 1601 is capable of receiving an authentication result corresponding to the second verification information from the second communication module 1605 and controlling the display module 1208 to display the authentication result thereon.

When receiving the authentication service transaction command from the AP 1601, the first communication module 1603 obtains the first verification information 1607-1 from the first secure module 1607. The first communication module 1603 processes the first verification information 1607-1 and transmits the processed result to the POS terminal.

When the electronic device approaches or contacts the POS terminal, the second communication module 1605 is capable of detecting an authentication service transaction and obtaining the second verification information 1609-2 from the second secure module 1609. The second communication module 1605 is capable of processing and transmitting the second verification information 1609-2 to the POS terminal. The second communication module 1605 is capable of receiving a feedback of the authentication result and providing the result to the AP 1601.

The first secure module 1607 may be a storage space which can be accessed only by the first communication module 1603 but cannot be accessed by the AP 1601 or the second communication module 1605. The second secure module 1609 may be a storage space which can be accessed only by the second communication module 1605 but cannot be accessed by the AP 1601 or the first communication module 1603.

In various embodiments of the present disclosure, the first verification information 1607-1 may be stored in a normal memory 1611 electrically connected to the AP 1601. The normal memory 1611 may be accessed by the AP 1601 of the normal world.

Figure 17:
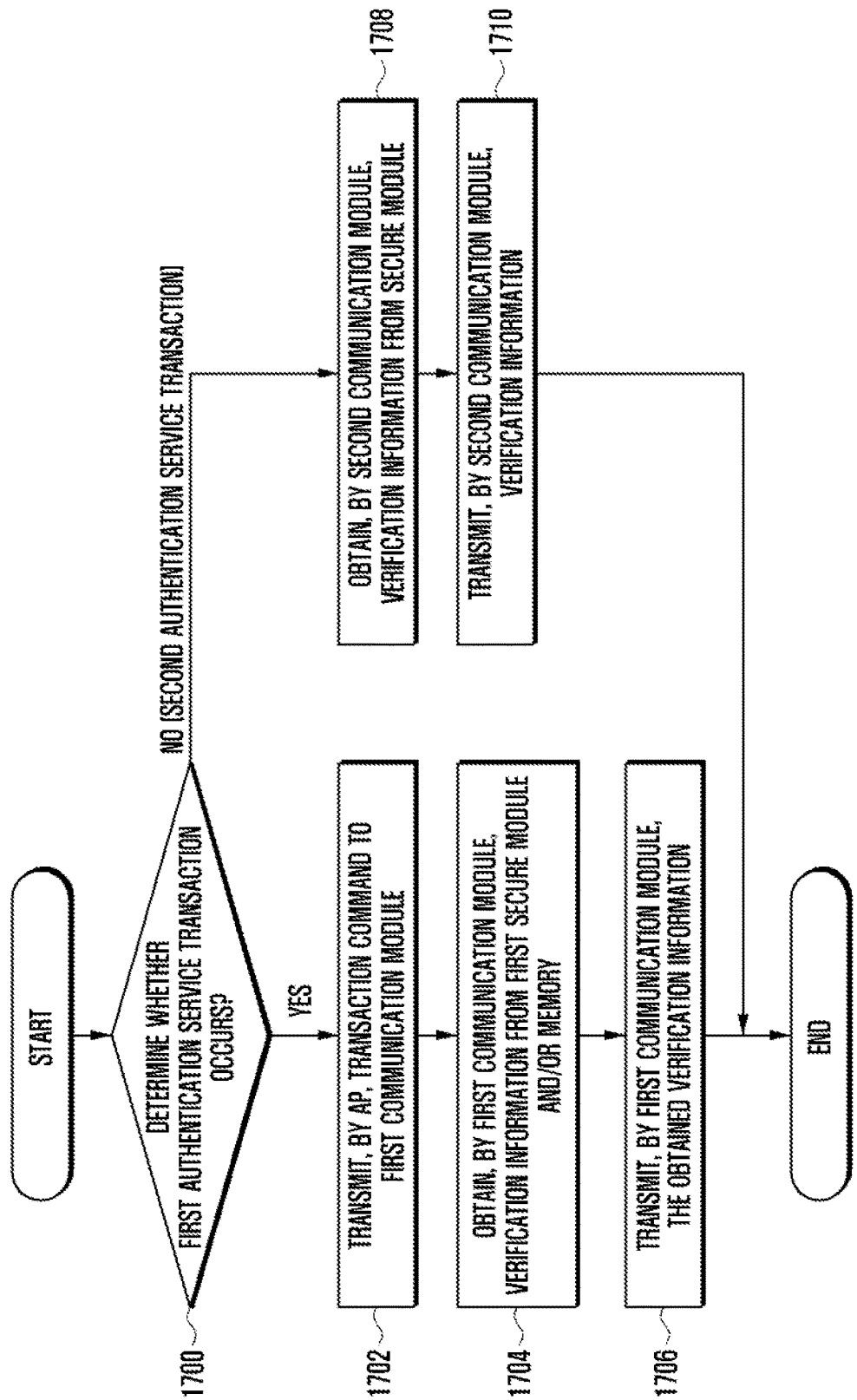
FIG. 17 is a flowchart that describes operations of an electronic device including a number of communication modules for mobile payment services, according to various embodiments of the present disclosure.

FIG. 17 is a flowchart that describes operations of an electronic device including a number of communication modules for short-range mobile payment services, according to an embodiment of the present disclosure.

Referring to FIGS. 16 and 17, when a first authentication service transaction occurs in operation 1700, the AP 1601 is capable of transmitting a transaction command of the first authentication service to the first communication module 1603 in operation 1702.

The first communication module 1603 is capable of obtaining verification information for payment settlement (e.g., first verification information) from the first secure module 1607 and/or the memory 1611 in operation 1704.

The second communication module 1605 is capable of processing and transmitting the verification information via the first communication module 1603 in operation 1706.

On the other hand, when a second authentication service transaction occurs in operation 1700, the second communication module 1605 is capable of obtaining verification information for payment settlement from the second secure module 1609 in operation 1708.

The second communication module 1605 is capable of processing the verification information and transmitting the processed result via the second communication module 1605 in operation 1710.

Figure 18:
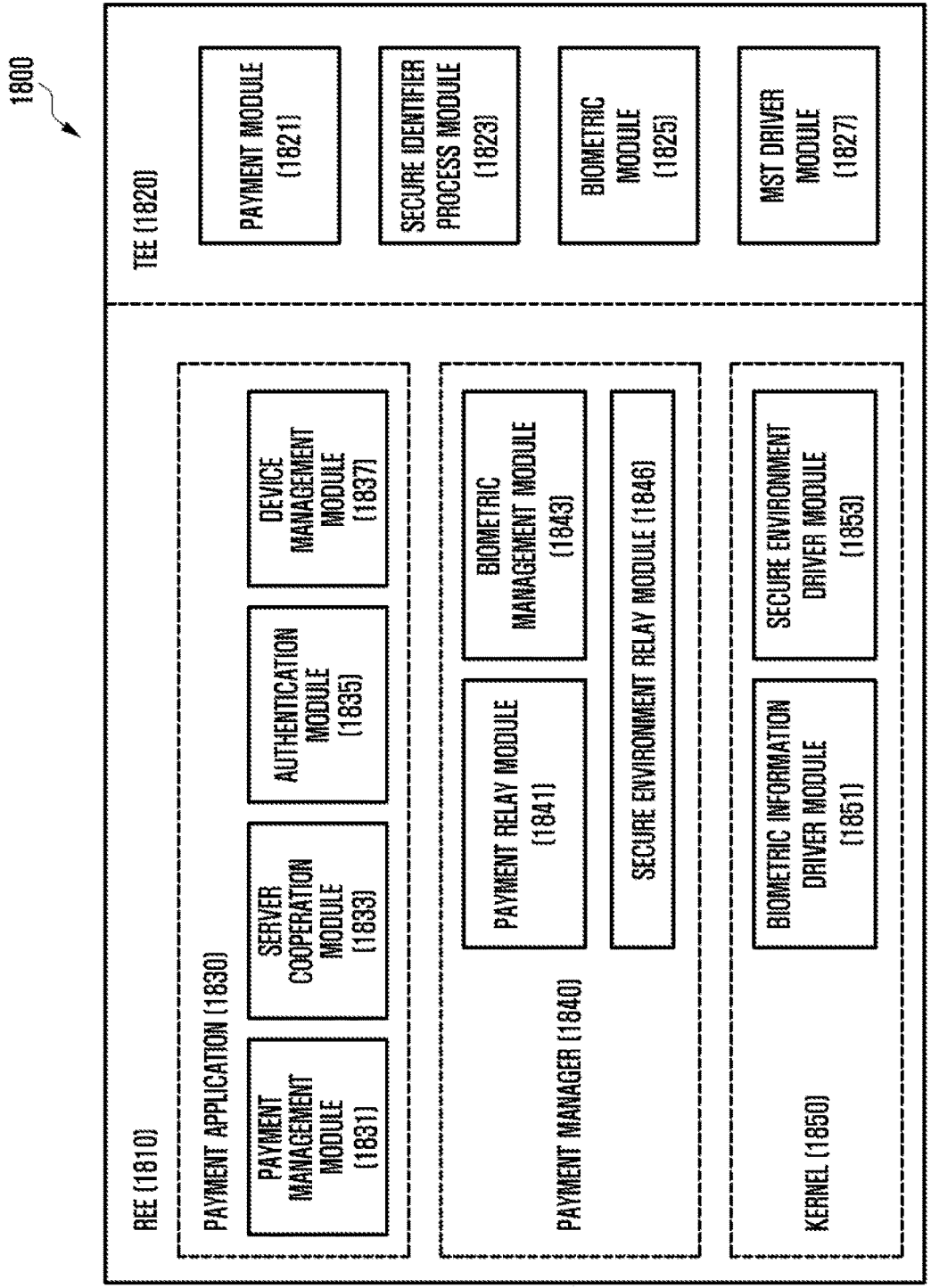
FIG. 18 is a block diagram showing program modules to be executed in an execution environment of an electronic device according to various embodiments of the present disclosure.

FIG. 18 is a block diagram 1800 showing program modules executed in an execution environment of an electronic device (e.g., electronic device 101 shown in FIG. 1) capable of performing a payment function according to an embodiment of the present disclosure. Referring to FIG. 18, the execution environment 1800 may include, e.g., REE 1810 and TEE 1820.

In an embodiment of the present disclosure, with reference to FIGS. 3 and 18, in order to perform a payment, the REE 1810 is capable of including a payment application 1830 (e.g., payment application 385), a payment manager 1840 (e.g., payment manager 354), and a kernel 1850 (e.g., kernel 320). In an embodiment of the present disclosure, the payment application 1830 is capable of including a payment management module 1831, a server cooperation module 1833, an authentication module 1835, and a peripherals (device) management module 1837. The payment application 1830 may further include payment applications shown in FIGS. 32 to 36.

In an embodiment of the present disclosure, the payment management module 1831 is capable of performing card registration, card authentication, card information deletion, and payment. The payment management module 1831 is capable of registering a user's cards. The electronic device (e.g., electronic device 101) is capable of receiving a card registration request from the user. The electronic device is capable of obtaining an image of a card via the camera module. The payment management module 1831 is capable of obtaining a card image via an OCR module. The payment management module 1831 is capable of receiving information related to card information (e.g., password, home address, email address, phone number, account ID, etc.) from the user or a payment server 720 (shown in FIG. 7).

In an embodiment of the present disclosure, the payment management module 1831 is capable of displaying a registered card on the display 160. The user may alter part of the information regarding the registered card (e.g., card name, home address, phone number, the number of payment attempts, a setting of a condition as to whether to receive payment notification information, etc.). The payment management module 1831 is capable of displaying transaction details of individual cards. The payment management module 1831 is capable of displaying information regarding cards registered in a wearable device (e.g., a smart watch) functionally or operatively connected to the electronic device.

In an embodiment of the present disclosure, the payment management module 1831 is capable of making a payment using the registered card. The user selects one of a number of registered cards in order to make a payment. The user moves the electronic device to a POS terminal 740 (shown in FIG. 7). The payment management module 1831 receives information regarding a product (e.g., price) from the POS terminal 740 and displays the information on the display 160. The payment management module 1831 performs user authentication for payment, e.g., fingerprint authentication, via the authentication module 1835. When completing the authentication, the payment management module 1831 displays a message notifying of payment completion on the display 160.

In an embodiment of the present disclosure, the electronic device (e.g., electronic device 101 (shown in FIG. 1) or electronic device 710 (shown in FIG. 7)) is capable of transmitting payment information to the POS terminal using the MST module and/or the NFC module. In order to increase the recognition rate, the electronic device may transmit payment information to the POS terminal using the MST module and the NFC module simultaneously. Alternatively, when the electronic device transmits payment information to the POS terminal using the MST module but fails to make the payment, it may transmit payment information to the POS terminal using the NFC module. The electronic device may recognize payment failure in a way: as it receives a notification from the POS terminal or a 3rd party (e.g., financial institution); or when a preset period of time has elapsed. It should be understood that the various embodiments are not limited to the order of operations described above but may be performed in any other sequence, e.g., reverse order.

In an embodiment of the present disclosure, the electronic device is capable of receiving a user input requesting the deletion of information regarding at least one of the registered cards. The payment management module 1831 is capable of deleting information regarding a corresponding card from the memory 130. The payment management module 1831 is capable of requesting the deletion of information regarding at least one of the registered cards from the payment server 720.

In an embodiment of the present disclosure, the payment management module 1831 is capable of verifying whether an owner of a card is identical to a person who performs registration of the card. The payment management module 1831 is capable of including, e.g., an identification & verification (ID&V) module. The payment management module 1831 is capable of performing user authentication via a text message, an email, an ARS, or a phone call. Alternatively, user authentication may be performed via an application issued from a card issuing company or a bank. When a registered card is authenticated via the payment management module 1831, it can be used.

In an embodiment of the present disclosure, the payment management module 1831 is capable of including an OCR module. The OCR module is capable of converting images, obtained as a scanner scans documents containing words, letters or characters written by a person or printed by a printing machine, into readable or editable data (characters) by a machine. The electronic device is capable of obtaining an image of a user's card captured by a camera module (e.g., camera module 291). The OCR module is capable of converting an image, words, letters or characters, and numbers in the captured card image into readable or editable data (characters) by a machine. The OCR module is capable of obtaining a user's card information (e.g., card number, user name, or expiration date) from the converted data. The electronic device is capable of obtaining a user's card information via the OCR module and performing a card registration process based on the obtained information.

In an embodiment of the present disclosure, the payment management module 1831 is capable of displaying a barcode generated for payment on the display 160. For example, the payment management module 1831 is capable of receiving, from a POS terminal 740 (shown in FIG. 7), a command for generating a barcode that a barcode reader reads when making a payment. The payment management module 1831 is capable of generating a barcode based on the received command.

In an embodiment of the present disclosure, the server cooperation module 1833 is capable of receiving a payment-related message, a device-related message, or a service-related message from a payment server 720 or a token service provider 730. The server cooperation module 1833 is capable of transmitting the received message to the payment management module 1831.

In an embodiment of the present disclosure, the server cooperation module 1833 is capable of including a push management module and/or an account management module. For example, when the server cooperation module 1833 receives a token-related push notification from the payment server 720 (shown in FIG. 7), the push management module handles the received message. When the server cooperation module 1833 receives a message containing account-related information (e.g., Samsung account) from the payment server 720, the account management module handles the received message.

In an embodiment of the present disclosure, the push management module is capable of operating or handling a push notification or push message received from the payment server 720. The push message may be transferred to a server cooperation module 1833 in the payment application 1830 via a payment relay module 1841 in the payment manager 1840 or 354. Alternatively, the push message may be directly transferred to the payment application 1830. At least part of the received push message is transferred to the payment management module 1831 and is used for updating card-related information, thereby synchronizing with the payment server 720.

In an embodiment of the present disclosure, the payment service 720 is capable of including an account server configured to manage account-related information or a token requester server configured to provide payment-related information. The account server and the token requester server may be implemented with individual separate devices (e.g., servers 106 shown in FIG. 1) or be included in a single device.

In an embodiment of the present disclosure, the message information received from the push management module may contain information related to a token and payment, such as authority setting (e.g., token provisioning), suspension (e.g., token suspension), disposal (e.g., token disposal), status change (e.g., token status change), replenishment (e.g., token replenishment), payment acknowledgement (e.g., transaction notification), etc., described as in the following Table 1.

The message transmitted/received to/from the account management module may contain at least part of the information related to the electronic device, such as a function for identifying a lost electronic device (e.g., lost device, find my mobile), a remote blocking function (e.g., remote lock/unlock), a membership managing function (e.g., loyalty/membership cards), a website cooperation function (e.g., website portal-online), etc.

TABLE 1

| Push management | Use case | Details |
| --- | --- | --- |
| Token | Token provisioning with ID & V | External server provides a push management module of an electronic device with card information for identification and verification in order to install token and perform authentication |
| | Token suspension | External server transmits information for token suspension to a push management module of an electronic device |
| | Token resume | External server transmits information for token resumption to a push management module of an electronic device |
| | Token disposal | External server transmits information for token disposal to a push management module of an electronic device |
| | Token status change | External server transmits information for card status change to a push management module of an electronic device |

TABLE 1-continued

| Push management | Use case | Details |
|---|---|---|
| | Token Replenishment | External server transmits information for token replenishment to a push management module of an electronic device |
| | Transaction Notification | External server (payment server) transmits token payment details to a push management module of an electronic device |
| Device | Lost Device (Find my mobile) | Lost details are transmitted between an external server (service server) and an account management module of an electronic device |
| | Remote lock/unlock | Commands for blocking remote devices are transmitted between an external server (service server) and an account management module of an electronic device |
| | Loyalty/Membership cards | Membership information is transmitted between an external server (service server) and an account management module of an electronic device |
| | Website (online) | A website cooperation function is supported between an external server (service server) and an account management module of an electronic device |

In an embodiment of the present disclosure, when token provisioning with ID & V information obtained by a payment management module has been successfully transmitted to an external server via a payment server 720 and the transmitted token-related information is validated, the server cooperation module 1833 receives a message, e.g., "push token {id} status changed," and transmits the message to the payment management module 1831.

In an embodiment of the present disclosure, temporary suspension of card information (e.g., token suspension) obtained by the payment management module 1831 of the electronic device transmits the use suspension command from the payment server 720 to the payment application 1830, thereby changing the card setup state for mobile payment from an active state to an inactive state.

In an embodiment of the present disclosure, when an electronic device is lost, the payment server 720 is capable of deleting all of its stored token information or temporarily suspending the token information. In order to synchronize this result with the payment application 1830, the payment server 720 is capable of transmitting a push message to the payment application 1830. The payment server 720 may transmit the push message to the payment application 1830 via the payment relay module 1831 or the server cooperation module 1833 (e.g., a push management module or an account management module).

Referring to the following Table 2, details of a push API supported by an electronic device and a payment relay module 1831 are implemented to be distinguished from each other according to the payment relay module 1831.

TABLE 2

| API | Description | type | validation |
|---|---|---|---|
| device.push | Contains push platform | Json | required |
| device.push.spp.id | Samsung Push Id. | String | required |
| device.push.gem.id | Google Push Id. | String | optional |

In an embodiment of the present disclosure, the account management module is capable of managing information to be exchanged with a payment server 720 (shown in FIG. 7), e.g., a user's unique identifier (e.g., a Samsung account id or a device id), card information, membership information, etc., via the payment application. The user identifier may include a user's subscription accounts to manage a number of business-related cards (e.g., Visa® card or Master® card), a portal account related to an electronic device, a unique identifier of an electronic device (e.g., a model name, media access control (MAC) address, international mobile equipment identity (IMEI), a serial number, a universally unique identifier (UUID), identification (ID), etc. The unique identifier may be a value that is generated in the payment server 720 through the account and received therefrom.

The account management module is capable of managing registration, replenishment, deletion, duplicate registration, use suspension, or use resumption for cards, using a user's account or an identifier of an electronic device. In addition, when card information is imported/exported between an electronic device and a wearable device, the account management module is capable of managing registration, replenishment, deletion, duplicate registration and identification, use suspension, or use resumption for cards, based on a user's generated account or an electronic device identity.

In this case, the account-based management method manages a number of users or a number of electronic devices, sharing one account, in such a way as to: allow the electronic devices to use unique accounts (e.g., Samsung accounts) respectively; or integrally manage the electronic devices using one account.

In an embodiment of the present disclosure, information regarding a first card (e.g., Visa® card) and a second card (e.g., a Master® card), generated by a recognition module (e.g., an OCR module) of the payment management module 1831, may be used to register the card based on an account, e.g., registration02@samsung.com which is generated when subscribing to the Samsung company. In this case, the registered information may be synchronized with the payment server 720, based on the generated account.

In an embodiment of the present disclosure, membership information generated by a barcode interface may be used to register cards, e.g., a first card (e.g., Samsung Points® card), a second card (e.g., CJ membership Points® card), etc., based on an account, e.g., registration01@samsung.com which is generated when subscribing to the Samsung company. In this case, the registered information may be synchronized with the payment server 720, based on the generated account.

The user logs in via the payment application, determines whether the state of a card is active or inactive, based on the account, and enables the account management module 1831 to transmit the determined card state to the payment server 710. In contrast, the user may manage the state of cards based on an account through a server management web page (e.g., server portal), e.g., changing the state of cards. The account management module is capable of managing membership information (e.g., CJ membership Points®, registration001@Cj.com, etc.) and information regarding a card (e.g., a Visa® card, ID & V) associated with a service account (e.g., registration01@samsung.com), cooperating with a server. The membership information may be automatically updated in such a way that, when a card makes a payment, payment result information (e.g., payment price) and membership accumulation information (e.g., points, mileage, etc.) is automatically accumulated or balanced.

Once a payment application including an account management module is installed to an electronic device, it allows the user: to manage and use part or all of the setup states of registered cards after logging in or signing in only once via the electronic device, regardless of the types of electronic device; and also to cooperate the setting states with the electronic device. In addition, membership information with a relatively low security level for authentication may be registered based on a user's account or may cooperate with a user's account, thereby removing an additional authentication process.

In an embodiment of the present disclosure, the authentication module 1835 is capable of displaying, on the display 160 (shown in FIG. 1), a user interface (UI) for authenticating a user or a card in order to perform a payment. For example, the authentication module 1835 is capable of including a biometric module.

In an embodiment of the present disclosure, the biometric module is capable of obtaining a user's biometric information, e.g., fingerprint, iris, facial feature, voice, heartbeat, blood pressure, etc. The electronic device is capable of obtaining a user's biometric information via a sensor module, e.g., fingerprint by a fingerprint sensor. The electronic device is capable of obtaining a user's iris information via a camera module. The biometric module is capable of displaying a user interface (UI) for obtaining a user's biometric information on the display 160.

In an embodiment of the present disclosure, with reference to FIG. 18, when a user attempts to make a payment using card information registered in the electronic device, the biometric module performs authentication to obtain secure data (e.g., token) from a secure memory functionally or operatively connected to the electronic device. Examples of the secure memory are an embedded secure element (eSE) and an accessible memory in a secure environment. In order to perform user authentication, the electronic device is capable of obtaining a user's biometric information (e.g., fingerprint, iris, etc.) via the biometric module. The obtained biometric information is transmitted to a biometric management module 1843 of the payment manager 1840. In an embodiment, a secure memory may be a memory capable of storing data with an encrypted key.

In an embodiment of the present disclosure, when a user performs an electronic payment on the Internet webpage, the biometric management module 1843 is capable of making a payment using the biometric information and the card information, registered in the electronic device. The user performs authentication to obtain secure data (e.g., a token) from a memory or a secure module (e.g., an eSE or a memory accessible in a secure environment) functionally or operatively connected to the electronic device. When the user authentication is successfully progressing in the electronic device, the electronic device may proceed with fast automatic authentication, e.g., fast identity online (FIDO), where it cooperates with an external server, without performing an additional electronic payment process on the Internet webpage. That is, the electronic device is capable of performing authentication required for online payment at high speed, i.e., fast authentication, cooperating with the biometric module.

In an embodiment of the present disclosure, the electronic device is capable of previously designating (registering) a user's fingerprint or a card to make a payment. For example, when a user performs authentication with fingerprints using a payment application, he/she may have designated the right hand's thumb and index finger for a Visa® card and a Master® card, respectively. Therefore, the card can be used to make a payment when the user's fingerprint is authenticated.

In an embodiment of the present disclosure, the device management module 1837 is capable of managing external devices (peripherals) functionally or operatively connected to the electronic device. The device management module 1837 is capable of including, e.g., an MST device module and a wearable device module.

In an embodiment of the present disclosure, the MST device module is capable of providing user interface (UI) for outputting a wired/wireless connection state between an MST accessory (e.g., LoopPay™ fob) and the electronic device so that the user can perform corresponding operations. When the MST accessory is connected to the electronic device, the UI allows the user to perform card registration, card information deletion, or payment and outputs the results. When the MST accessory is connected to the electronic device, the MST device module is capable of storing card information required for payment in a separate memory in the MST accessory or the electronic device. In this case, although the MST accessory and the electronic device are not connected to each other, the electronic device or MST accessory is capable of independently performing a payment process.

The wearable device module is capable of providing UI for outputting a wired/wireless connection state between a wearable device (e.g., watch, headsets, glasses, finger ring, etc.) and the electronic device so that the user can perform corresponding operations. Wired/wireless connection may be implemented with various types of interface such as BT, BLE, Wi-Fi, Zigbee, Z-wave, etc. Alternatively, wired/wireless connection may be implemented with a specific accessory protocol, e.g., Samsung accessory protocol (SAP). When the wearable device is connected to the electronic device, the UI allows the user to perform card registration, card information deletion, or payment and outputs the results. In the process of card registration, card information deletion, or payment, the wearable device module is capable of: outputting a condition as to whether to generate a short-range-based secure session with respect to the wearable device; transmitting/receiving user inputs applied to the electronic device or the wearable device; and displaying the user inputs on the electronic device or the wearable device. Examples of the user inputs are card information required for payment, and added verification information other than the card information, (e.g., a PIN, a user's unique patternrelated data, fingerprint recognition-related data, a wearable device bezel, a touch value input to the display 160, etc.).

In an embodiment of the present disclosure, the electronic device is capable of sharing the same payment information (a single piece of information) with the wearable device or the accessory. For example, the information regarding a single Visa® card is stored in both the wearable device and the electronic device. In an embodiment of the present disclosure, when another piece of card information is further generated from the same card (a single card), the electronic device is capable of storing the piece of card information in the wearable device or the accessory. For example, when two tokens are issued from a single Visa® card (the same Visa® card), the electronic device is capable of storing one token therein and the other token in the accessory or the wearable device. In a state where the electronic device stores one of the two tokens issued from the same card (a single card) therein and the other token in the accessory or the wearable device, when a payment module in one of the devices is activated, a payment module in the other device is inactivated. For example, in a state where one of the two tokens issued from the same Visa® card (a single Visa® card) is stored in an electronic device and the other token is stored in the accessory or the wearable device, when the wearable device makes a payment, the payment module in the electronic device may be inactivated. Alternatively, when the electronic device makes a payment, the payment module in the wearable device may be inactivated.

In an embodiment of the present disclosure, the payment manager 1840 is capable of including a payment relay module 1841, a biometric management module 1843, and a secure environment relay module 1846. In an embodiment of the present disclosure, the payment relay module 1841 is capable of relaying information regarding a card or information corresponding to a card (e.g., a token) to a payment application, a kernel, or a payment server 710. The payment relay module 1841 is capable of performing an offline payment via a communication module (e.g., an NFC module, an MST module, etc.). In NFC payment, the NFC module may be operated by a POS terminal. In MST payment, the MST module may be operated by a user's input. The payment relay module 1841 is capable of performing an online payment via a communication module (e.g., a cellular module, an RF module, a WI-FI module, etc.).

In an embodiment of the present disclosure, the payment relay module 1841 is capable of performing state management of information regarding a card or information corresponding to a card (e.g., a token), i.e., management of card/token lifecycle. The payment relay module 1841 is capable of providing the payment application 1830 with at least one application programming interface (API) related to payment.

In an embodiment of the present disclosure, the payment relay module 1841 may further include system service interfaces for providing a secure UI for inputting a PIN or primary account number (PAN), a reference to a fingerprint recognition result (e.g., supporting both of secure mode and non-secure mode), TrustZone-based Integrity Measurement Architecture (TIMA) for authenticating kernel integrity, a payment service for access to a payment module, an interface provided by at least one payment-related system services, etc. The payment relay module 1841 is capable of including encryption libraries in order to transmit messages or commands to the TEE 1820. The payment relay module 1841 is capable of exchanging messages or commands with the TEE 1820 via the encryption library.

In an embodiment of the present disclosure, the payment relay module 1841 is capable of including a card management function configured to provide general card management functions such as card addition, card information deletion, replenishment, etc. The payment relay module 1841 is capable of including a first payment software development kit (SDK) or a second payment SDK. The first payment SDK (e.g., Samsung SDK) may be embedded in the electronic device. The second payment SDK may be provided by a card issuing company or a bank and installed to an electronic device. The payment relay module 1841 is capable of selecting one of the first and second payment SDKs, corresponding to card information. Alternatively, the payment relay module 1841 may set a payment card as a default card or may select additionally other cards for payment.

In an embodiment of the present disclosure, the payment relay module 1841 is capable of transmitting, to a payment server 710 (shown in FIG. 7), messages related to general token and key management functions, such as token provisioning, token replenishment, token suspension, token resume, token disposal, etc.

In an embodiment of the present disclosure, the payment module 1821 is capable of obtaining a token and token cryptogram from an electronic device or an external electronic device. In the following description, the token cryptogram is also used in the same sense of cryptogram information, cryptograph, a cryptogram, encryption, and an encrypting method. In an embodiment of the present disclosure, the token cryptogram may contain data for checking the validity of payment transaction. In an embodiment of the present disclosure, the payment module 1821 is capable of including or performing the following functions of a trusted application (TA). For example, the payment module 1821 is capable of transmitting time information regarding the reception to a secure module (e.g., an eSE). In another embodiment, the TA receives track 2 data from the secure module (e.g., an eSE), generates payment verification data, and inserts the generated data into the track 2 data. Keys for generating the token and token cryptogram, e.g., a limited used key (LUK) or a single used key (SUK), may be stored in the REE 1810 or TEE 1820. In order to store the token and the keys in the REE 1810, the payment module of the TEE 1820 encrypts the token and the keys, using a key of the TEE 1820 (e.g., a device root key (DRK)), and stores the encrypted result. When the electronic device makes a payment, the payment relay module 1841 is capable of obtaining a token which is decrypted from the encrypted token by the payment module. When a key or token capable of generating the token cryptogram is stored in the TEE, the electronic device is capable of storing the key or token which is encrypted using the key of the TEE.

In an embodiment of the present disclosure, the payment relay module 1841 is capable of receiving a push message from a TSP 730 (shown in FIG. 7) and transmitting the received message to the payment application.

In an embodiment of the present disclosure, in a state where a first payment SDK (provided from a card issuing company or a bank) provides its token management function, when the payment relay module 1841 receives a token management function request, it may relay the received request to the second payment SDK. For example, when the payment relay module obtains a token or key via an SDK of a Visa® card, it may transmit the token or key to the payment module of the TEE 1820 via a Samsung SDK. In an embodiment of the present disclosure, the payment relay module 1841 is capable of including, in a payment framework, a host card emulation (HCE) that enables virtual cards in the electronic device to be used for payment, using only software, without a separate hardware device (e.g., a secure module or a secure element (SE)). The HCE function transmits a token and a token cryptogram through a communication module (e.g., NFC), using a message specification related to a POS terminal (reader), e.g., application protocol data unit (APDU).

In an embodiment of the present disclosure, the payment relay module 1841 is capable of including a function for processing messages received from a POS terminal. The POS related message processing function may include a function for managing payment data to respond to the POS terminal. When the first payment SDK is equipped with a function for processing its POS related message, the POS related message analysis function may further include a function for relaying the POS related message to the first payment SDK. In an embodiment, the payment relay module 1841 is capable of including at least one database for storing the card data, token data, transaction data, etc.

In an embodiment of the present disclosure, the payment relay module 1841 is capable of selecting an NFC payment mode and/or an MST payment mode when making a payment. For example, the payment relay module 1841 may perform a payment in: an NFC payment mode first and then MST payment mode; an MST payment mode first and then NFC payment mode; or both NFC and MST payment modes simultaneously. In an embodiment of the present disclosure, when payment is performed by two communication modules one after another, this is a case that: when the payment relay module does not have a response from one communication module that has first performed a payment or when a preset period of time has elapsed since the payment by one communication module, payment is performed by another communication module.

In an embodiment of the present disclosure, when the payment relay module 1841 has token information and PAN information regarding a single card (the same card), payment may be performed using the token information and/or the PAN information. The payment relay module is capable of determining whether a POS terminal can perform a payment using a PAN or a token. For example, when the electronic device receives information that the POS terminal can use for payment via BLE, the payment relay module is capable of detecting the received information. When the payment relay module ascertains, based on the detected information, that payment can be performed using a token, it performs a payment using the token. Alternatively, when the payment relay module ascertains that payment can be performed using a PAN, it performs a payment using the PAN.

In an embodiment of the present disclosure, the payment relay module 1841 is capable of further including an SDK provided by a payment network. The SDK may include a token management, a POS related message process, or a token/card database.

In an embodiment of the present disclosure, the secure environment relay module 1846 is capable of further including a relay function that enables a payment application to access a biometric information driver module 1851 or a secure environment driver module 1853 in order to use functions provided by a payment module 1821 or a biometric module 1825. The payment relay module 1841 is capable of including an encryption library in order to transmit messages or commands to the secure environment relay module 1846. The payment relay module 1841 is capable of transmitting/receiving messages or commands to/from the secure environment relay module 1846 via the encryption library.

In various embodiments of the present disclosure, the payment manager 1840 is capable of further including a secure environment relay module 1846 which allows a payment application to use functions of a secure identifier process module of the TEE.

In an embodiment of the present disclosure, the payment relay module 1841 is capable of including a function for relaying an authentication request to the secure identifier process module 1823 of the TEE 1820, via a PIN of the payment application 1830. A detailed description is explained below while referring to FIG. 22.

When fingerprint recognition is requested, a general application is capable of obtaining the success or failure of fingerprint recognition. A trusted payment application (payment trusted app) is capable of obtaining a secure biometric result (e.g., a secure fingerprint result). The secure biometric result may have a form which is generated as a one-time random number and a success/failure are combined with each other and the combination is encrypted. The one-time random number may be encrypted through a hardware key of the TEE 1820, e.g., a device root key (DRK).

In an embodiment of the present disclosure, in order to perform a payment, the payment relay module 1841 is capable of transmitting a message commanding payment to the payment module 1821, via a secure environment driver module 1853. The payment module 1821 is capable of notifying the payment relay module 1841 that an authentication process needs to be performed, via the secure environment driver module 1853. In order to perform an authentication process, the payment relay module 1841 is capable of commanding the biometric sensor 240I (shown in FIG. 2) to obtain biometric information, via the biometric management module 1843 and the biometric information driver module 1851. In addition, the payment relay module 1841 is capable of transmitting an authentication acknowledgement message to the biometric module 1825 of the TEE 1820, via the biometric management module 1843 and the secure environment driver module 1853. The biometric sensor 240I is capable of obtaining biometric information via the biometric module 1825 of the TEE 1820. The biometric module 1825 compares a user's stored biometric information with the information obtained by the biometric sensor and determines the identity of user. When the biometric module 1825 transmits the authentication result to the biometric management module 1843 via the secure environment driver module 1853, based on the identified information, the biometric management module 1843 transmits the authentication result to the payment relay module 1841. It should be understood that the payment relay module 1841 and the biometric management module 1843 may be configured into a single module or separate individual modules.

In an embodiment of the present disclosure, the payment relay module 1841 is capable of performing authentication via an external device. For example, the electronic device may request authentication on biometric information (e.g., fingerprint, iris, etc.) from a payment server 720 (e.g., Samsung account server or token requester server). The payment server 720 performs authentication on a user's biometric information and transmits the authentication result to the electronic device. After the authentication has been completed, the payment relay module 1841 transmits data containing authentication complete to the token service provider, thereby performing a token provisioning process. When the authentication has been completed, the electronic device may perform a payment based on the authentication result. On the other hand, when the authentication has not been completed or the authentication failed, the electronic device may not perform a payment.

In an embodiment of the present disclosure, the kernel 1850 is capable of including a biometric information driver module 1851 and a secure environment driver module 1853. The biometric information driver module 1851 is capable of transmitting messages received from the biometric management module 1843 of the payment manager 1840, to the biometric sensor 240I (shown in FIG. 2). The biometric information obtained by the biometric sensor may be transmitted to the biometric module 1825 of the TEE 1820, but not to modules of the REE 1810, via the biometric information driver module.

In an embodiment of the present disclosure, the secure environment driver module 1853 serves as an interface between modules of the REE 1810 and modules of the TEE 1820. For example, when the TEE is ARM TrustZone, the application processor runs operations of the REE and TEE in a time-divisional manner. In this case, a data path may be implemented in hardware to transmit messages from the REE to the TEE. In this case, a driver module to access hardware may be the secure environment driver module 1853. The secure environment driver module 1853 is capable of transmitting messages related to operations of the modules in the TEE to the modules of the REE.

In an embodiment of the present disclosure, the TEE is capable of including a payment module 1821, a secure identifier process module 1823, a biometric module 1825, and an MST driver module 1827. The electronic device 701 is capable of storing data that needs a relatively high level of security in a safe environment via the TEE 1820 and performing corresponding operations. The TEE 1820 runs on an AP of the electronic device. A reliable TEE that is determined in the process of manufacturing electronic devices may refer to a secure world in the electronic devices. The electronic device may process data that needs a relatively high level of security via a TEE, based on the safe hardware architecture. The TEE may run an AP and a memory area in a normal world and a secure world. In addition, the TEE enables hardware or software that needs security to run in only a secure world. When the electronic device needs to perform operations related to information susceptible to the REE 1810, it may access to the TEE 1820 via only an API and drivers which are capable of accessing the TEE 1820. The TEE 1820 may hand over data, limited to related information, to the REE. The TEE is capable of encrypting internally stored data, via a hardware key, e.g., a device root key (DRK). The internal data of the TEE may not be analyzed in the REE without the use of an additional decoding process.

The application in the TEE 1820 (e.g., trusted application, payment module, etc.) is capable of transmitting messages to an external electronic device (e.g., a token service provider 730 shown in FIG. 7).

In an embodiment of the present disclosure, the TEE is capable of including a trusted OS and a trusted application. In addition, the TEE is capable of further including a security-related encryption module, drivers capable of collecting data from hardware that needs security, etc. The trusted application is capable of including a payment module. The trusted application is capable of transmitting payment information to the outside via the communication module. For example, the trusted application is capable of transmitting: payment information to an MST controller (MST control module 830 shown in FIG. 8) via an MST driver; or an NFC controller (NFC control module 840) via an NFC driver, so that the controller can transmit the payment information to a POS terminal.

In an embodiment of the present disclosure, the integrity of the REE 1810 is checked. The electronic device is capable of storing, in the TEE 1820, the verification of the integrity of an image of the REE. In the REE booting process that supports the TEE, when the boot loader is executed, it is capable of booting the TEE and then the REE. When the TEE is booted, the boot loader detects the integrity of the REE in the TEE and then informs the user of the integrity after the REE has been booted. In an embodiment of the present disclosure, when the REE is attacked by hacking, rooting, etc., and its image is damaged, the integrity on the image is impaired. When the integrity on the image is impaired, access to the TEE is blocked. For example, when the payment relay module 1841 needs to transmit a message or command to the TEE via the secure environment driver module 1853, the kernel of the TEE may ignore the message or command or may reject to receive the message.

In an embodiment of the present disclosure, the payment module 1821 may be an application installed by a bank, a card issuing company (e.g., Visa® card, Master® card, etc.), etc. The payment module may be configured with one or more payment modules. When an electronic device is attached to a payment server 720 (e.g., a mobile application platform, a payment gateway, a token requestor, a token service provider, a trusted service manager, a bank server, etc.) or a token service provider 730, over the Internet, using the payment management module 1831, and approves of the installation of the payment module 1821, the token service provider 730 is capable of performing operations related to the installation. For example, the payment management module 1831 obtains the card number and the expiration date of a plastic card via the OCR and performs a card registration operation in order to install the payment module 1821 to the server. When an electronic device: connects to the token service provider 730 in the network, via the payment relay module 1841 that has connection information regarding individual token service providers 730 according to cards/banks; and downloads the installation files from the provider, the payment relay module 1841 transmits the information to the TEE and installs the payment module 1821 therein. This process is called a provisioning process or a card registration process. The payment module 1821 of the TEE may be configured with a number of payment modules. The individual payment modules may be configured in such a way that they do not exchange data with each other in the TEE and are separated from each other.

In an embodiment of the present disclosure, the payment module 1821 may be an application to use for data communication with the payment server 720. The payment module may contain information regarding various types of cards, such as a credit card, a debit card, a membership card, etc. The payment module is capable of exchanging communication data with external electronic devices through the encryption process. The encryption process may vary depending on card manufacturing companies which transmit the payment module. The server is capable of controlling the status of the payment module. For example, the server is capable of performing the activation, suspension, resumption, or disposal of the payment module.

In an embodiment of the present disclosure, the payment module 1821 is capable of storing information related to card information. For example, the card information may be at least one of a token corresponding to a primary account number (PAN), a token reference ID, part of the PAN, a PAN product ID, a token requestor ID, a token assurance level, token assurance data, an expiration date of a token, an encryption key, and a value provided by a token service provider 730, e.g., a one-time password (OTP). The token may be controlled by conditions of the token service provider 730. For example, a token may be activated, suspended, resumed, or disposed. The token may be static information corresponding to card information (e.g., PAN).

In an embodiment of the present disclosure, when payment is performed, the payment module 1821 may determine a card to make a payment. For example, a payment module corresponding to a user's selected card may be determined from among one or more payment management modules 1831. The payment management module is capable of transmitting information regarding the determined card to the payment relay module 1841. The payment relay module 1841 is capable of transmitting the determined card information to the payment module 1821 via the secure environment driver module 1853. The payment module is capable of managing a list of cards which are actually used for payment, from the cards whose information is stored therein. The payment module is capable of changing the list of cards which are actually used for payment, based on the determined card information. The change of a list of cards may refer to a process of increasing the priority of the determined card in the card list or a process of deleting information regarding cards except for the determined card.

In an embodiment of the present disclosure, when payment is performed, the payment module is capable of generating information to be used for payment, based on the information related to card information. The information to be used for payment may be a token, a token reference ID, part of the PAN, a PAN product ID, a token requestor ID, a token assurance level, a token assurance data, an expiration date of a token, a token cryptogram, a POS entry mode, a token requestor indicator, etc., as described in the following Table 3.

TABLE 3

| Field Name | Comment |
| --- | --- |
| Payment Token | The Payment Token number refers to a surrogate value for a PAN that is a 13 to 19-digit numeric value that passes basic validation rules of an account number, including the Luhn check digit. Payment Tokens are generated within a BIN range or Card range that has been designated as a Token BIN Range and flagged accordingly in all appropriate BIN tables. Payment Tokens are generated such that they will not have the same value as or conflict with a real PAN. Transaction messages The Payment Token number will be passed through the authorization, capture, clearing, and exception messages in lieu of the PAN. The Payment Token number may optionally be passed from the Token Service Provider to the Card Issuer as part of the authorization request. |
| Token Expiry Date | The expiration date of the Payment Token that is generated by and maintained in the Token Vault. The Token Expiry Date field carries a 4-digit numeric value that is consistent with the ISO 8583 format. Transaction messages The Token Expiry Date is passed in lieu of PAN Expiry Date. The value is replaced by the Token Service Provider with the PAN Expiry Date which is then passed to the Card Issuer as part of the authorization request. |
| Last 4 Digits of PAN | The last four digits of the PAN to be provided optionally through the Acquirer to the Merchant for customer service usage such as being printed on the consumer receipt. |
| PAN Product ID | The last four digits of the PAN to be provided optionally through the Acquirer to the Merchant for customer service usage such as being printed on the consumer receipt. |
| PAN Product ID | The PAN Product ID is an optional identifier used for determining the type of Card product that was tokenized. It may be included in cases where transparency of this information is necessary. Transaction messages The PAN Product ID may optionally be passed from the Token Service Provider to the Acquirer as part of the authorization response. |
| POS Entry Mode | This specification uses the POS Entry Mode field to indicate the mode through which the Payment Token is presented for payment. Each Payment Network will define and publish any new POS Entry Mode values as part of its existing message specifications and customer notification procedures. Transaction messages POS Entry Mode is an existing field that will be passed through the authorization, capture, clearing, and exception messages. |
| Token Requestor ID | This value uniquely identifies the pairing of Token Requestor with the Token Domain. Thus, if a given Token Requestor needs Tokens for multiple domains, it will have multiple Token Requestor IDs, one for each domain. It is an 11-digit numeric value assigned by the Token Service Provider and is unique within the Token Vault: Positions 1-3: Token Service Provider Code, unique to each Token Service Provider |

TABLE 3-continued

| Field Name | Comment |
| --- | --- |
| | Positions 4-11: Assigned by the Token Service Provider for each requesting entity and Token Domain<br>Transaction messages<br>Token Requestor ID can be optionally passed through the authorization, capture, clearing, and exception messages. |
| Token Assurance Level | Token Assurance Level is a value that allows the Token Service Provider to indicate the confidence level of the Payment Token to PAN/Cardholder binding. It is determined as a result of the type of ID & V performed and the entity that performed it. The Token Assurance Level is set when issuing a Payment Token and may be updated if additional ID & V is performed. It is a two-digit value ranging from 00 which indicates the Payment Token has no ID & V that has been performed to a value of 99 indicating the highest possible assurance. The specific method to produce the value is defined by the Token Service Provider.<br>Transaction messages<br>Token Assurance Level will be provided by the Token Service Provider.<br>The value may be optionally passed to the Card Issuer as part of the authorization request.<br>The value may optionally be passed to the Acquirer/Merchant in the authorization response, capture, clearing, and exception processing messages. |
| Token Assurance Data | This data provided by the Token Service Provider contains supporting information for the Token Assurance Level.<br>Transaction messages<br>This data may be optionally passed to the Card Issuer as part of the authorization request. |
| Token Cryptogram | This cryptogram is uniquely generated by the Token Requestor to validate authorized use of the Token. The cryptogram will be carried in different fields in the transaction message based on the type of transaction and associated use case:<br>NFC contactless transactions will carry the Token Cryptogram in existing chip data fields.<br>Other transactions, such as those originating from a digital wallet, may carry the Token Cryptogram in an existing field.<br>Transaction messages<br>The Token Cryptogram will be passed in the authorization request and validated by the Token Service Provider and/or the Card Issuer. |
| Token Request Indicator | An indicator used to indicate that the message is intended to authenticate the Cardholder during a Payment Token Request. |

In an embodiment of the present disclosure, the payment module 1821 is capable of receiving a key (e.g., limited used key (LUK) or single used key (SUK)) which is used to generate a token cryptogram via a token service provider 730 or a payment server 720 (e.g., a payment service server or a token requester server). The payment module 1821 is capable of receiving the key via a data network, SMS, etc.

The electronic device and the token service provider 730 exchange the key with each other via a secure channel. The secure channel may be a logical channel through which data, encrypted by another key (e.g., a public key, a private key) that differs from the key, is transmitted. In addition, the payment module is capable of further including a module for generating a key used to generate a token cryptogram. The electronic device is capable of receiving the module for generating the key, via the token service provider 730 or the payment server 720. Alternatively, the module for generating the key may be embedded into electronic devices in the process of manufacturing the electronic devices.

In an embodiment of the present disclosure, the payment module is capable of generating a token cryptogram by using a key (e.g., limited used key (LUK) or single used key (SUK)) which is used to generate a token cryptogram. The payment module may use different keys according to preset rules, such as each transaction, a transaction of a certain number of times, transaction within a period of time, etc.

The token service provider 730 has keys which form a pair with the key described above. The token service provider 730 is capable of decrypting the encrypted token cryptogram using the keys forming a pair.

In an embodiment of the present disclosure, the payment module 1821 is capable of generating a token cryptogram using a key which is used to generate a token cryptogram. A detailed description is explained below while referring to FIG. 46.

In an embodiment of the present disclosure, when the electronic device performs a payment, the payment application transmits a message, indicating that it is going to make a payment, to the payment relay module 1841. The payment relay module 1841 determines whether it makes a payment in an MST mode or NFC mode. When the payment relay module 1841 determines to make a payment in an MST mode, it obtains information required for payment (e.g., a token, a token cryptogram, payment verification data, part of PAN, an expiration date of a token, etc.) from the payment module of the TEE and transmits the obtained information to the MST driver module 1827 in the TEE. The MST driver module 1827 transmits the received information to the MST controller. The MST controller is capable of performing the transmission of the information in order to perform a payment. The MST driver module 1827 is capable of including functions of driver modules of the MST shown in FIGS. 32 to 35.

In an embodiment of the present disclosure, the information is transmitted to the payment application 1830.

In an embodiment of the present disclosure, when the payment relay module determines to make a payment in an NFC mode, the electronic device is capable of transmitting information required for payment to the NFC driver module of the TEE. The NFC driver module transmits information required for payment to the NFC controller. The NFC controller performs a payment based on the information.

In an embodiment of the present disclosure, when the electronic device performs a payment in an NFC mode, it receives, from a POS terminal, a message designated by the POS terminal, and then makes a payment. For example, when the NFC module detects a message designated by a POS terminal 750, the NFC controller transmits the detected message to the NFC driver module. The NFC driver module transmits the message received from the POS terminal to the payment relay module 1841 of the REE. The payment relay module 1841 generates a token cryptogram to make a payment. The payment module 1821 of the TEE generates the token cryptogram using a key (e.g., limited used key (LUK) or single used key (SUK)) which is used to generate a token cryptogram. The generated token cryptogram is transmitted to the REE. The payment relay module 1841 transmits payment-related information containing the token cryptogram and the token via a network module (e.g., an NFC related host card emulation module). The network module transmits the payment-related information to the POS terminal via the NFC module.

In an embodiment of the present disclosure, the payment module is capable of transmitting, to an electronic device, information containing the token, an expiration date of a token, a token requestor ID, a token cryptogram, etc. For example, the payment module is capable of transmitting the payment information to the POS terminal 750 via the MST communication module. Alternatively, the payment module is also capable of transmitting the payment information to the POS terminal via the NFC communication module.

In an embodiment of the present disclosure, the payment module is capable of transmitting/receiving information designated for payment to/from the POS terminal 750. In case of payment in NFC mode, the POS terminal first receives the designated information from the payment module and then performs a payment. In case of payment in MST mode, the payment module transmits/receives payment-related information containing a token cryptogram and a token to/from the POS terminal, based on a user's explicit input or an algorithm of the electronic device.

In an embodiment of the present disclosure, the biometric module 1825 is capable of storing an electronic device user's biometric information and comparing the stored biometric information with information detected by the biometric sensor to authenticate the user. Examples of the biometric module 1825 are a fingerprint information module, an iris information module, etc. The biometric module 1825 is capable of collecting information via a biometric sensor 240I. When the payment application shows a message requesting to authenticate a user's biometric information on the display 160, the user may input his/her biometric information to the biometric sensor. The authentication module of the payment application enables the biometric management module to transmit a command to collect biometric information to the biometric information driver module 1851. The biometric information driver module 1851 transmits the received message to the biometric sensor. The biometric sensor collects biometric information and transmits the collected information to the TEE. The biometric module of the TEE compares a user's stored biometric information with the collected biometric information, and transmits the authentication result to the authentication module of the payment application, via the secure environment driver module, via the biometric management module in the REE. The payment application shows the authentication result on the display. The user's biometric information may be stored: in the TEE; in an encrypted format in the REE; or in a secure module 236 (e.g., an eSE).

In an embodiment of the present disclosure, the secure identifier process module 1823 obtains an input value, required by the electronic device or related to authentication for payment, from a user's inputs. For example, the input value may be a personal identification number (PIN) used when payment is performed. The input value may also be card-related information, e.g., a primary account number (PAN), an expiration date, a card verification value (CVV), a Chip PIN, automated teller machine (ATM) PIN, etc. The secure identifier process module 1823 may be displayed as in a form of application. TEE 1820 may store a graphic library required to show the application of the secure identifier process module on the screen. The graphic library stored in the TEE may differ from that stored in the REE 1810. The secure identifier process module authenticates a user based on an input value, such as a PIN, etc., and transmits the authentication result to the payment management module 1831 via the payment relay module 1841. In an embodiment of the present disclosure, the secure environment relay module 1846 is capable of receiving an encrypted one-time random number (e.g., nonce) via the secure environment driver module 1853. The secure identifier process module 1823 encrypts the one-time random number and the input value obtained according to a user's input, using an encryption key of the TEE (e.g., a device root key), and transmits the encrypted result to the secure environment relay module 1846. The secure environment relay module is capable of transmitting the encrypted, one-time random number and the encrypted, input value to the payment module 1821 via the secure environment driver module 1853. The payment module is capable of decrypting the encrypted, one-time random number and the encrypted, input value, using a hardware key of the TEE. When the payment module ascertains that the received value is identical to the generated value of the one-time random number, it ascertains that the input value transmitted via the REE has the integrity. The payment module is capable of performing user authentication, using the input value which is of integrity. The payment module performs a payment based on the result of user authentication. In an embodiment of the present disclosure, a factory reset refers to a process for restoring a software image of an electronic device to its original manufacturing settings. The factory reset may be performed in an electronic device as the electronic device user executes a corresponding application. Alternatively, in a state where an electronic device is equipped with a module for monitoring a hacking attack, when the module ascertains that the electronic device has a hacking attack based on a preset condition (e.g., when ascertaining that a system has a hacking attack), it may perform the factory reset in the electronic device. When the factory reset is performed, data stored on the electronic device is reset, and thus a user's payment-related information may also be erased. The payment-related information may be stored in the payment server 720. When the user logs in the payment server 720 with his/her account, he/she needs to perform registration of cards and installation of payment modules, again, based on the payment-related information. When a factory reset is performed in an electronic device, the payment-related module stored in the electronic device is notified to the token service provider 730 via the payment server 720 and is inactivated in the token service provider 730. When a network of the electronic device is inactivated, the notification process may not be performed. In this case, the electronic device performs a factory reset and accesses to the payment server 720 based on the account. The electronic device is capable of ascertaining a list of registered cards via the payment server, and inactivating a token or a card module of the electronic device, registered in the token service provider 720, via the payment server 720. The electronic device is capable of performing card registration and receiving a token or a payment module, again, based on a card list of the payment server 720.

Figure 19:
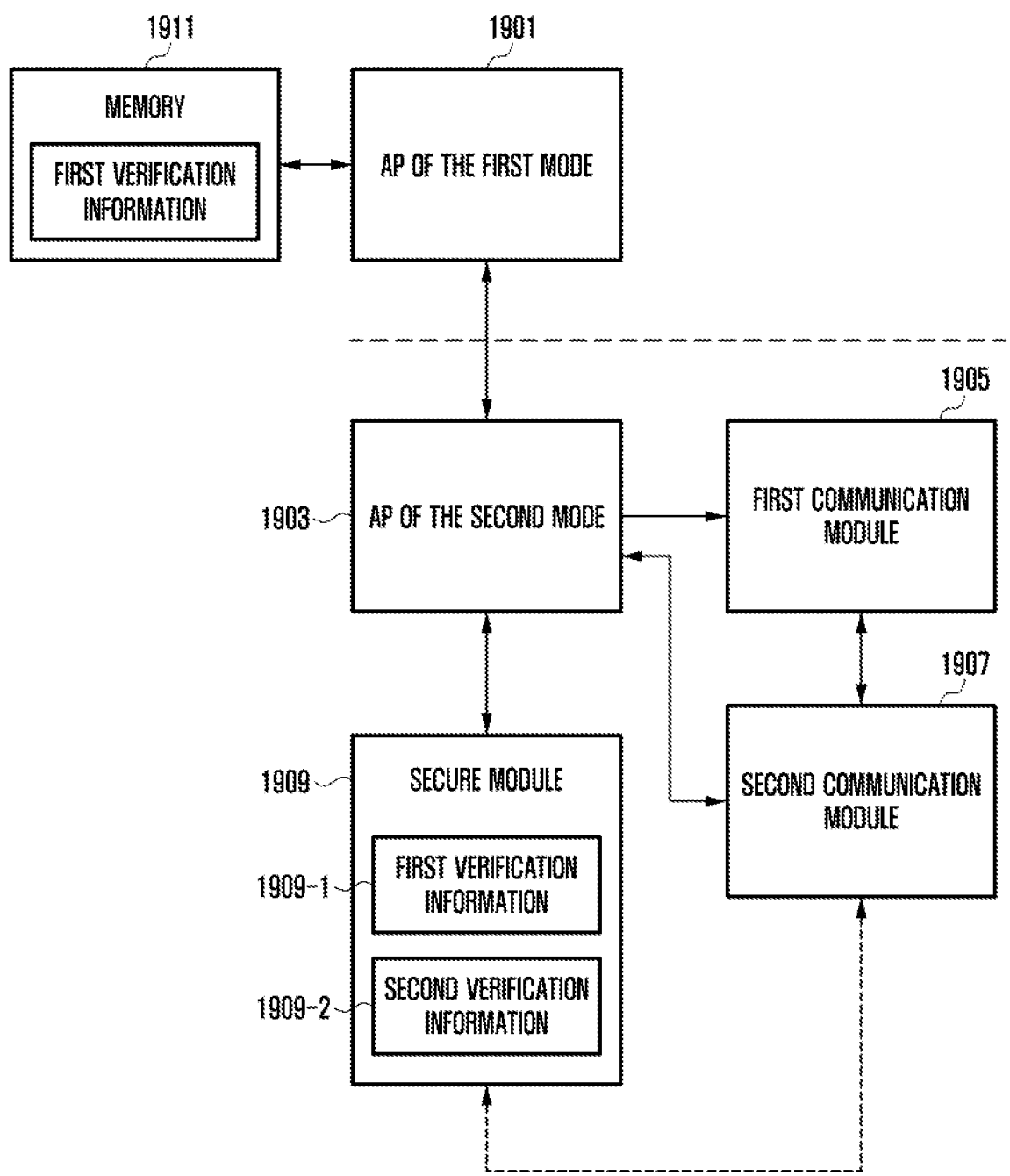
FIG. 19 is a block diagram showing interfaces between components in an electronic device according to various embodiments of the present disclosure.

FIG. 19 is a block diagram showing interfaces between components in an electronic device according to an embodiment of the present disclosure.

Referring to FIG. 19, an AP 1901 of a first mode and an AP 1903 of a second mode may correspond to the processor 1200 shown in FIG. 12; a first communication module 1905 may correspond to the first communication module 1210 shown in FIG. 12; and a second communication module 1907 may correspond to the second communication module 1212 shown in FIG. 12. The AP 1901 of the first mode may be the processor 1200 running in the normal world (e.g., REE), and the AP 1903 of the second mode may be the processor 1200 running in the secure world (e.g., TEE). In various embodiments of the present disclosure, the AP 1901 of the first mode and the AP 1903 of the second mode may be implemented into a single processor or as separate processors.

In various embodiments of the present disclosure, the first communication module 1905 may be an MST module (e.g., MST module 810 shown in FIG. 8). The second communication module 1907 may be an NFC module (e.g., NFC module 820). The secure module 1909 may be an embedded secure element (eSE).

The first communication module 1905 and the second communication module 1907 may be functionally or operatively connected to the AP 1903 of the second mode. The secure module 1909 may be electrically connected to the second communication module 1907 or the AP 1903 of the second mode.

The AP 1901 of the first mode is capable of executing and processing a corresponding application in the normal world.

The AP 1903 of the second mode is capable of executing and processing applications required for security (e.g., digital rights management (DRM), a payment application, an application for processing business information, and an application related to bank jobs) in the secure world. All the secure functions including a function for interfacing with a safe peripheral may be executed in the secure world. Although the embodiment is implemented in such a way that the AP 1901 of the first mode and the AP 1903 of the second mode are separated as shown in FIG. 19, it should be understood that the APs 1901 and 1903 may be implemented into a single processor and the normal world and the secure world may run in a time sharing manner.

The AP 1901 of the first mode is capable of detecting a first authentication service transaction and transmitting an authentication service transaction command to the AP 1903 of the second mode.

The AP 1903 of the second mode is capable of transmitting the authentication transaction command and first verification information 1909-1 to the first communication module 1905. The AP 1903 of the second mode is capable of accessing the secure module 1909 and obtaining the first verification information 1909-1. The AP 1903 of the second mode is capable of receiving an authentication result corresponding to second verification information 1909-2 from the second communication module 1907 and controlling the display module 1208 (shown in FIG. 12) to display the authentication result thereon.

In various embodiments of the present disclosure, when the AP 1903 of the second mode receives a request for the second verification information 1909-2 from the second communication module 1907, it is capable of obtaining the second verification information 1909-2 from the secure module 1909 and transmitting the obtained information to the second communication module 1907.

When receiving the authentication service transaction command and the first verification information 1909-1 from the AP 1903 of the second mode, the first communication module 1905 is capable of processing and transmitting the first verification information 1909-1 to the POS terminal.

When the electronic device approaches or contacts the POS terminal, the second communication module 1907 is capable of detecting a second authentication service transaction and obtaining the second verification information 1909-2 from the secure module 1109. The second communication module 1907 is capable of processing and transmitting the second verification information 1909-2 to the POS terminal. The second communication module 1907 is capable of receiving a feedback of the authentication result and providing the result to the AP 1903 of the second mode.

In various embodiments of the present disclosure, when the electronic device approaches or contacts the POS terminal, the second communication module 1907 is capable of requesting and receiving the second verification information 1909-2 from the AP 1903 of the second mode.

The secure module 1909 may be a storage space which can be accessed only by the second communication module 1907 or the AP 1903 of the second mode but cannot be accessed by the AP 1901 of the first mode or the first communication module 1905. In the embodiment, the secure module 1909 is capable of storing the first verification information 1909-1 for near field magnetic stripe data transmission and the second verification information 1909-2 for NFC.

In various embodiments of the present disclosure, the first verification information 1909-1 may be stored in a normal memory 1911 electrically connected to the AP 1901 of the first mode.

Figure 20:
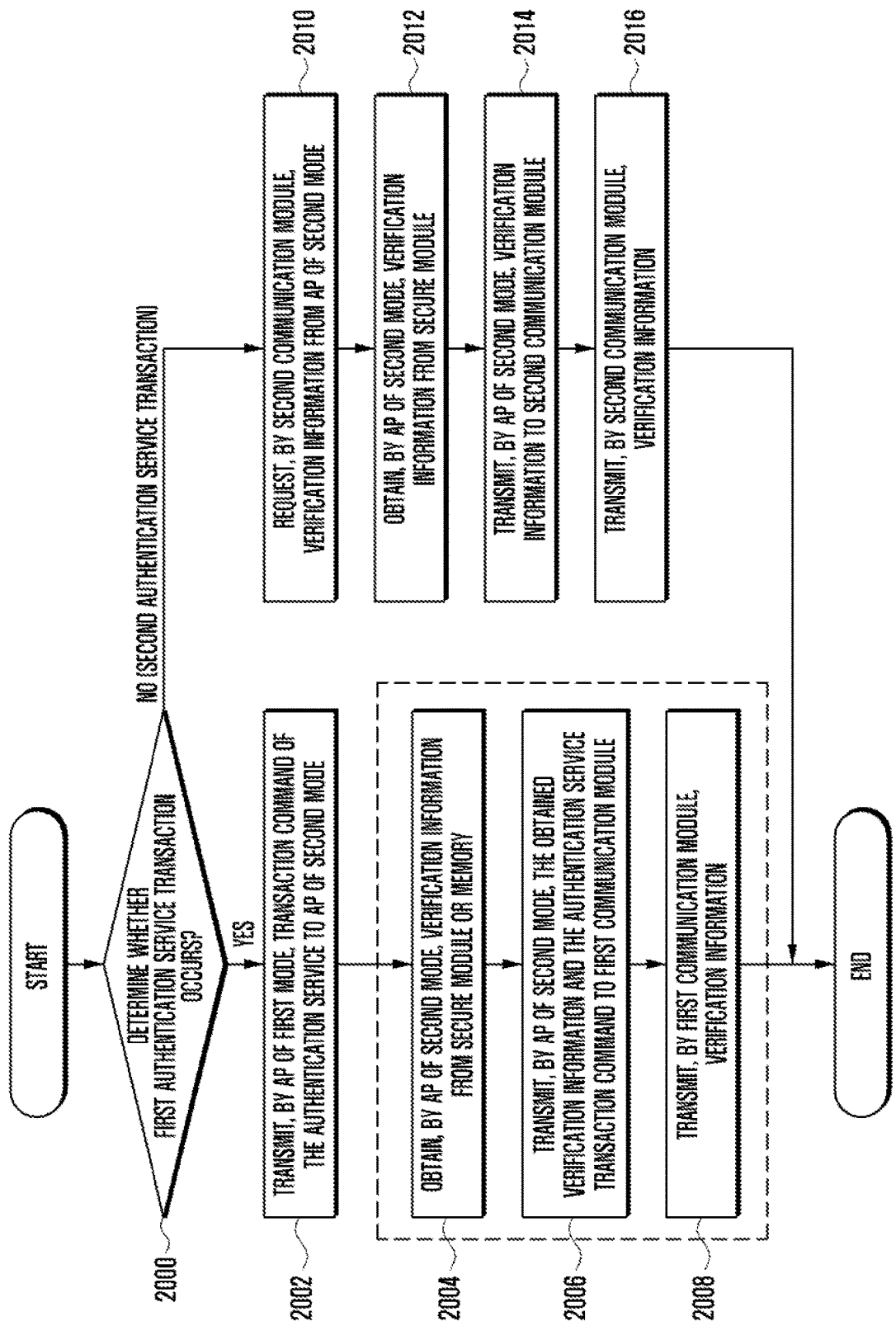
FIG. 20 is a flowchart that describes operations of an electronic device including a number of communication modules for mobile payment services, according to various embodiments of the present disclosure.

FIG. 20 is a flowchart that describes operations of an electronic device including a number of communication modules for short-range mobile payment services, according to an embodiment of the present disclosure.

Referring to FIG. 20, when a transaction of a first authentication service occurs in operation 2000 (e.g., determining whether a first authentication service transaction occurs), the AP 1901 of the first mode is capable of transmitting a transaction command of the first authentication service to the AP 1903 of the second mode in operation 2002.

The AP 1903 of the second mode is capable of obtaining verification information for the payment settlement from the secure module 1909 and/or the memory 1911 in operation 2004.

The AP 1903 of the second mode is capable of transmitting the obtained, first verification information for payment settlement and the transaction command of the first authentication service to the first communication module 1905 in operation 2006.

The first communication module 1905 is capable of processing and transmitting the verification information in operation 2008.

On the other hand, when a second authentication service transaction occurs in operation 2000, the second communication module 1907 is capable of requesting verification information for payment settlement from the AP 1903 of the second mode in operation 2010.

The AP 1903 of the second mode is capable of obtaining the verification information for payment settlement from the secure module 1909 in operation 2012.

The AP 1903 of the second mode is capable of transmitting the obtained verification information for payment settlement to the second communication module 1907 in operation 2014.

The second communication module 1907 is capable of transmitting the verification information in operation 2016.

In various embodiments of the present disclosure, when the second authentication service transaction occurs in operation 2000, the second communication module 1907 may obtain the verification information for payment settlement directly from the secure module 1909, and perform the transmission of the verification information.

In various embodiments of the present disclosure, when the AP 1901 of the first mode transmits the transaction command of the first authentication service to the AP 1903 of the second mode, the AP 1903 of the second mode may transmit the first authentication service transaction command to the first communication module 1905 and receive the request for the verification information for payment settlement from the first communication module 1905, which will be described below referring to FIG. 21, instead of obtaining the verification information for payment settlement directly from the secure module 1909.

Figure 21:
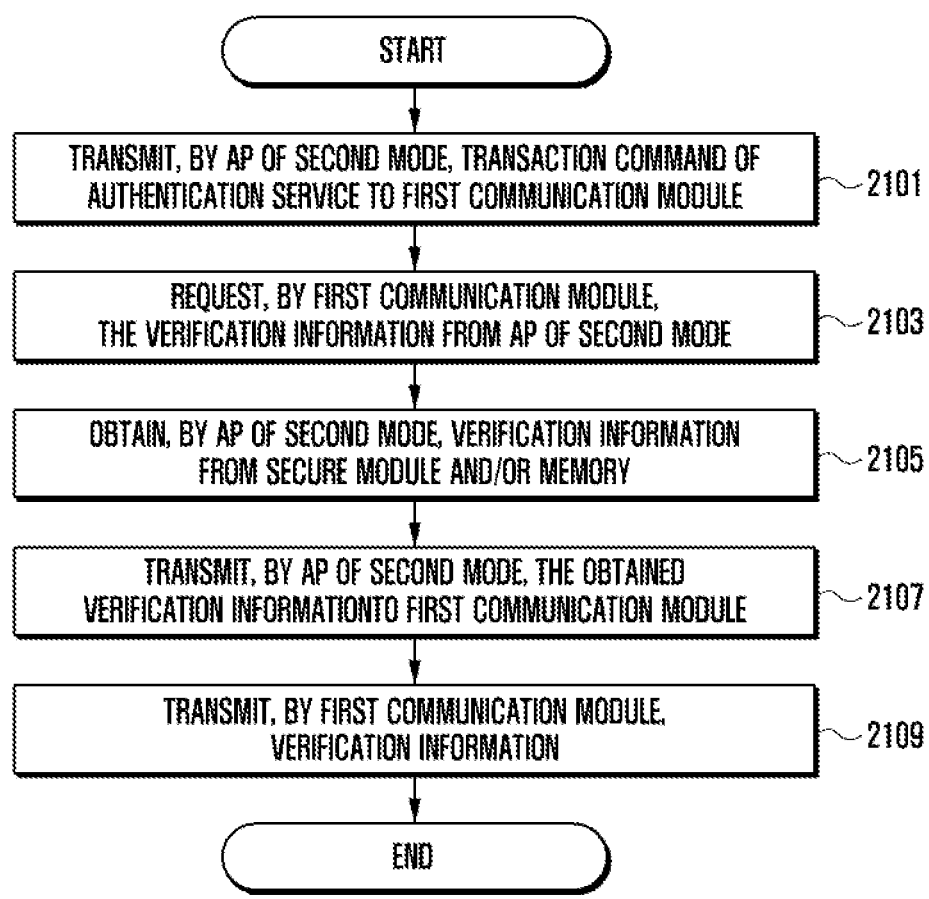
FIG. 21 is a flowchart that describes another example of operations of an electronic device including a number of communication modules for mobile payment services, according to various embodiments of the present disclosure.

FIG. 21 is a flowchart that describes another example of operations of an electronic device including a number of communication modules for short-range mobile payment services, according to an embodiment of the present disclosure.

Referring to FIG. 21, when the AP 1901 of the first mode transmits the transaction command of the first authentication service to the AP 1903 of the second mode, the AP 1903 of the second mode is capable of transmitting the transaction command of the first authentication service to the first communication module 1905 in operation 2101.

The first communication module 1905 is capable of requesting the verification information for payment settlement from the AP 1903 of the second mode in operation 2103.

The AP 1903 of the second mode is capable of obtaining the verification information for payment settlement from the secure module 1909 and/or the memory 1911 in operation 2105.

The AP 1903 of the second mode is capable of forwarding or transmitting the obtained verification information for payment settlement to the first communication module 1905 in operation 2107.

The first communication module 1905 is capable of transmitting the verification information in operation 2109.

Figure 22:
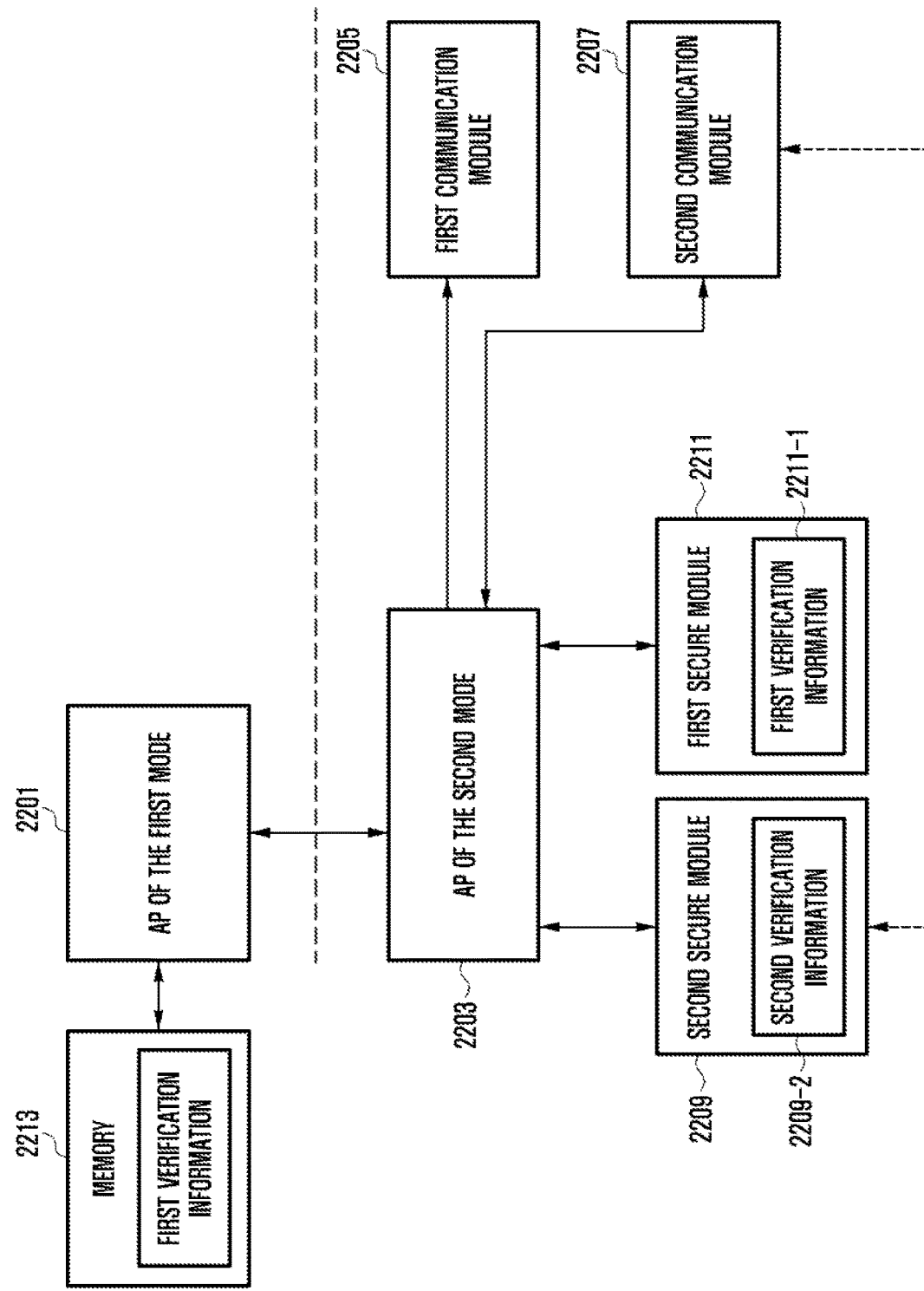
FIG. 22 is a block diagram showing interfaces between components in an electronic device according to various embodiments of the present disclosure.

FIG. 22 is a block diagram showing interfaces between components in an electronic device according to various embodiments of the present disclosure.

Referring to FIG. 22, an AP 2201 of a first mode and an AP 2203 of a second mode may correspond to the processor 1200 shown in FIG. 12, a first communication module 2205 may correspond to the first communication module 1210 shown in FIG. 12, and a second communication module 2207 may correspond to the second communication module 1212 shown in FIG. 12. The AP 2201 of the first mode may be the processor 1200 running in the normal world (e.g., REE), and the AP 2203 of the second mode may be the processor 1200 running in the secure world (e.g., TEE).

The first communication module 2205 and the second communication module 2207 may be electrically connected to the AP 2203 of the second mode. The second secure module 2209 may be electrically connected to the second communication module 2207 or the AP 2203 of the second mode. The first secure module 2211 may be electrically connected to the AP 2203 of the second mode.

In various embodiments of the present disclosure, with reference to FIGS. 8 and 22, the first communication module 2205 may be an MST module (e.g., MST module 810) and/or an NFC module (e.g., NFC module 820). The second communication module 2207 may be an MST module (e.g., MST module 810) and/or an NFC module (e.g., NFC module 820). The first secure module 2211 may be a first embedded secure element (eSE). The second secure module 2209 may be a second embedded secure element (eSE).

The AP 2201 of the first mode is capable of detecting a first authentication service transaction and transmitting an authentication service transaction command to the AP 2203 of the second mode.

The AP 2203 of the second mode is capable of transmitting the authentication service transaction command and first verification information 2211-1 to the first communication module 2205. The AP 2203 of the second mode is capable of accessing the first secure module 2211 and obtaining the first verification information 2211-1. The AP 2203 of the second mode is capable of receiving an authentication result corresponding to second verification information 2209-2 from the second communication module 2207 and controlling the display module 1208 (shown in FIG. 12) to display the authentication result thereon.

In embodiments, when the AP 2203 of the second mode receives a request for the second verification information 2209-2 from the second communication module 2207, it is capable of accessing the second secure module 2209, obtaining the second verification information 2209-2 therefrom, and transmitting the obtained information 2209-2 to the second communication module 2207.

The first communication module 2205 is capable of: receiving the authentication service transaction command and the first verification information 2211-1 from the AP 2203 of the second mode; processing the first verification information 2211-1; and transmitting the processed result to the POS terminal.

When the electronic device approaches or contacts the POS terminal, the second communication module 2207 is capable of detecting a second authentication service transaction, accessing the second secure module 2209, obtaining the second verification information 2209-2 therefrom, and processing and transmitting the obtained, second verification information 2209-2 to the POS terminal. The second communication module 2207 is capable of receiving a feedback of the authentication result, and providing the result to the AP 2203 of the second mode.

The first secure module 2211 may be a storage space which can be accessed only by the AP 2203 of the second mode. The second secure module 2209 may be a storage space which can be accessed only by the AP 2203 of the second mode and the second communication module 2207. The AP 2201 of the first mode or the first communication module 2205 cannot directly access the first secure module 2211 and the second secure module 2209. The AP 2201 of the first mode or the second communication module 2207 cannot directly access the first secure module 2211.

In various embodiments of the present disclosure, the first verification information may be stored in a memory 2213 electrically connected to the AP 2201 of the first mode.

Figure 23:
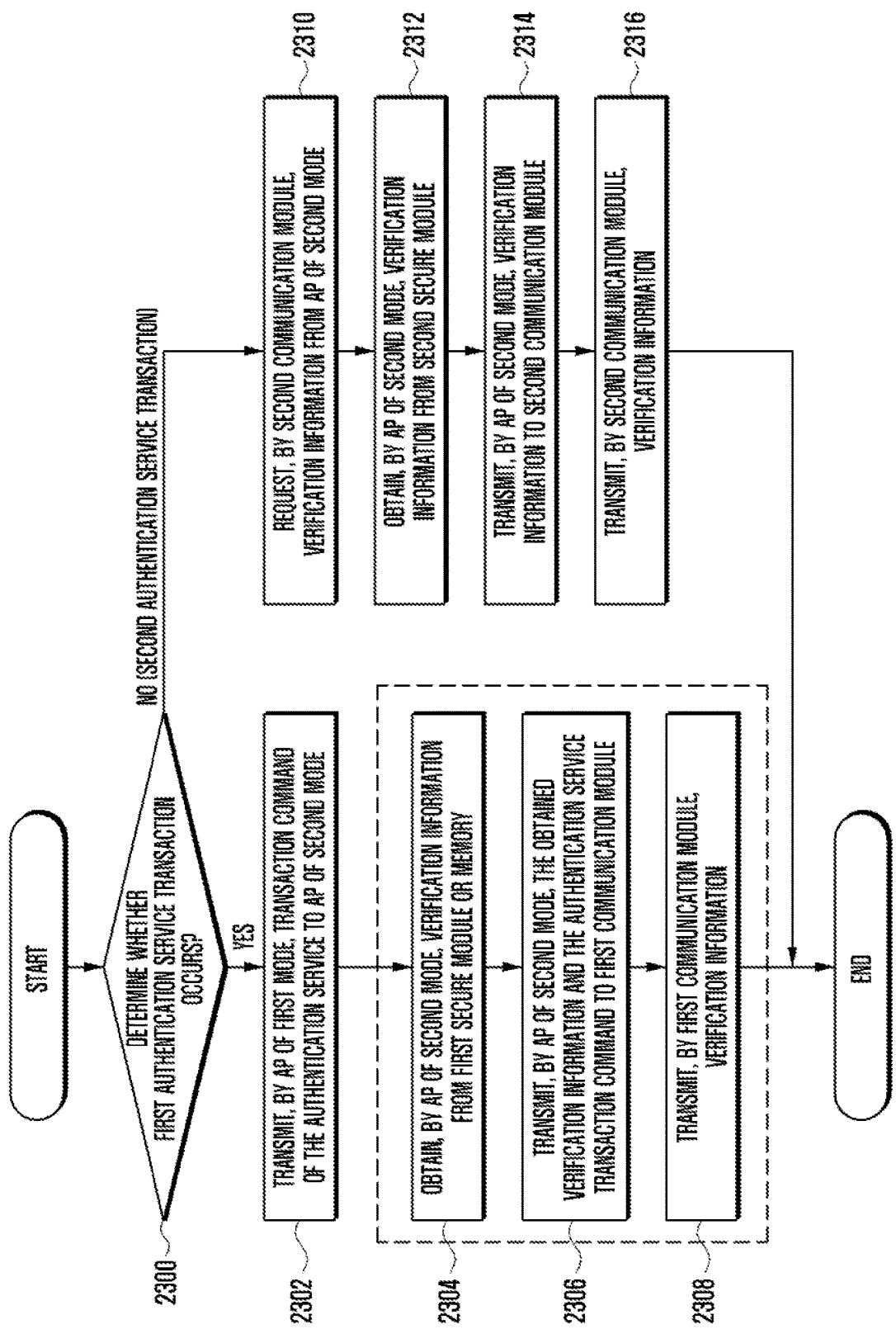
FIG. 23 is a flowchart that describes operations of an electronic device including a number of communication modules for mobile payment services, according to various embodiments of the present disclosure.

FIG. 23 is a flowchart that describes operations of an electronic device including a number of communication modules for short-range mobile payment services, according to various embodiments of the present disclosure.

Referring to FIG. 23, when a transaction of a first authentication service occurs in operation 2300, the AP 2201 of the first mode is capable of transmitting a transaction command of the first authentication service to the AP 2203 of the second mode in operation 2302.

The AP 2203 of the second mode is capable of obtaining verification information for payment settlement from the second secure module 2209 and/or the memory 2313 in operation 2304.

The AP 2203 of the second mode is capable of forwarding or transmitting the obtained verification information for payment settlement and the transaction command of the first authentication service to the first communication module 2205 in operation 2306.

The first communication module 2205 is capable of performing the transmission of the verification information in operation 2308.

On the other hand, when a transaction of a second authentication service occurs in operation 2300, the second communication module 2207 is capable of requesting verification information for payment settlement from the AP 2203 of the second mode in operation 2310.

The AP 2203 of the second mode is capable of obtaining the verification information for payment settlement from the first secure module 2211 in operation 2312.

The AP 2203 of the second mode is capable of forwarding the obtained verification information for payment settlement to the second communication module 2207 in operation 2314.

The AP 2203 of the second mode is capable of transmitting the verification information via the second communication module 2207 in operation 2316.

In various embodiments of the present disclosure, when the second authentication service transaction occurs in operation 2300, the second communication module 2207 may obtain the verification information for payment settlement directly from the second secure module 2209 and perform the transmission of the verification information.

In various embodiments of the present disclosure, when the AP 2201 of the first mode transmits the transaction command of the first authentication service to the AP 2203 of the second mode, the AP 2203 of the second mode may transmit the first authentication service transaction command to the first communication module 2205 and receive the request for the verification information for payment settlement from the first communication module 2205, which will be described below while referring to FIG. 24, instead of obtaining the verification information for payment settlement directly from the first secure module 2211.

Figure 24:
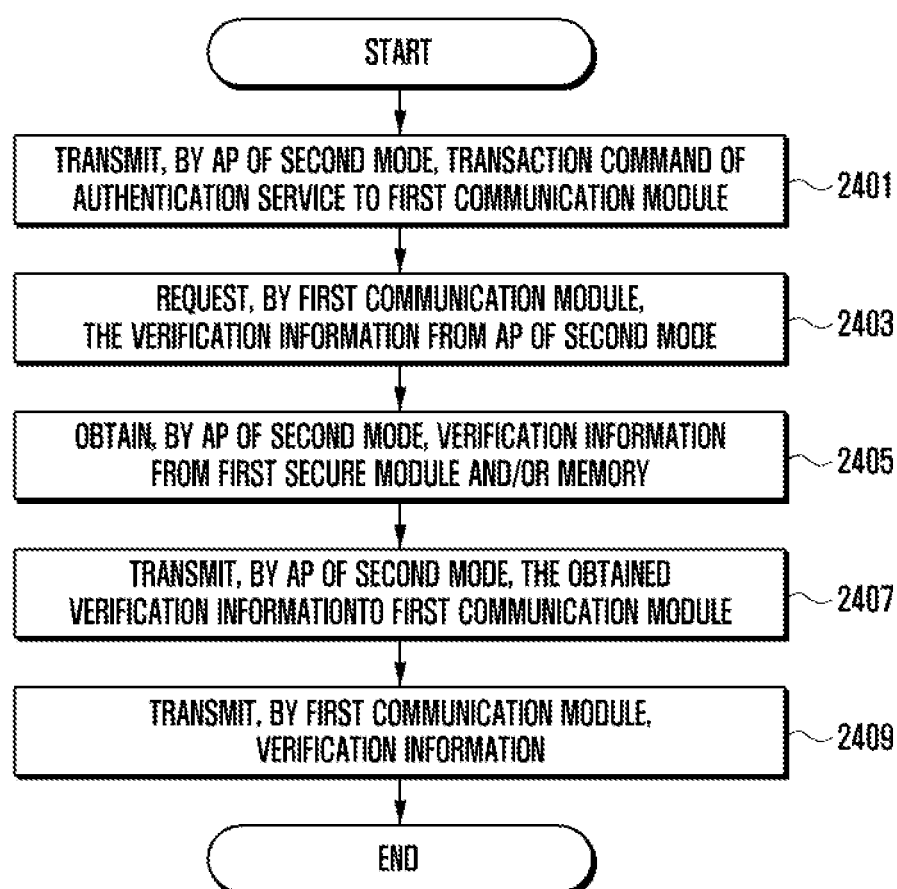
FIG. 24 is a flowchart that describes another example of operations of an electronic device including a number of communication modules for mobile payment services, according to various embodiments of the present disclosure.

FIG. 24 is a flowchart that describes another example of operations of an electronic device including a number of communication modules for short-range mobile payment services, according to various embodiments of the present disclosure.

Referring to FIG. 24, when the AP 2201 of the first mode transmits the transaction command of the first authentication service to the AP 2203 of the second mode, the AP 2203 of the second mode is capable of transmitting the transaction command of the first authentication service to the first communication module 2205 in operation 2401.

The first communication module 2205 is capable of requesting the verification information for payment settlement from the AP 2203 of the second mode in operation 2403.

The AP 2203 of the second mode is capable of obtaining the verification information for payment settlement from the first secure module 2211 and/or the memory 2213 in operation 2405.

The AP 2203 of the second mode is capable of forwarding the obtained verification information for payment settlement to the first communication module 2205 in operation 2407.

The electronic device (e.g., the first communication module 2205) is capable of transmitting the verification information to an external device (e.g., a POS terminal) in operation 2409.

Figure 25:
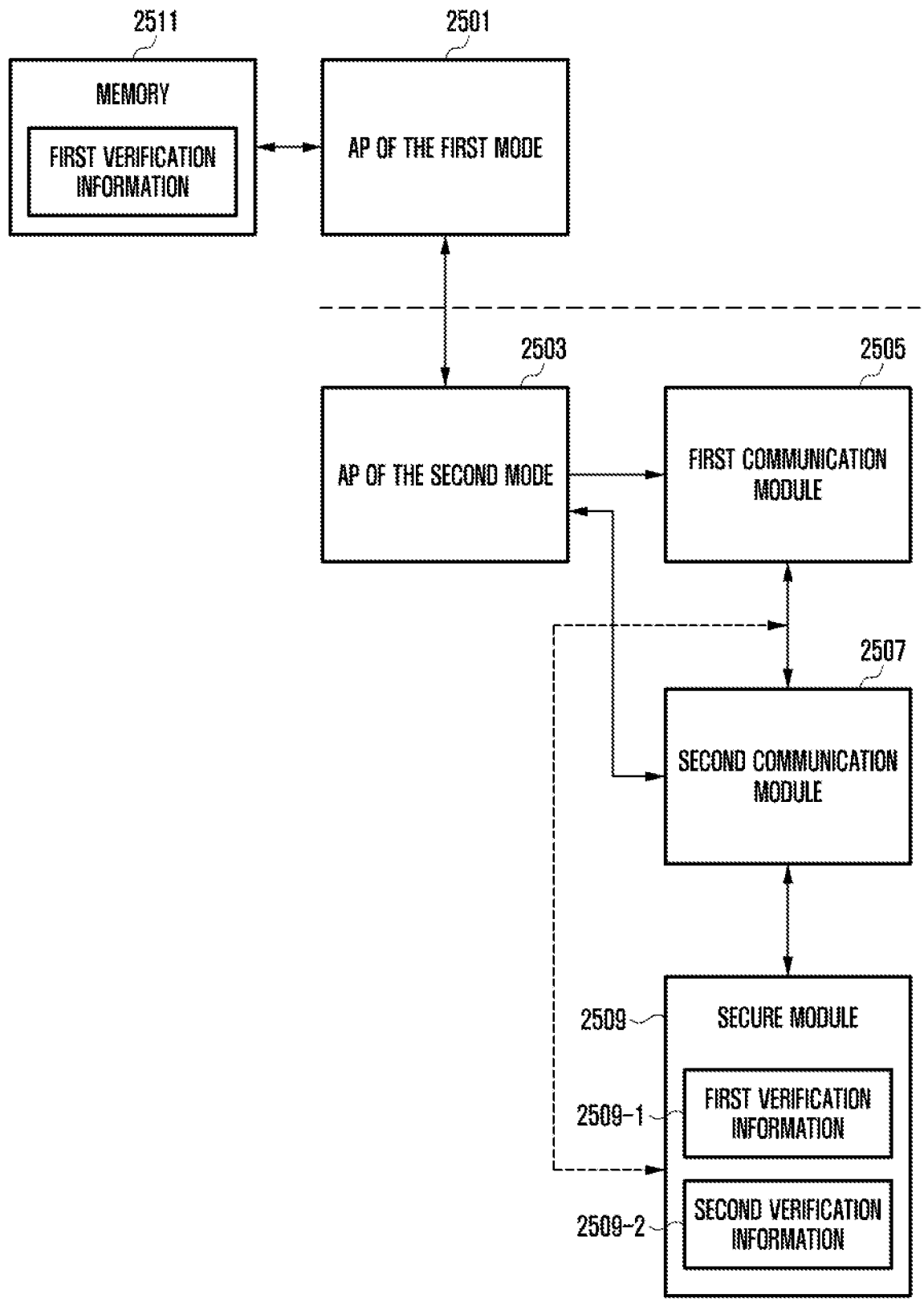
FIG. 25 is a block diagram showing interfaces between components in an electronic device according to various embodiments of the present disclosure.

FIG. 25 is a block diagram showing interfaces between components in an electronic device according to various embodiments of the present disclosure.

Referring to FIG. 25, an AP 2501 of a first mode and an AP 2503 of a second mode may correspond to the processor 1200 shown in FIG. 12, a first communication module 2505 may correspond to the first communication module 1210 shown in FIG. 12, and a second communication module 2507 may correspond to the second communication module 1212 shown in FIG. 12. The AP 2501 of the first mode may be the processor 1200 (shown in FIG. 12) running in the normal world (e.g., REE), and the AP 2503 of the second mode may be the processor 1200 running in the secure world (e.g., TEE).

The first communication module 2505 and the second communication module 2507 may be electrically connected to the AP 2503 of the second mode. The secure module 2509 may be electrically connected to the second communication module 2507. The secure module 2509 may also be electrically connected to the first communication module 2505.

In various embodiments of the present disclosure, the first communication module 2505 may be an MST module (e.g., an MST module 810 shown in FIG. 8) and/or an NFC module (e.g., NFC module 820). The second communication module 2507 may be an MST module (e.g., an MST module 810) and/or an NFC module (e.g., an NFC module 820). The secure module 2509 may be an embedded secure element (eSE).

The AP 2501 of the first mode is capable of detecting an authentication service transaction and transmitting a first authentication service transaction command to the AP 2503 of the second mode.

The AP 2503 of the second mode is capable of transmitting the first authentication service transaction command and first verification information 2509-1 to the first communication module 2505. The AP 2503 of the second mode is capable of receiving an authentication result corresponding to the second verification information 2509-2 from the second communication module 2507 and controlling the display module 1208 to display the authentication result thereon.

When receiving the authentication service transaction command from the AP 2503 of the second mode, the first communication module 2505 is capable of requesting and receiving the first verification information 2509-1 from the second communication module 2507.

In various embodiments of the present disclosure, when receiving the authentication service transaction command from the AP 2503 of the second mode, the first communication module 2505 may directly access the secure module 2509 and obtain the first verification information 2509-1 therefrom.

The first communication module 2505 is capable of processing the first verification information 2509-1 and transmitting the result to the POS terminal.

When receiving the first verification information request from the first communication module 2505, the second communication module 2507 is capable of accessing the secure module 2509 and obtaining the first verification information 2509-1 therefrom. The second communication module 2507 is capable of providing the obtained, first verification information 2509-1 to the first communication module 2505.

When the electronic device approaches or contacts the POS terminal, the second communication module 2507 is capable of detecting a second authentication service transaction, directly accessing the secure module 2509 and obtaining the second verification information 2509-2 therefrom. The second communication module 2507 is capable of processing the second verification information 2509-2 and transmitting the result to the POS terminal. The second communication module 2507 is capable of receiving a feedback of the authentication result, and providing the result to the AP 2503 of the second mode.

The secure module 2509 may be a storage space which can be accessed only by the first communication module 2505 or the second communication module 2507 but cannot be accessed by the AP 2501 of the first mode or the AP 2403 of the second mode. In the embodiment, the secure module 2509 is capable of storing the first verification information 2509-1 and the second verification information 2509-2.

In various embodiments of the present disclosure, the first verification information 2509-1 may be stored in a normal memory 2511 electrically connected to the AP 2501 of the first mode.

Figure 26:
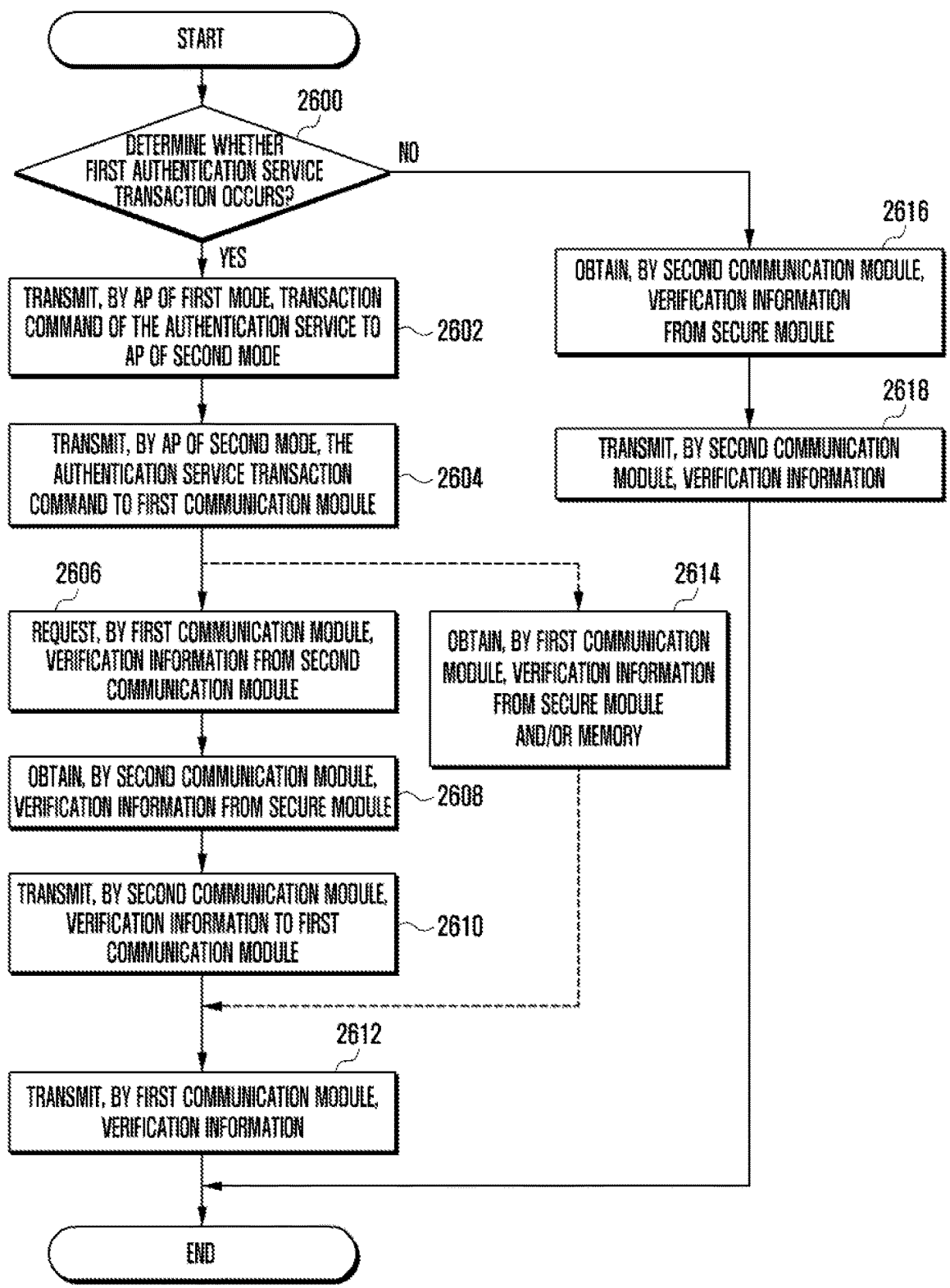
FIG. 26 is a flowchart that describes operations of an electronic device including a number of communication modules for mobile payment services, according to various embodiments of the present disclosure.

FIG. 26 is a flowchart that describes operations of an electronic device including a number of communication modules for short-range mobile payment services, according to an embodiment of the present disclosure.

Referring to FIG. 26, when a transaction of a first authentication service occurs in operation 2600, the AP 2501 of the first mode is capable of transmitting a transaction command of the first authentication service to the AP 2503 of the second mode in operation 2602.

The AP 2503 of the second mode is capable of transmitting the transaction command of the first authentication service to the first communication module 2505 in operation 2604.

The first communication module 2505 is capable of requesting first verification information for payment settlement from the second communication module 2507 in operation 2606.

The second communication module 2507 is capable of obtaining verification information (e.g., the first verification information 2509-1) for payment settlement from the secure module 2509 in operation 2608.

The second communication module 2507 is capable of forwarding or transmitting the obtained, first verification information for payment settlement to the first communication module 2505 in operation 2610.

In various embodiments of the present disclosure, when the AP 2503 of the second mode transmits the transaction command of the first authentication service to the first communication module 2505, the first communication module 2505 may directly obtain the first verification information for payment settlement from the secure module 2509 and/or the memory 2511 in operation 2614.

The first communication module 2505 is capable of performing the transmission of the verification information in operation 2612.

On the other hand, when a second authentication service transaction occurs in operation 2600, the second communication module 2507 is capable of obtaining verification information (e.g., the second verification information 2509-2) for payment settlement from the secure module 2509 in operation 2616.

The second communication module 2507 is capable of performing the transmission of the verification information in operation 2618.

Figure 27:
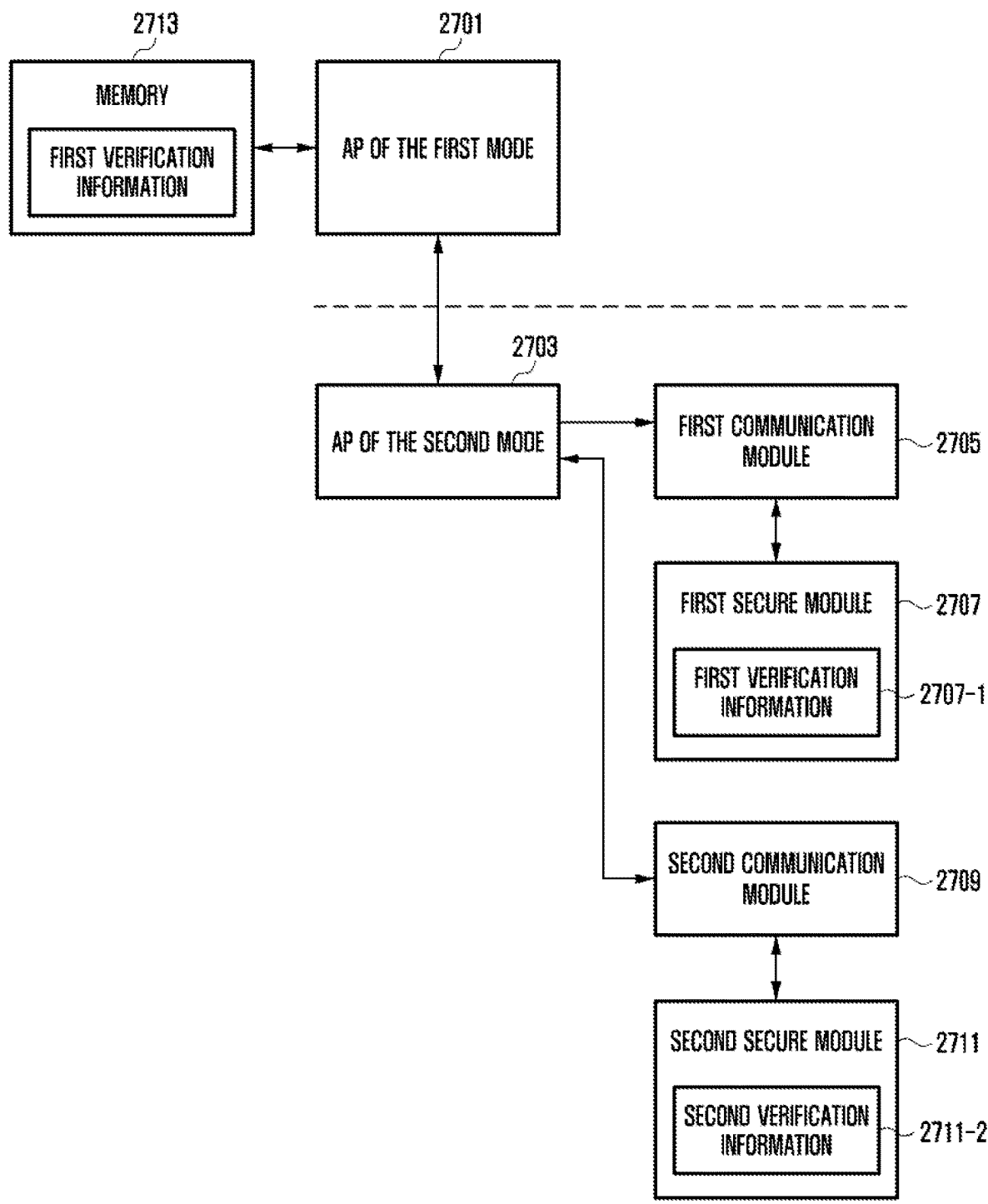
FIG. 27 is a block diagram showing interfaces between components in an electronic device according to various embodiments of the present disclosure.

FIG. 27 is a block diagram showing interfaces between components in an electronic device according to an embodiment of the present disclosure.

Referring to FIG. 27, an AP 2701 of a first mode and an AP 2703 of a second mode may correspond to the processor 1200 shown in FIG. 12, a first communication module 2705 may correspond to the first communication module 1210 shown in FIG. 12, and a second communication module 2709 may correspond to the second communication module 1212 shown in FIG. 12. The AP 2701 of the first mode may be the processor 1200 running in the normal world (e.g., REE), and the AP 2703 of the second mode may be the processor 1200 running in the secure world (e.g., TEE).

The first communication module 2705 and the second communication module 2709 are electrically connected to the AP 2703 of the second mode. The second secure module 2711 is electrically connected to the second communication module 2709. The first secure module 2707 is electrically connected to the first communication module 2705.

In various embodiments of the present disclosure, the first communication module 2705 may be an MST module (e.g., the MST module 810) and/or an NFC module (e.g., NFC module 820). The second communication module 2709 may be an MST module (e.g., the MST module 810) and/or an NFC module (e.g., the NFC module 820). The first secure module 2707 may be a first eSE. The second secure module 2711 may be a second eSE.

The AP 2701 of the first mode is capable of detecting an authentication service transaction and transmitting a first authentication service transaction command to the AP 2703 of the second mode.

The AP 2703 of the second mode is capable of forwarding the first authentication service transaction command and the first verification information 2707-1 to the first communication module 2705. The AP 2703 of the second mode is capable of receiving an authentication result corresponding to the second verification information 2711-2 from the second communication module 2709 and controlling the display module 1208 to display the authentication result thereon.

When receiving the authentication service transaction command from the AP 2703 of the second mode, the first communication module 2705 is capable of directly accessing the first secure module 2707 and obtaining the first verification information 2707-1 therefrom. The first communication module 2705 is capable of processing the obtained, first verification information 2707-1 and transmitting the processed result to the POS terminal.

When the electronic device approaches or contacts the POS terminal, the second communication module 2709 is capable of detecting a second authentication service transaction, accessing the second secure module 2711 and obtaining the second verification information 2711-2 therefrom.

The second communication module 2709 is capable of processing the second verification information 2709-2 and transmitting the result to the POS terminal. The second communication module 2709 is capable of receiving a feedback of the authentication result, and providing the result to the AP 2703 of the second mode.

The first secure module 2707 (first secure world) may be a storage space which can be accessed only by the first communication module 2705 but cannot be accessed by the AP 2701 of the first mode or the AP 2703 of the second mode. The second secure module 2711 (second secure world) may be a storage space accessed only by the second communication module 2709 but cannot be accessed by the AP 2701 of the first mode or the AP 2703 of the second mode.

In various embodiments of the present disclosure, the first verification information 2709-1 may be stored in a normal memory 2713 electrically connected to the AP 2701 of the first mode.

Figure 28:
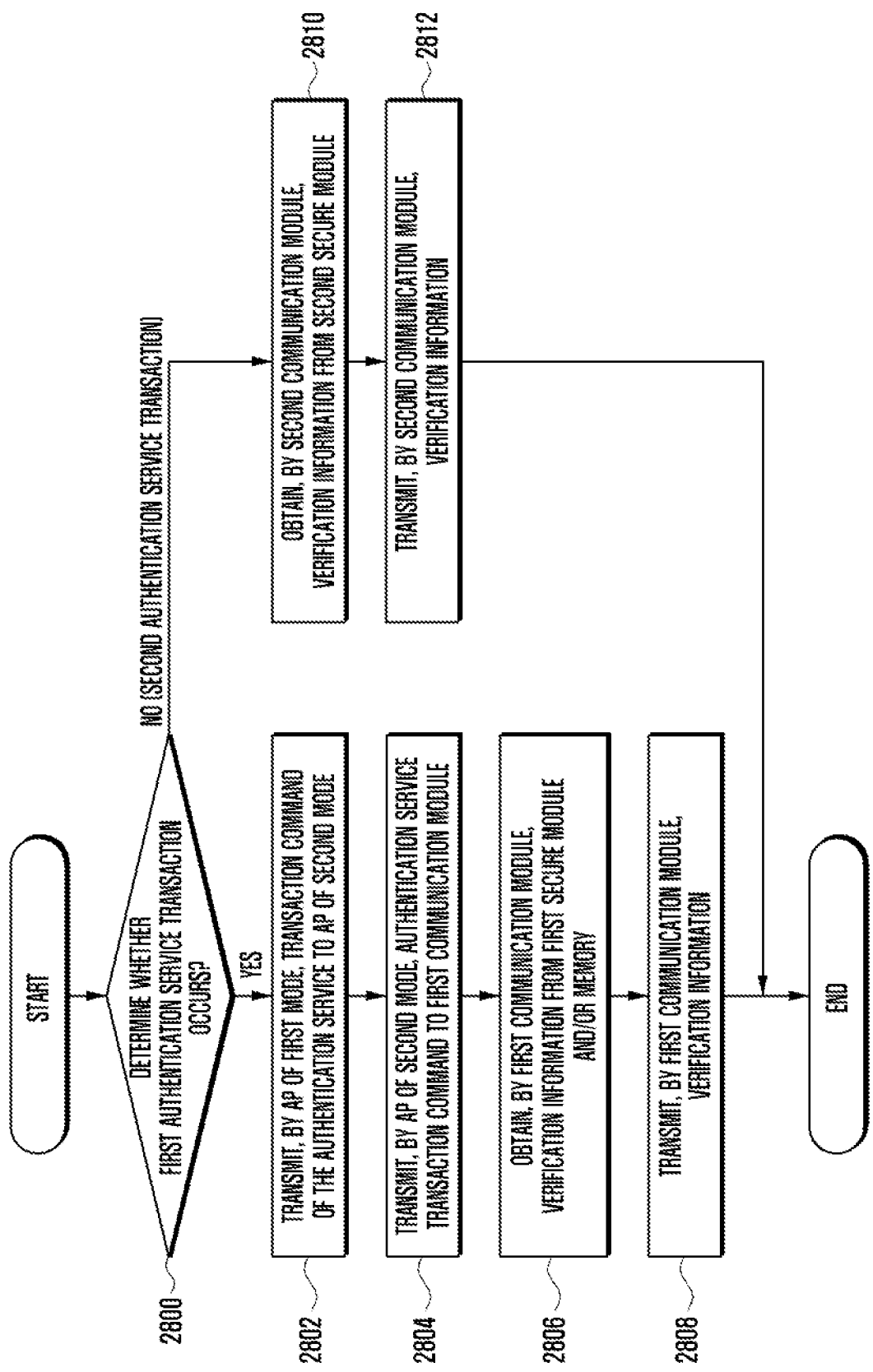
FIG. 28 is a flowchart that describes operations of an electronic device including a number of communication modules for mobile payment services, according to various embodiments of the present disclosure.

FIG. 28 is a flowchart that describes operations of an electronic device including a number of communication modules for short-range mobile payment services, according to an embodiment of the present disclosure.

Referring to FIG. 28, when a transaction of a first authentication service occurs in operation 2800, the AP 2701 of the first mode is capable of transmitting a transaction command of the first authentication service to the AP 2703 of the second mode in operation 2802.

The AP 2703 of the second mode is capable of transmitting the transaction command of the first authentication service to the first communication module 2705 in operation 2804.

The first communication module 2705 is capable of obtaining verification information for payment settlement from the first secure module (first secure world) 2707 and/or the memory 2713 in operation 2806.

The first communication module 2705 is capable of performing the transmission of the verification information in operation 2808.

On the other hand, when a second authentication service transaction occurs in operation 2800, the second communication module 2709 is capable of obtaining verification information for payment settlement from the second secure module 2711 in operation 2810.

The second communication module 2709 is capable of performing the transmission of the verification information in operation 2812.

In various embodiments of the present disclosure, when the second authentication service transaction occurs in operation 2800, the payment settlement may be performed as described below referring to FIG. 21 and FIG. 29.

Figure 29:
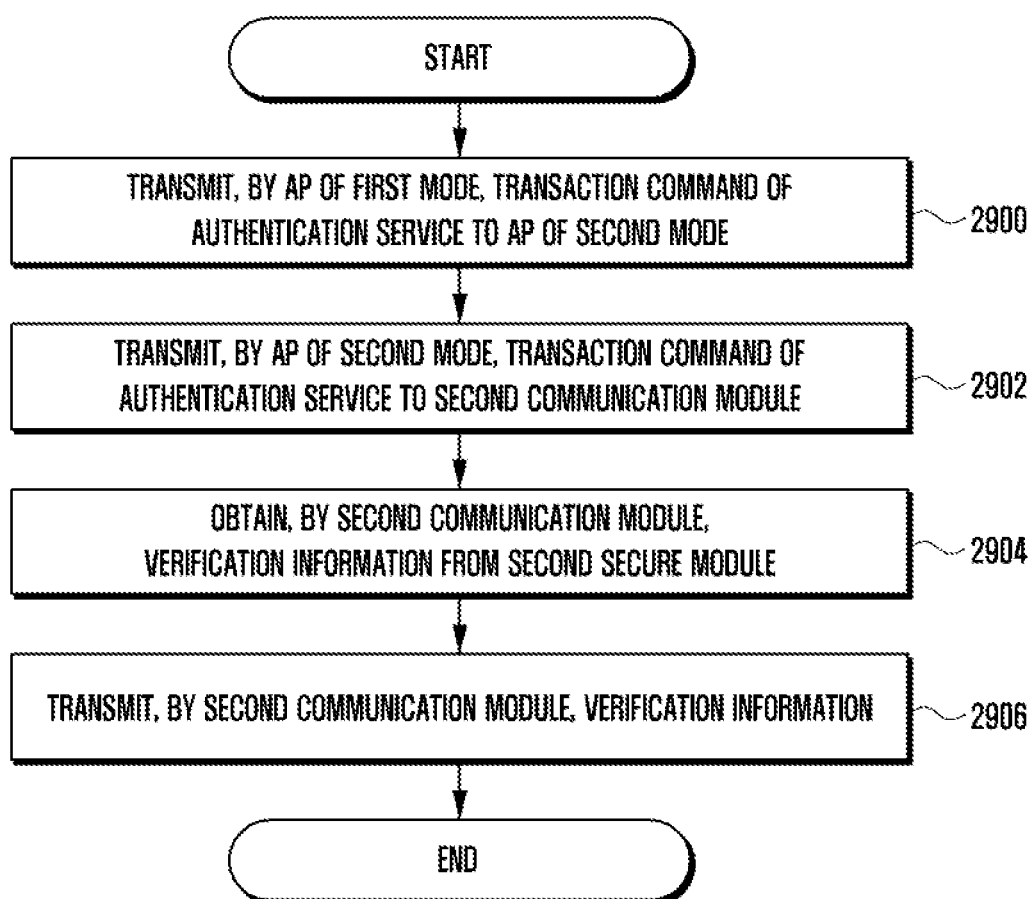
FIG. 29 is a flowchart that describes another example of operations of an electronic device including a number of communication modules for mobile payment services, according to various embodiments of the present disclosure.

FIG. 29 is a flowchart that describes another example of operations of an electronic device including a number of communication modules for short-range mobile payment services, according to an embodiment of the present disclosure.

Referring to FIG. 29, when the second authentication service transaction occurs, the AP 2701 of the first mode is capable of transmitting a transaction command of the first authentication service to the AP 2703 of the second mode in operation 2900.

The AP 2703 of the second mode is capable of forwarding a transaction of the second authentication service to the second communication module 2709 in operation 2902.

The second communication module 2709 is capable of obtaining the verification information for payment settlement from the second secure module 2711 in operation 2904.

The AP 2703 of the second mode is capable of transmitting the verification information via the second communication module 2709 in operation 2906.

Figure 30:
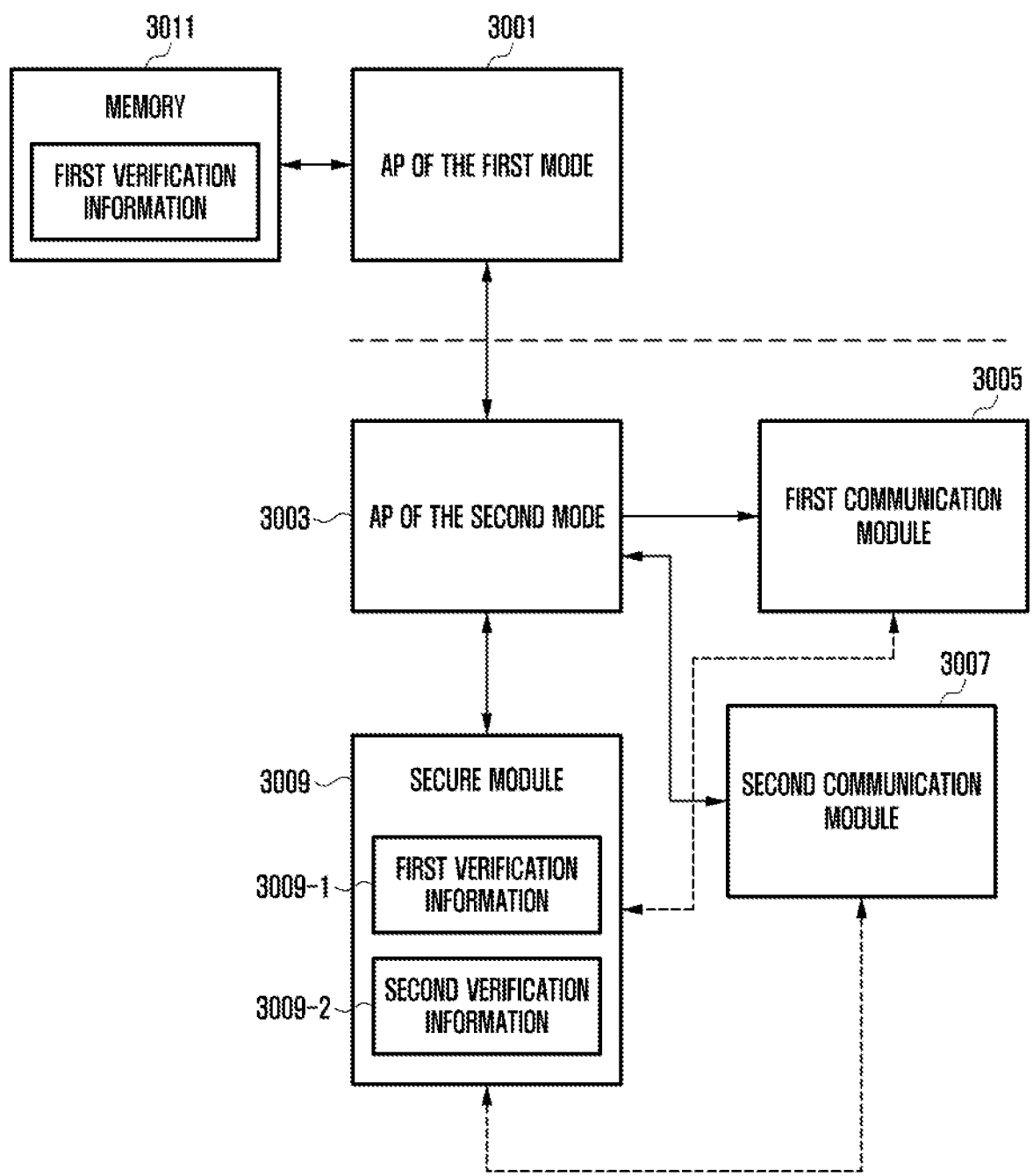
FIG. 30 is a block diagram showing interfaces between components in an electronic device according to various embodiments of the present disclosure.

FIG. 30 is a block diagram showing interfaces between components in an electronic device according to an embodiment of the present disclosure.

Referring to FIG. 30, an AP 3001 of a first mode and an AP 3003 of a second mode may correspond to the processor 1200 shown in FIG. 12; a first communication module 3005 may correspond to the first communication module 1210 shown in FIG. 12; and a second communication module 3007 may correspond to the second communication module 1212 shown in FIG. 12. The AP 3001 of the first mode may be the processor 1200 running in the normal world (e.g., REE), and the AP 3003 of the second mode may be the processor 1200 running in the secure world (e.g., TEE).

The first communication module 3005 and the second communication module 3007 are electrically connected to the AP 3003 of the second mode. The secure module 3009 is electrically connected to the first communication module 3005, the second communication module 3007, and the AP 3003 of the second mode.

In various embodiments of the present disclosure, the first communication module 3005 may be an MST module (e.g., the MST module 810 shown in FIG. 8) and/or an NFC module (e.g., the NFC module 820). The second communication module 3007 may be an MST module (e.g., the MST module 810) and/or an NFC module (e.g., the NFC module 820). The secure module 3009 may be an embedded secure element (eSE).

The AP 3001 of the first mode is capable of detecting an authentication service transaction and transmitting authentication service transaction command to the AP 3003 of the second mode.

The AP 3003 of the second mode is capable of forwarding a first authentication service transaction command to the first communication module 3005, and requesting the secure module 3009 to transmit the first verification information 3009-1 to the first communication module 3005.

In various embodiments of the present disclosure, when a second authentication service transaction occurs, the AP 3003 of the second mode is capable of requesting the secure module 3009 to transmit the second verification information 3009-2 to the second communication module 3007.

The AP 3003 of the second mode is capable of accessing the secure module 3009 and obtaining the first verification information 3009-1 therefrom. The AP 3003 of the second mode is capable of receiving an authentication result corresponding to the second verification information 3009-2 from the second communication module 3007 and controlling the display module 1208 (shown in FIG. 12) to display the received result thereon.

The first communication module 3005 is capable of receiving the authentication service transaction command from the AP 3003 of the second mode, and the first verification information 3009-1 from the secure module 3009. The first communication module 3005 is capable of processing the received, first verification information 3009-1 and transmitting the processed result to the POS terminal.

When the electronic device approaches or contacts the POS terminal, the second communication module 3007 is capable of detecting a second authentication service transaction, directly accessing the secure module 3009 and obtaining the second verification information 3009-2 therefrom. The second communication module 3007 is capable of processing the obtained, second verification information 3009-2 and transmitting the processed result to the POS terminal. The second communication module 3007 is capable of receiving a feedback of the authentication result and forwarding the result to the AP 3003 of the second mode.

In an embodiment of the present disclosure, when the electronic device approaches or contacts the POS terminal, the second communication module 3007 may request and receive the second verification information 3009-2 from the AP 3003 of the second mode.

The secure module 3009 may be a storage space which can be accessed only by the AP 3001 of the second mode and the second communication module 3007 but cannot be accessed by the AP 3001 of the first mode. The first communication module 3005 is capable of receiving the first verification information 3009-1 from the secure module 3009 in one direction. In the embodiment, the secure module 3009 is capable of storing the first verification information 3009-1 and the second verification information 3009-2.

In various embodiments of the present disclosure, the first verification information may be stored in a normal memory 3011 electrically connected to the AP 3001 of the first mode.

In various embodiments of the present disclosure, the AP 3003 of the second mode is capable of storing the verification information. For example, the AP 3003 of the second mode is capable of storing the verification information in the trusted RAM 501 shown in FIG. 5A. The verification information stored in the AP 3003 of the second mode may be transmitted via the first communication module 3005 and the second communication module 3007. For example, the AP 3003 of the second mode is capable of transmitting one piece of verification information to a receiving device via the first communication module 3005 and the second communication module 3007.

In another embodiment, the verification information stored in the AP 3003 of the second mode may contain first verification information transmitted via the first communication module 3005 and second verification information transmitted via the second communication module 3007. For example, the AP 3003 of the second mode is capable of transmitting to a receiving device: first verification information via the first communication module 3005; and second verification information via the second communication module 3007. In various embodiments of the present disclosure, the AP 3003 of the second mode is capable of transmitting at least one piece of stored verification information to the receiving device. For example, the AP 3003 of the second mode is capable of transmitting the verification information to a receiving device through the corresponding communication module.

Figure 31:
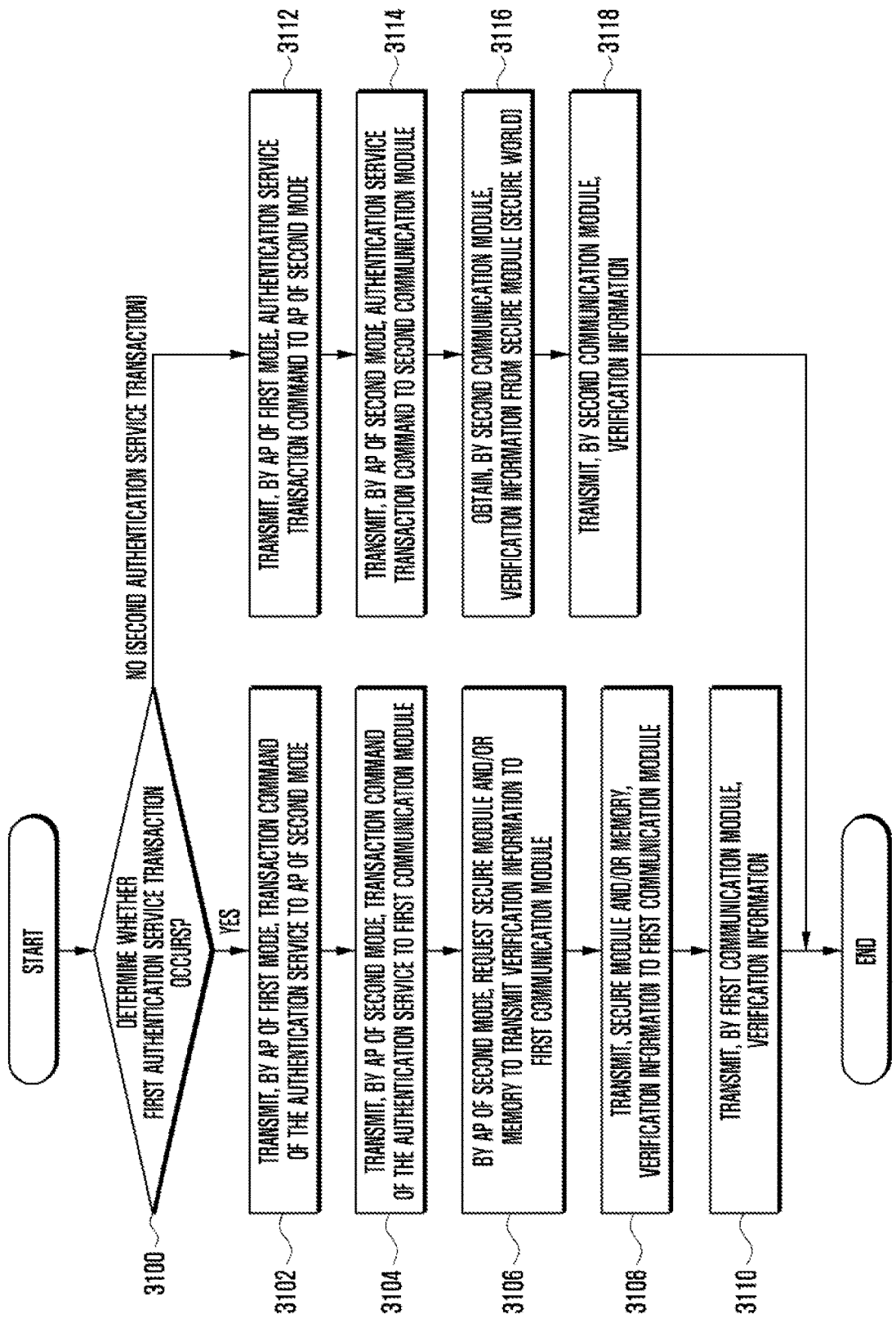
FIG. 31 is a flowchart that describes operations of an electronic device including a number of communication modules for mobile payment services, according to various embodiments of the present disclosure.

FIG. 31 is a flowchart that describes operations of an electronic device including a number of communication modules for short-range mobile payment services, according to an embodiment of the present disclosure.

Referring to FIG. 31, when a transaction of a first authentication service occurs in operation 3100, the AP 3001 of the first mode is capable of transmitting a transaction command of the first authentication service to the AP 3003 of the second mode in operation 3102.

The AP 3003 of the second mode is capable of forwarding or transmitting the transaction command of the first authentication service to the first communication module 3005 in operation 3104.

The AP 3003 of the second mode is capable of requesting the secure module 3009 and/or the memory 3011 to transmit the verification information for payment settlement to the first communication module 3005 in operation 3106.

The secure module 3009 and/or the memory 3011 are capable of transmitting the verification information for payment settlement to the first communication module 3005 in operation 3108.

The first communication module 3005 is capable of performing the transmission of the verification information received from the secure module 3009 in operation 3110.

On the other hand, when a second authentication service transaction occurs in operation 3100, the AP 3001 of the first mode is capable of transmitting a transaction command of the second authentication service to the AP 3003 of the second mode in operation 3112.

The AP 3003 of the second mode is capable of forwarding or transmitting the second authentication service transaction command to the second communication module 3007 in operation 3114.

The second communication module 3007 is capable of requesting the verification information for payment settlement from the AP 3003 of the second mode and obtaining the verification from the secure world in operation 3116.

The second communication module 3007 is capable of performing the transmission of the verification information in operation 3118.

Figure 32:
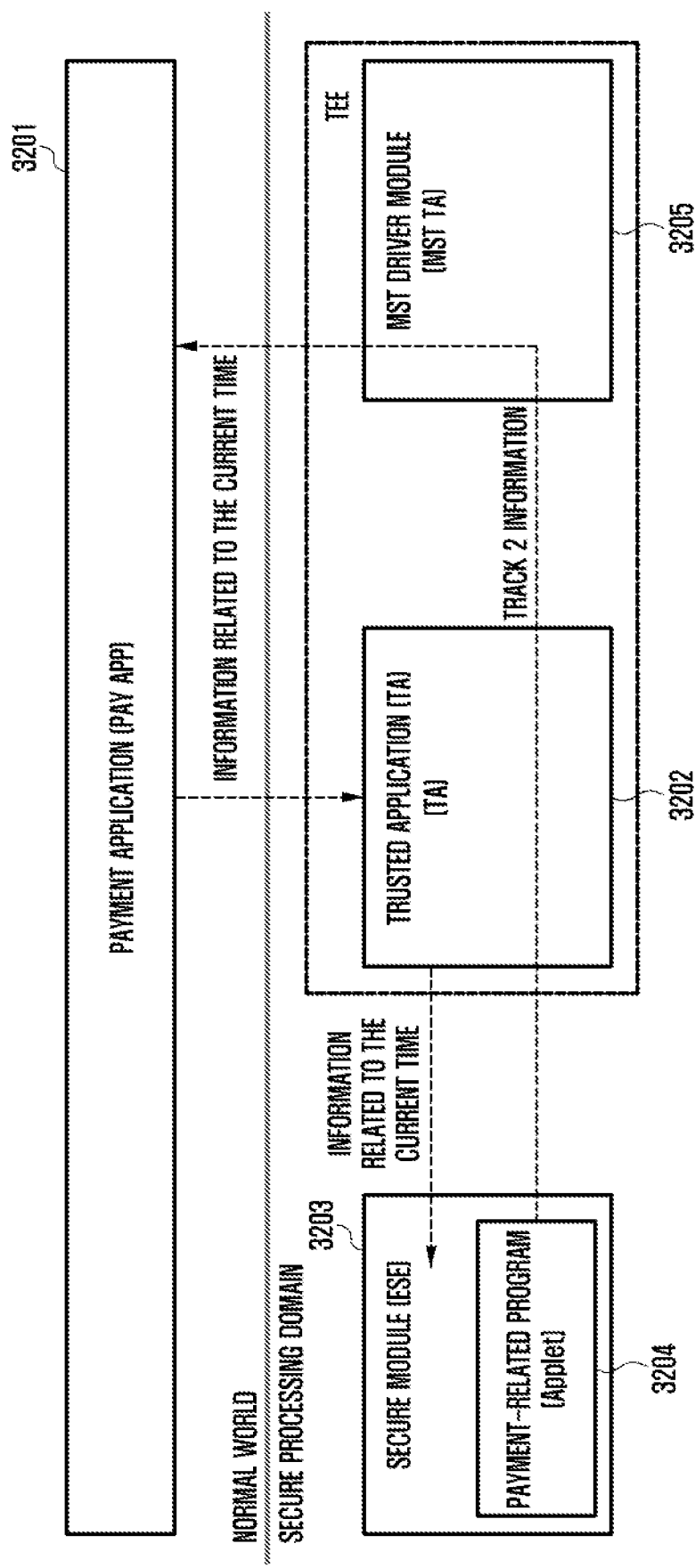
FIG. 32 is a block diagram showing interfaces between components in an electronic device configured to generate payment information according to various embodiments of the present disclosure.

FIG. 32 is a block diagram showing interfaces between components in an electronic device configured to generate payment information according to various embodiments of the present disclosure.

The electronic device (e.g., electronic device 101 shown in FIG. 1) is capable of including a normal world (e.g., REE 410 shown in FIG. 4) and a secure processing domain.

The normal world is capable of including at least one payment application 3201, e.g., the payment application 912 shown in FIG. 9. The secure processing domain is capable of including a secure world (e.g., TEE 420) and a secure module (e.g., embedded Secure Element (eSE)). The secure processing domain may refer to an area which is capable of storing data required for security in a safe environment and performing corresponding operations.

In various embodiments of the present disclosure, the secure processing domain may be configured with only one or more secure modules (e.g., eSEs). When a secure processing domain is configured with only one or more secure modules (e.g., eSEs), at least one secure module (eSE) may perform functions of a component in the TEE (e.g., a function of an MST driver module, a function of a trusted application).

In various embodiments of the present disclosure, the secure processing domain may be configured with only one or more secure worlds (e.g., TEEs). When a secure processing domain is configured with only one or more secure worlds (e.g., TEEs), at least one secure world (TEE) may perform functions of a secure module (eSE). The secure world is capable of including: applications in the TEE, e.g., a trusted application (TA) 3202; a secure module 3203, e.g., an eSE and a secure storage 916 shown in FIG. 9); and an MST driver module (MST TA) 3205, e.g., an MST driver module 1827 shown in FIG. 18. The secure module 3203 is capable of storing one or more payment applets.

The payment application 3201 is capable of transmitting information related to the current time (e.g., Coordinated Universal Time (UTC) information) to the secure world.

For example, the electronic device (e.g., electronic device 101) is capable of obtaining the UTC information via the operating system (e.g., Android® OS). The electronic device (e.g., electronic device 101) is capable of obtaining the UTC information via a network identity and time zone (NITZ), a network time protocol (NTP), or the like. An external server (e.g., a first management server) is capable of obtaining the UTC information. When the external server and the electronic device obtain the UTC information, they synchronize with each other and the time verification code is authenticated. The external server is capable of obtaining a specified time value using the same method (e.g., NITZ or NTP) as the electronic device.

The payment application 3201 is capable of transmitting the information related to the current time (e.g., UTC information) to the trusted application (TA) 3202. The trusted application 3202 is capable of transmitting the information related to the current time (e.g., UTC information) to the secure module 3203.

The secure module 3203 is capable of including at least one or more pieces of payment information (e.g., a token, a key for creating a token cryptogram). The electronic device (e.g., electronic device 101) is capable of including at least one or more communication modules, e.g., a first communication module 1210 and a second communication module 1212 shown in FIG. 12. The secure module 3203 is capable of including verification information corresponding to each of one or more communication modules.

The secure module 3203 is capable of creating track 2 information in a card, by the use of a payment-related program (applet) 3204. The payment-related program 3204 is capable of including an algorithm related to encryption, e.g., a hash-based message authentication code (HMAC) algorithm.

The payment-related program 3204 is capable of creating one or more of timestamp information and payment information (e.g., track 2 information), based on at least one of information related to the current time (e.g., UTC information) and one or more pieces of payment information (e.g., a token, a key for creating a token cryptogram). The payment information generated using the timestamp information may be generated by using verification information corresponding to the MST module.

The track 2 information refers to payment information used for payment. The payment information may contain one or more of timestamp information, expiry information, a service code, a random number, a verification number, version information, and a sequence number. In various embodiments of the present disclosure, the expiry information contained in the payment information may be information regarding a validity period of a credit card.

Version information may be a version number of an algorithm for creating payment information. A sequence number may be information to count the used number of payment information.

Timestamp information may be generated by using at least one of the current time, a provisioning time, a reference time, and a validity period.

Current time may be a time based on the UTC information. Current time may be a time when the payment application 3201 requested a payment. Provisioning time may be a time when a token server or a token service provider (TSP), e.g., the TSP 730 shown in FIG. 7, transmitted a token to an electronic device during the distribution of tokens. Reference time may be set to a zero value. In various embodiments of the present disclosure, the reference time may be identical to the provisioning time.

The validity period is a preset period of time from when payment is requested and then a token starts to be generated to when the generated token is used validly. The electronic device is capable of receiving information regarding a validity period from the payment server or the issuer. For example, the validity period may be set to 180 seconds.

At least one of the secure module 3203, the trusted application 3202 and the secure world is capable of creating timestamp information, using the validity period, the provisioning time, the current time based on the UTC information.

For example, the timestamp information may be obtained by the following Equation 1.

$$\text{timestamp information} = \text{FLOOR}((\text{current time} - \text{provisioning time})/\text{validity period}) \quad \text{Equation 1}$$

FLOOR may be the round down function.

In various embodiments of the present disclosure, at least one of the secure module 3201, the trusted application 3202 and the secure world is capable of creating timestamp information using the validity period, a reference time, the current time based on the UTC information.

For example, the timestamp information may be obtained by the following Equation 2.

$$\text{timestamp information} = \text{FLOOR}((\text{current time} - \text{reference time})/\text{validity period}) \quad \text{Equation 2}$$

The secure module 3201 is capable of creating a verification code or verification information, using a key for creating a token cryptogram containing one or more of a token, timestamp information, expiry information, a service code, a random number, a verification number, version information, and/or a sequence number.

The secure module 3201 is capable of creating payment information (e.g., track 2 information) containing one or more of a token, timestamp information, expiry information, a service code, a random number, a verification number, a verification code, and/or verification information.

In various embodiments of the present disclosure, the secure module 3201 is capable of creating a one-time password (OTP) code encrypting the UTC information through a key for creating a token cryptogram; and payment information, using the OTP code.

The secure module 3201 is capable of creating payment information (e.g., track 2 information) containing one or more of a token, timestamp information, expiry information, a service code, a random number, a verification number and an OPT code.

The generated payment information may be transmitted to the payment application 3201 or an external electronic device, via an MST driver module (MST TA) 3205 (e.g., the MST driver module 1827 shown in FIG. 18).

In various embodiments of the present disclosure, the generated payment information may be transmitted to the payment application 3201 or an external electronic device, via an NFC module (e.g., the NFC module 820 shown in FIG. 8).

Figure 33:
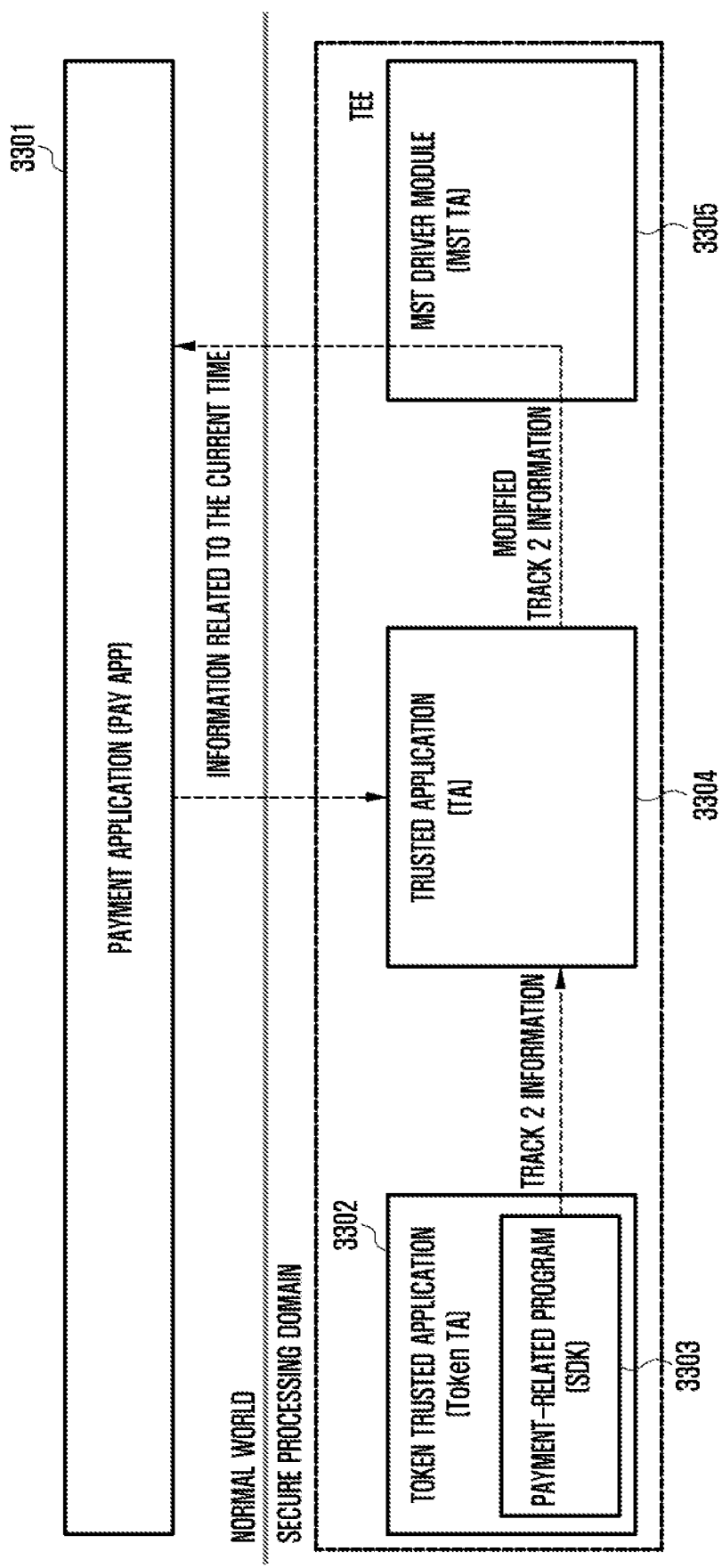
FIG. 33 is a block diagram showing interfaces between components in an electronic device configured to generate payment information according to various embodiments of the present disclosure.

FIG. 33 is a block diagram showing interfaces between components in an electronic device configured to generate payment information according to various embodiments of the present disclosure.

The electronic device (e.g., electronic device 101 shown in FIG. 1) is capable of including a normal world (e.g., REE 410 shown in FIG. 4) and a secure processing domain.

The normal world is capable of including at least one payment application 3301, e.g., the payment applications 912 shown in FIG. 9. The secure processing domain is capable of including a secure world (e.g., TEE 420). The secure processing domain may refer to an area which is capable of storing data required for security in a safe environment and performing corresponding operations.

The secure world is capable of including applications in the TEE, e.g., a trusted application (TA) 3304, a token trusted application 3302 (e.g., an embedded secure element (eSE) and a secure storage 916 shown in FIG. 9), and an MST driver module (MST TA) 3305 (e.g., an MST driver module 1827 shown in FIG. 18). The token trusted application 3302 is capable of including a payment-related program 3303 (e.g., SDK).

The payment application 3301 is capable of transmitting the information related to the current time (e.g., Coordinated Universal Time (UTC) information) to the secure world.

For example, the electronic device (e.g., electronic device 101) is capable of obtaining the UTC information via the operating system (e.g., Android™ OS). The electronic device (e.g., electronic device 101) is capable of obtaining the UTC information via a network identity and time zone (NITZ), a network time protocol (NTP), or the like. An external server (e.g., a first management server) is capable of obtaining the UTC information. When the external server and the electronic device obtain the UTC information, they synchronize with each other and the time verification code is authenticated. The external server is capable of obtaining a specified time value using the same method (e.g., NITZ or NTP) as the electronic device.

The payment application 3301 is capable of transmitting the information related to the current time (e.g., UTC information) to the trusted application (TA) 3304.

The token trusted application 3302 is capable of including at least one or more pieces of payment information (e.g., a token, a key for creating a token cryptogram). The electronic device (e.g., electronic device 101) is capable of including at least one or more communication modules, e.g., a first communication module 1210 and a second communication module 1212 shown in FIG. 12. The token trusted application 3302 is capable of including verification information corresponding to each of one or more communication modules.

The token trusted application 3302 is capable of creating track 2 information in a card, using the payment-related program 3303. The TA 3304 is capable of creating timestamp information and/or payment information (e.g., modified track 2 information), based on at least of the information related to the current time (e.g., UTC information) and one or more pieces of payment information (e.g., a token, a key for creating a token cryptogram).

The payment information generated using the timestamp information may be generated by using the verification information corresponding to an MST module. The TA 3304 is capable of including an algorithm related to encryption, e.g., a hash-based message authentication code (HMAC) algorithm.

The modified track 2 information refers to payment information used for payment. The payment information may contain one or more of timestamp information, expiry information, a service code, a random number, a verification number, version information, and a sequence number. In various embodiments of the present disclosure, the expiry information contained in the payment information may be information regarding a validity period of a credit card.

Timestamp information may be generated by using at least one of a current time, a provisioning time, a reference time, and a validity period.

Current time may be a time based on the UTC information. Current time may be a time when the payment application 3301 requested a payment. Provisioning time may be a time when a token server or a token service provider (TSP), e.g., the TSP 730 shown in FIG. 7, transmitted a token to an electronic device during the distribution of tokens. Reference time may be set to a zero value. In various embodiments of the present disclosure, the reference time may be identical to the provisioning time.

The validity period is a preset period of time from when payment is requested and then a token starts to be generated to when the generated token is used validly. The electronic device is capable of receiving information regarding a validity period from the payment server or the issuer. For example, the validity period may be set to 180 seconds.

At least one of the token trusted application 3302, the trusted application 3304, and the secure world is capable of creating timestamp information, using the validity period, the provisioning time, the current time based on the UTC information.

In various embodiments of the present disclosure, at least one of the token trusted application 3302, the trusted application 3304 and the secure world is capable of creating timestamp information, using the validity period, a reference time, the current time based on the UTC information.

The trusted application 3304 is capable of creating a verification code or verification information, using a key for creating a token cryptogram containing one or more of a token, timestamp information, expiry information, a service code, a random number, a verification number, version information, and a sequence number.

The trusted application 3304 is capable of creating payment information (e.g., modified track 2 information) containing one or more of a token, timestamp information, expiry information, a service code, a random number, a verification number, a verification code, and verification information. In various embodiments of the present disclosure, the expiry information contained in the payment information may be information regarding a validity period of a credit card.

In various embodiments of the present disclosure, the trusted application 3304 is capable of creating: a one-time password (OTP) code encrypting the UTC information through a key for creating a token cryptogram; and payment information, using the OTP code.

The trusted application 3304 is capable of creating payment information (e.g., modified track 2 information) containing one or more of a token, timestamp information, expiry information, a service code, a random number, a verification number and an OPT code. In various embodiments of the present disclosure, the expiry information contained in the payment information may be information regarding a validity period of a credit card.

The generated payment information may be transmitted to the payment application 3301 or an external electronic device, via an MST driver module (MST TA) 3305 (e.g., the MST driver module 1827 shown in FIG. 18).

In various embodiments of the present disclosure, the generated payment information may be transmitted to the payment application 3301 or an external electronic device, via an NFC module (e.g., the NFC module 820 shown in FIG. 8).

Figure 34:
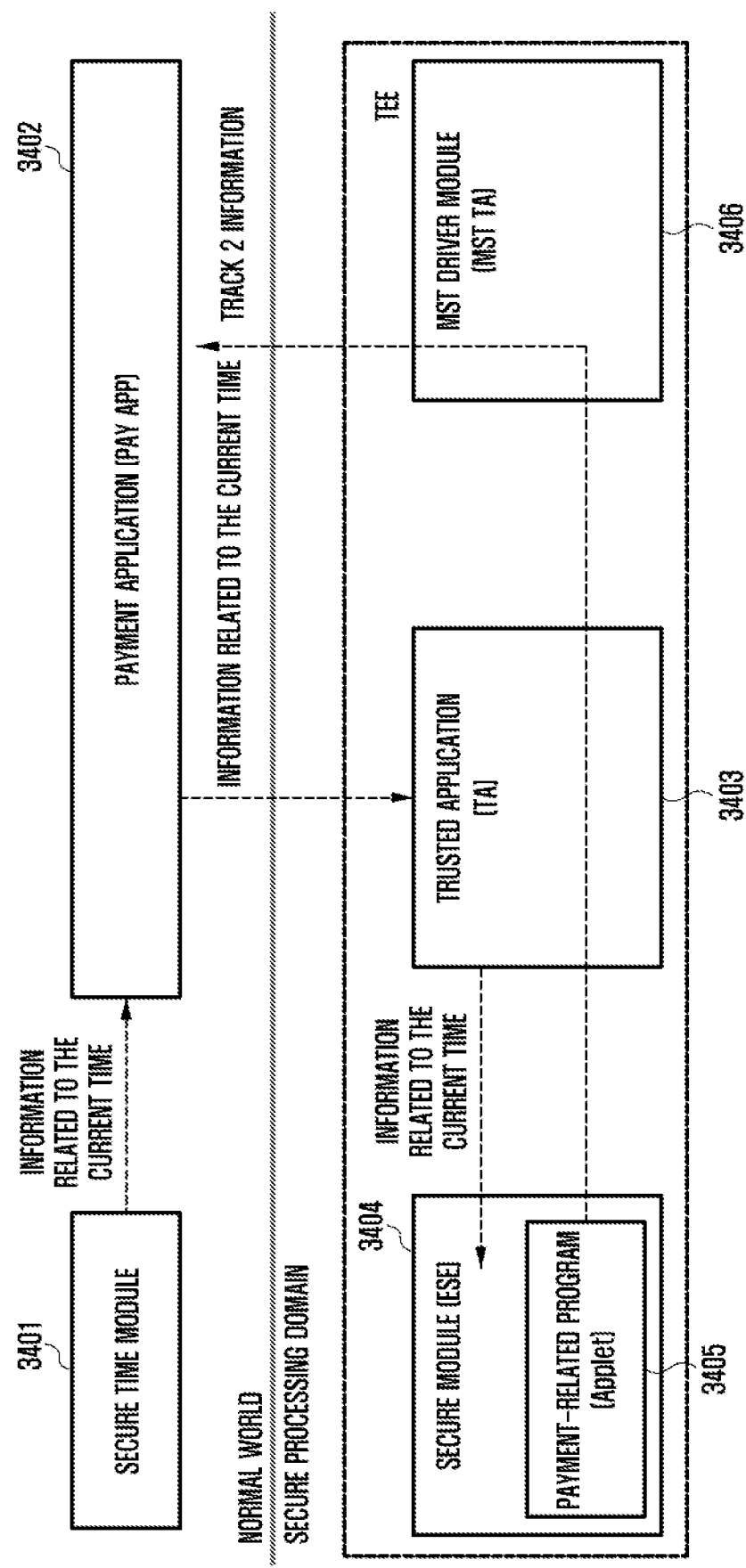
FIG. 34 is a block diagram showing interfaces between components in an electronic device configured to generate payment information according to various embodiments of the present disclosure.

FIG. 34 is a block diagram showing interfaces between components in an electronic device configured to generate payment information according to various embodiments of the present disclosure.

The electronic device (e.g., electronic device 101 shown in FIG. 1) is capable of including a normal world (e.g., REE 410 shown in FIG. 4) and a secure processing domain.

The normal world is capable of including one or more of a secure time module 3401 and a payment application 3402, e.g., the payment application 912 shown in FIG. 9. The secure processing domain is capable of including a secure world (e.g., TEE 420). The secure processing domain may refer to an area which is capable of storing data required for security in a safe environment and performing corresponding operations.

The secure world is capable of including applications in the TEE, e.g., a trusted application (TA) 3403, a secure module 3404 (e.g., an embedded secure element (eSE), and a secure storage 916 shown in FIG. 9) and an MST driver module (MST TA) 3406 (e.g., the MST driver module 1827 shown in FIG. 18). The secure module 3404 is capable of including a payment-related program (Applet) 3405.

The secure time module 3401 manages time information which cannot be changed by a user's authority. The secure time module 3401 may be included in the normal world (e.g., REE 410). In various embodiments of the present disclosure, the secure time module 3401 may be implemented in an external device (e.g., a server) of an electronic device, a secure world (e.g., TEE 420) or a normal world (e.g., REE 410). The time information may be periodically synchronized with an external device. The electronic device (e.g., electronic device 101) may be set so that the user cannot change the internal time information.

The secure time module 3401 is capable of transmitting the information related to the current time (e.g., UTC information) to the payment application 3402.

The payment application 3402 is capable of transmitting the information related to the current time (e.g., UTC information) to the secure world.

For example, the electronic device (e.g., electronic device 101) is capable of obtaining the UTC information via the operating system (e.g., Android™ OS). The electronic device (e.g., electronic device 101) is capable of obtaining the UTC information via a network identity and time zone (NITZ), a network time protocol (NTP), or the like. An external server (e.g., a first management server) is capable of obtaining the UTC information. When the external server and the electronic device obtain the UTC information, they synchronize with each other and the time verification code is authenticated. The external server is capable of obtaining a specified time value using the same method (e.g., NITZ or NTP) as the electronic device.

The payment application 3402 is capable of transmitting the information related to the current time (e.g., UTC information) to the TA 3403. The trusted application 3403 is capable of transmitting the information related to the current time (e.g., UTC information) to the secure module 3404.

The secure module 3404 is capable of including at least one or more pieces of payment information (e.g., a token, a key for creating a token cryptogram). The electronic device (e.g., electronic device 101) is capable of including at least one or more communication modules, e.g., a first communication module 1210 and a second communication module 1212 shown in FIG. 12. The secure module 3404 is capable of including verification information corresponding to each of one or more communication modules.

The secure module 3404 is capable of creating track 2 information in a card, by the use of a payment-related program (applet) 3405. The payment-related program 3405 is capable of including an algorithm related to encryption, e.g., a HMAC algorithm.

The payment-related program 3405 is capable of creating one or more of timestamp information and payment information (e.g., track 2 information), based on at least one of information related to the current time (e.g., UTC information) and one or more pieces of payment information (e.g., a token, a key for creating a token cryptogram). The payment information generated using the timestamp information may be generated by using verification information corresponding to the MST module.

The track 2 information refers to payment information used for payment. The payment information may contain one or more of timestamp information, expiry information, a service code, a random number, a verification number, version information, and a sequence number. In various embodiments of the present disclosure, the expiry information contained in the payment information may be information regarding a validity period of a credit card.

Timestamp information may be generated by using at least one of the current time, a provisioning time, a reference time, and a validity period.

Current time may be a time based on the UTC information. Current time may be a time when the payment application 3402 requested a payment. Provisioning time may be a time when a token server or a TSP, e.g., the TSP 730 shown in FIG. 7, transmitted a token to an electronic device during the distribution of tokens. Reference time may be set to a zero value. In various embodiments of the present disclosure, the reference time may be identical to the provisioning time.

The validity period is a preset period of time from when payment is requested and then a token starts to be generated to when the generated token is used validly. The electronic device is capable of receiving information regarding a validity period from the payment server or the issuer. For example, the validity period may be set to 180 seconds.

At least one of the secure module 3404, the trusted application 3403 and the secure world is capable of creating timestamp information, using the validity period, the provisioning time, the current time based on the UTC information.

In various embodiments of the present disclosure, at least one of the secure module 3404, the trusted application 3403 and the secure world is capable of creating timestamp information using the validity period, a reference time, the current time based on the UTC information.

The secure module 3404 is capable of creating a verification code or verification information, using a key for creating a token cryptogram containing one or more of a token, timestamp information, expiry information, a service code, a random number, a verification number, version information, and a sequence number. In various embodiments of the present disclosure, the expiry information contained in the payment information may be information regarding a validity period of a credit card.

The secure module 3404 is capable of creating payment information (e.g., track 2 information) containing one or more of a token, timestamp information, expiry information, a service code, a random number, a verification number, a verification code, and verification information. In various embodiments of the present disclosure, the expiry information contained in the payment information may be information regarding a validity period of a credit card.

In various embodiments of the present disclosure, the secure module 3404 is capable of creating an OTP code encrypting the UTC information through a key for creating a token cryptogram; and payment information, using the OTP code.

The secure module 3404 is capable of creating payment information (e.g., track 2 information) containing one or more of a token, timestamp information, expiry information, a service code, a random number, a verification number and an OPT code. In various embodiments of the present disclosure, the expiry information contained in the payment information may be information regarding a validity period of a credit card.

The generated payment information may be transmitted to the payment application 3402 or an external electronic device, via an MST driver module (MST TA) 3406 (e.g., the MST driver module 1827 shown in FIG. 18).

In various embodiments, of the present disclosure the generated payment information may be transmitted to the payment application 3402 or an external electronic device, via an NFC module (e.g., the NFC module 820 shown in FIG. 8).

Figure 35:
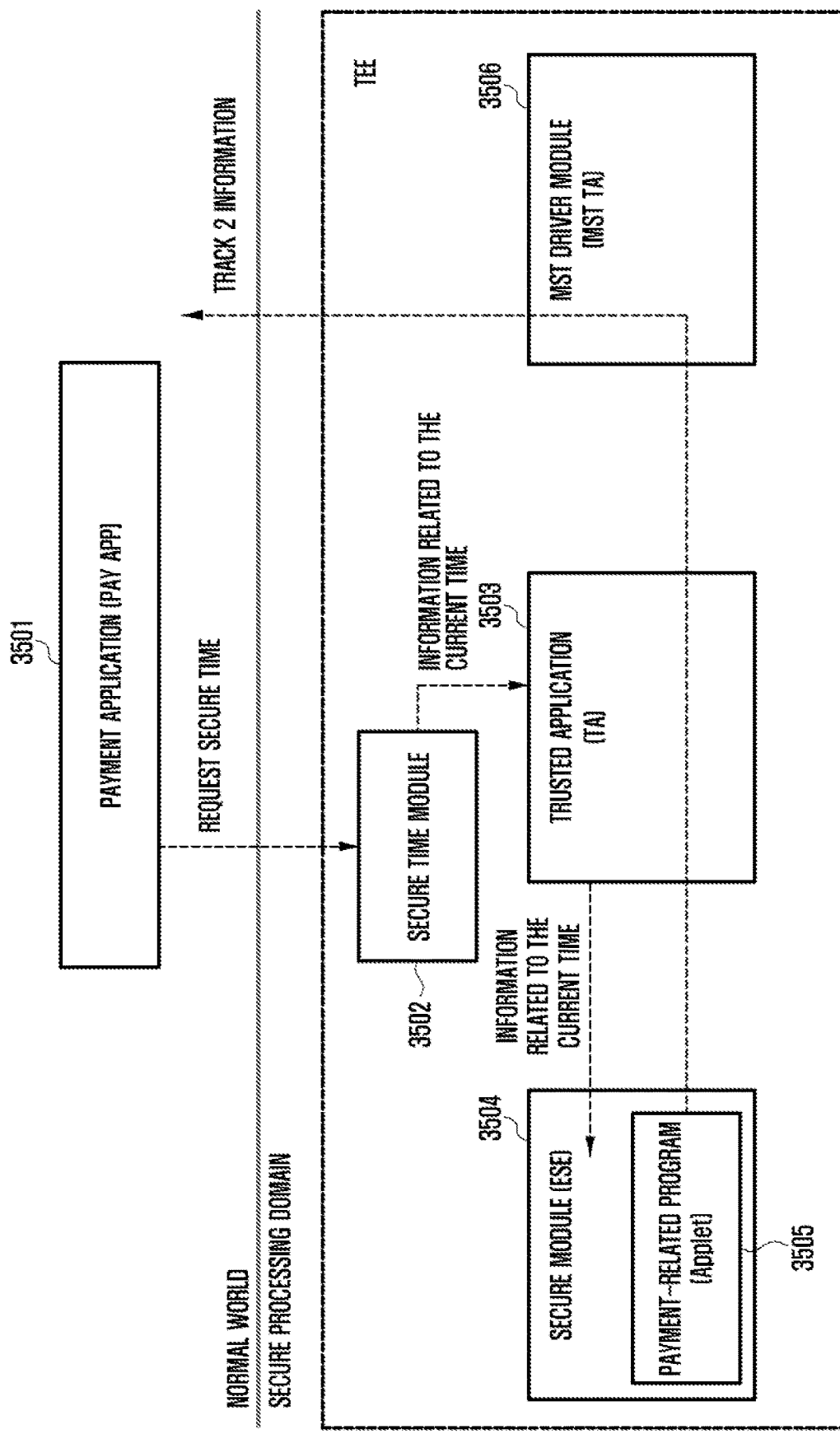
FIG. 35 is a block diagram showing interfaces between components in an electronic device configured to generate payment information according to various embodiments of the present disclosure.

FIG. 35 is a block diagram showing interfaces between components in an electronic device configured to generate payment information according to an embodiment of the present disclosure.

The electronic device (e.g., electronic device 101) is capable of including a normal world (e.g., REE 410) and a secure processing domain.

The normal world is capable of including one or more of a payment application 3501, e.g., the payment application 912 shown in FIG. 9. The secure processing domain is capable of including a secure world (e.g., TEE 420). The secure processing domain may refer to an area which is capable of storing data required for security in a safe environment and performing corresponding operations.

The secure world is capable of including a secure time module 3502 and applications in the TEE, e.g., a TA 3503, a secure module 3504 (e.g., an eSE, and a secure storage 916 shown in FIG. 9) and an MST driver module (MST TA) 3506 (e.g., the MST driver module 1827 shown in FIG. 18). The secure module 3504 is capable of including a payment-related program (Applet) 3505.

The secure time module 3502 manages time information which cannot be changed by a user's authority. The secure time module 3502 may be included in the secure world (e.g., TEE 420). In various embodiments of the present disclosure, the secure time module 3502 may be implemented in an external device (e.g., a server) of an electronic device, a secure world (e.g., TEE 420) or a normal world (e.g., REE 410). The time information may be periodically synchronized with an external device. The electronic device (e.g., electronic device 101) may be set so that the user cannot change the internal time information.

The payment application 3501 is capable of requesting a secure time from the secure time module 3502.

The secure time module 3502 is capable of transmitting the information related to the current time (e.g., UTC information) to the trusted application 3503.

For example, the electronic device (e.g., electronic device 101) is capable of obtaining the UTC information via the operating system (e.g., Android™ OS). The electronic device (e.g., electronic device 101 shown in FIG. 1) is capable of obtaining the UTC information via a network identity and time zone (NITZ), a network time protocol (NTP), or the like. An external server (e.g., a first management server) is capable of obtaining the UTC information. When the external server and the electronic device obtain the UTC information, they synchronize with each other and the time verification code is authenticated. The external server is capable of obtaining a specified time value using the same method (e.g., NITZ or NTP) as the electronic device.

The trusted application 3503 is capable of transmitting the information related to the current time (e.g., UTC information) to the secure module 3504.

The secure module 3504 is capable of including at least one or more pieces of payment information (e.g., a token, a key for creating a token cryptogram). The electronic device (e.g., electronic device 101) is capable of including at least one or more communication modules, e.g., a first communication module 1210 and a second communication module 1212 shown in FIG. 12. The secure module 3504 is capable of including verification information corresponding to each of one or more communication modules.

The secure module 3404 is capable of creating track 2 information in a card, by the use of a payment-related program (applet) 3505. The payment-related program 3505 is capable of including an algorithm related to encryption, e.g., a hash-based message authentication code (HMAC) algorithm.

The payment-related program 3505 is capable of creating one or more of timestamp information and payment information (e.g., track 2 information), based on at least one of information related to the current time (e.g., UTC information) and one or more pieces of payment information (e.g., a token, a key for creating a token cryptogram). The payment information generated using the timestamp information may be generated by using verification information corresponding to the MST module.

The track 2 information refers to payment information used for payment. The payment information may contain one or more of timestamp information, expiry information, a service code, a random number, a verification number, version information, and a sequence number. In various embodiments of the present disclosure, the expiry information contained in the payment information may be information regarding a validity period of a credit card.

Timestamp information may be generated by using at least one of the current time, a provisioning time, a reference time, and a validity period.

Current time may be a time based on the UTC information. Current time may be a time when the payment application 3501 requested a payment. Provisioning time may be a time when a token server or a token service provider (TSP), e.g., the TSP 730 shown in FIG. 7, transmitted a token to an electronic device during the distribution of tokens. Reference time may be set to a zero value. In various embodiments of the present disclosure, the reference time may be identical to the provisioning time.

The validity period is a preset period of time from when payment is requested and then a token starts to be generated to when the generated token is used validly. The electronic device is capable of receiving information regarding a validity period from the payment server or the issuer. For example, the validity period may be set to 180 seconds.

At least one of the secure module 3504, the trusted application 3503 and the secure world is capable of creating timestamp information, using the validity period, the provisioning time, the current time based on the UTC information.

In various embodiments of the present disclosure, at least one of the secure module 3504, the trusted application 3503 and the secure world is capable of creating timestamp information using the validity period, a reference time, the current time based on the UTC information.

The secure module 3504 is capable of creating a verification code or verification information, using a key for creating a token cryptogram containing one or more of a token, timestamp information, expiry information, a service code, a random number, a verification number, version information, and a sequence number.

The secure module 3504 is capable of creating payment information (e.g., track 2 information) containing one or more of a token, timestamp information, expiry information, a service code, a random number, a verification number, a verification code, and verification information.

In various embodiments of the present disclosure, the secure module 3504 is capable of creating: a one-time password (OTP) code encrypting the UTC information through a key for creating a token cryptogram; and payment information, using the OTP code.

The secure module 3504 is capable of creating payment information (e.g., track 2 information) containing one or more of a token, timestamp information, expiry information, a service code, a random number, a verification number and an OPT code. In various embodiments of the present disclosure, the expiry information contained in the payment information may be information regarding a validity period of a credit card.

The generated payment information may be transmitted to the payment application 3501 or an external electronic device, via an MST driver module (MST TA) 3506 (e.g., the MST driver module 1827 shown in FIG. 18).

In various embodiments of the present disclosure, the generated payment information may be transmitted to the payment application 3501 or an external electronic device, via an NFC module (e.g., the NFC module 820 shown in FIG. 8).

In various embodiments of the present disclosure, an electronic device (e.g., electronic device 101) includes a secure module (e.g., secure module 3203) capable of storing at least one token; a first communication module (e.g., NFC module 820); a second communication module (e.g., MST module 810); and at least one processor (e.g., processor 1200) functionally or operatively connecting the secure module 3203 (e.g., an eSE), the first communication module (e.g., NFC module 820) and the second communication module (e.g., MST module 810) to each other. The at least one processor (e.g., processor 1200): determines at least one of the first communication module (e.g., NFC module 820) and the second communication module (e.g., MST module 810) as a communication module to perform a payment; and transmits payment information containing a token related to the at least one communication module, from among the at least one token, to an external electronic device (e.g., a payment server, an issuer, a POS terminal).

In various embodiments of the present disclosure, the processor (e.g., processor 1200) generates the payment information using at least one of a timestamp, card expiry information, a service code, a random number, a verification number, version information and a sequence number.

In various embodiments of the present disclosure, the timestamp is generated based on at least one of a provisioning time, a reference time, and a validity period.

In various embodiments of the present disclosure, the at least one token includes a first token related to the first communication module (e.g., an NFC module 820) and a second token related to the second communication module (e.g., an MST module 810); and the payment information includes the first token and/or the second token.

In various embodiments of the present disclosure, the secure module (e.g., a secure module 3203) is capable of including an embedded secure element (eSE).

In various embodiments of the present disclosure, the first communication module (e.g., an NFC module 820) includes at least one Near Field Communication (NFC) module.

In various embodiments of the present disclosure, the second communication module (e.g., an MST module 810) includes at least one MST communication module.

In various embodiments of the present disclosure, the at least one processor (e.g., processor 1200) generates: a timestamp in at least one of the secure module (e.g., first secure module 1607, secure module 3203) and another secure module (e.g., second secure module 1609, a token trusted application 3302) functionally or operatively connected to the processor (e.g., processor 1200); and the payment information in the other secure module (e.g., second secure module 1609, token trusted application 3302), based on at least one of the token related to one or more communication modules and the timestamp.

In various embodiments of the present disclosure, the at least one processor (e.g., processor 1200) generates a token cryptogram based on at least one of the token and the timestamp.

In various embodiments of the present disclosure, the secure module (e.g., first secure module 1607, secure module 3203) is capable of including a payment-related program (e.g., payment-related program 3204, a payment applet).

In various embodiments of the present disclosure, a method secures payment information in an electronic device (e.g., electronic device 101) that includes a first secure world (e.g., secure module 3203), a second secure world (e.g., token trusted application 3302) and at least one payment signal module (e.g., MST module 810 or NFC module 820). The method includes: storing, in the first secure world (e.g., secure module 3203), at least one token which corresponds to the at least one payment signal module (e.g., MST module 810 or NFC module 820), respectively; creating a timestamp in at least one of the first secure world (e.g., secure module 3203) and the second secure world (e.g., token trusted application 3302); creating a payment signal in the second secure world (e.g., token trusted application 3302), based on at least one of the time stamp and a token corresponding to at least one payment signal module (e.g., MST module 810 or NFC module 820), from among the at least one token; and transmitting the payment signal to an external electronic device (e.g., a payment server, an issuer, a POS terminal).

In various embodiments of the present disclosure, the generation of a payment signal includes a process of creating a token cryptogram based on at least one of the token and the timestamp. The payment signal contains the token and the token cryptogram.

In various embodiments of the present disclosure, the payment signal contains at least one of card expiry information, a service code, a random number, a verification number, version information and a sequence number.

In various embodiments of the present disclosure, the timestamp is generated based on at least one of a provisioning time, a reference time, and a validity period.

In various embodiments of the present disclosure, the first secure world (e.g., a secure module 3203) is capable of including a payment-related program (payment applet).

In various embodiments of the present disclosure, the second secure world (e.g., a token trusted application 3302) is capable of including at least one application related to the at least one payment signal module.

In various embodiments of the present disclosure, the payment signal is generated via at least one application.

In various embodiments, of the present disclosure the at least one payment signal module (e.g., an MST module 810 or an NFC module 820) is capable of including at least one MST communication module and at least one NFC module.

In various embodiments of the present disclosure, the first secure world (e.g., TEE) includes a first secure module (e.g., an eSE, a payment-related program). The second secure world (e.g., TEE) includes a second secure module. The at least one token is stored in the first secure module (e.g., an eSE, a payment-related program). The payment signal is generated in the second secure module (e.g., an eSE, a payment-related program).

Figure 36:
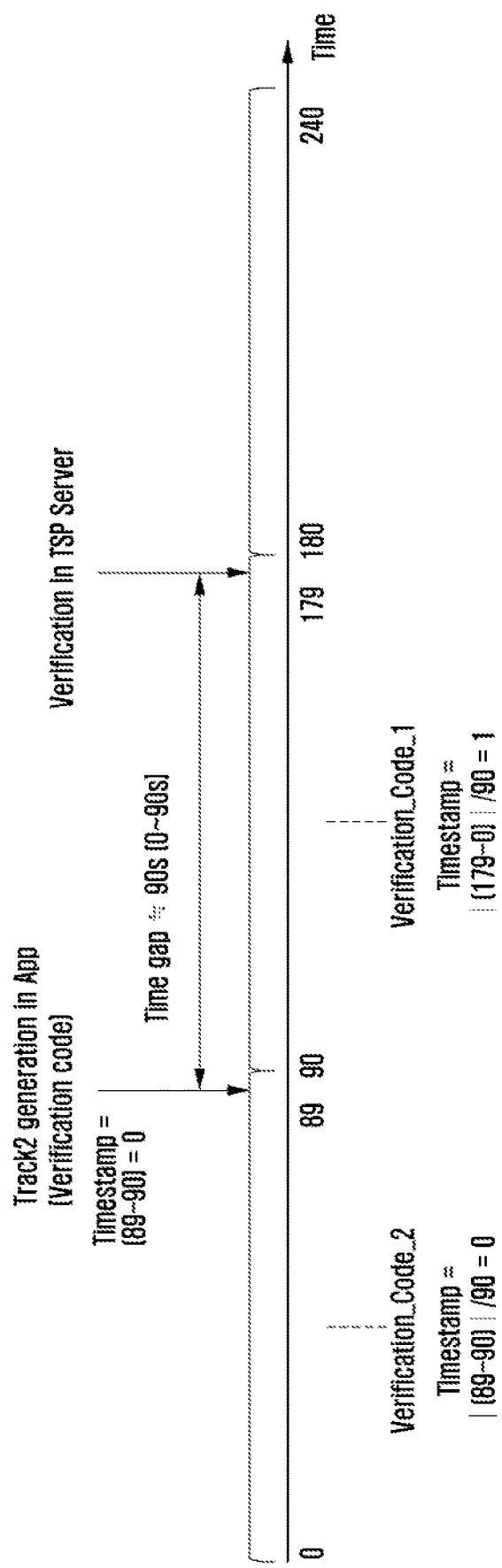
FIG. 36 is a diagram that describes a validity time of payment information according to various embodiments of the present disclosure.

FIG. 36 is a diagram that describes a validity time of payment information according to various embodiments of the present disclosure.

Referring to FIGS. 32 to 35, the payment information includes at least one of a token, timestamp information, expiry information, a service code, a random number, a verification number, a verification code and verification information. In various embodiments of the present disclosure, the expiry information included in the payment information may be information regarding a validity period of a credit card.

The validity period refers to a preset period of time from when payment is requested. The electronic device is capable of receiving information regarding a validity period from a payment server or an issuer. For example, the validity period may be set to 180 seconds.

When payment information containing timestamp information is transmitted to an issuer within a validity period, the payment is completed. On the other hand, when payment information containing timestamp information is not transmitted to an issuer within a validity period, the payment is not performed.

In various embodiments of the present disclosure, timestamp information may be generated by the following equation, Equation 3.

$$\text{timestamp information} = (\text{current time} - \text{time window}) / \text{time window} \quad \text{Equation 3}$$

In Equation 3, when the time window value is 90 seconds as shown in FIG. 36 and a time frame creating verification_code_2 is 0-89 seconds, timestamp information may be zero. The token service provider (TSP) server calculates a delay and determines 0~179 seconds as a validity period.

Figure 37:
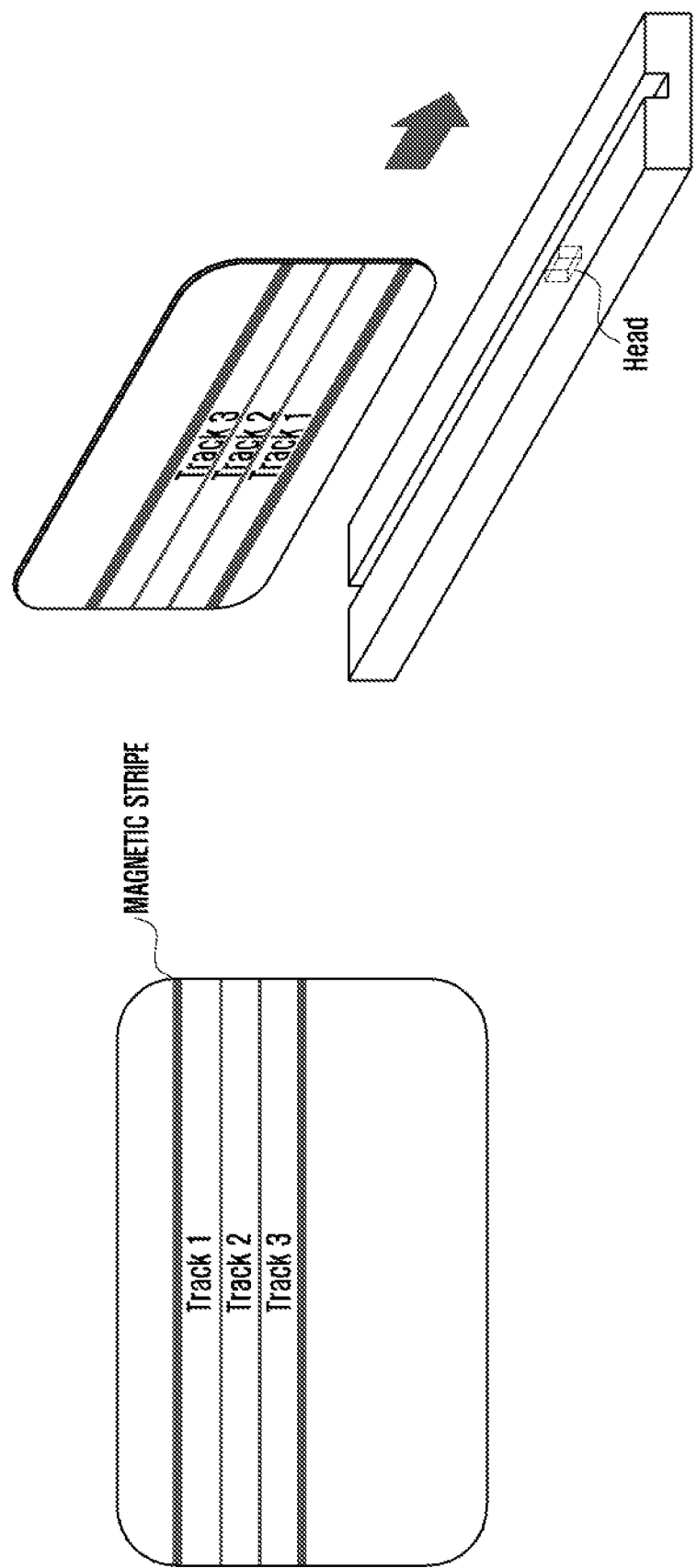

FIGS. 37 to 39 show an example of the structure of a payment means (e.g., a card) according to various embodiments of the present disclosure.

Referring to FIG. 37, when a card is swiped through a reader (e.g., a POS), the magnetic stripe of the card containing corresponding information induces current signal in the coil around an iron core of the reader. The reader detects the induced magnetic field signal related to the card information and processes the card information.

In various embodiments of the present disclosure, a magnetic stripe of a card includes at least one or more tracks. A magnetic stripe contains information in Track 1, Track 2, and Track 3. Payment may be performed by the use of information recorded in Track 2.

In various embodiments of the present disclosure, a card may include information in at least one or more tracks.

Referring to FIG. 38, Track 1 contains bank account information and has a data storage capacity, e.g., 79 KB. Track 2 contains information such as a credit card number, a card issue date, a validity period, etc., and has a data storage capacity, e.g., 40 KB. Track 3 contains information such as an affiliated concern, etc. For example, information used for payment may be Track 2 information.

Referring to FIG. 39, Track 2 may contain information in the following format.

Start sentinel (SS)—one character, e.g., ';'
Primary Account Number (PAN)—up to 19 characters. Usually, but not always, matches the credit card number printed on the front of the card.
Field Separator (FS)—one character, e.g., '='
Expiration date—four characters in the form YYMM
Service code—three characters: The first digit specifies the interchange rules; the second specifies authorization processing; and the third specifies the range of services.
Discretionary data—it is identical to Track 1
End sentinel (ES)—one character, e.g., '?'
Longitudinal redundancy check (LRC)—it is one character and a validity character calculated from other data on the track. Most reader devices do not return this value when the card is swiped to the presentation layer, and use it only to verify the input internally to the reader.

Service code values common in financial cards as follows:
First Digit
1: International interchange OK
2: International interchange, use IC chip where feasible
5: National interchange only except under bilateral agreement
6: National interchange only except under bilateral agreement, use IC chip where feasible
7: No interchange except under bilateral agreement (closed loop)
9: Test
Second Digit
0: Normal
2: Contact issuer via online means
4: Contact issuer via online means except under bilateral agreement
Third Digit
0: No restrictions, PIN required
1: No restrictions
2: Goods and services only (no cash)
3: ATM only, PIN required
4: Cash only
5: Goods and services only (no cash), PIN required
6: No restrictions, use PIN where feasible
7: Goods and services only (no cash), use PIN where feasible FIG. 40 is a diagram showing the structure of payment information according to an embodiment of the present disclosure.

Figure 40:
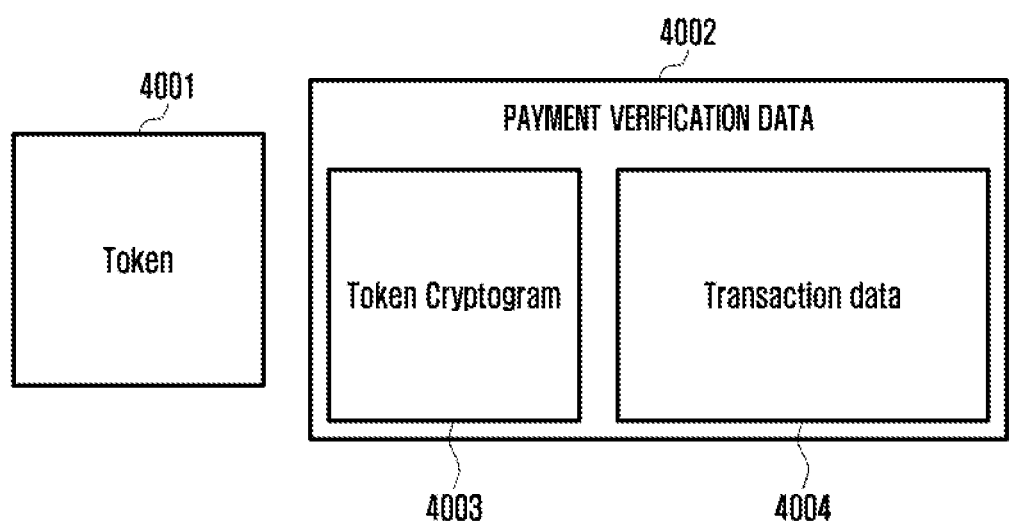
FIG. 40 is a diagram showing the structure of payment information according to various embodiments of the present disclosure.

Referring to FIG. 40, payment information may contain a token 4001 and payment verification data 4002. The token 4001 may contain a digital PAN (a card number which replaces a real card number and is used virtually by an electronic device).

The payment verification data 4002 may contain a token cryptogram (cryptogram) 4003 and a transaction data 4004.

The payment verification data 4002 may be required for an external device of an electronic device to check whether a corresponding payment transaction is valid. The token cryptogram 4003 may also be used in the same sense of cryptogram information, cryptograph, a cryptogram, encryption, and an encrypting method.

Figure 41:
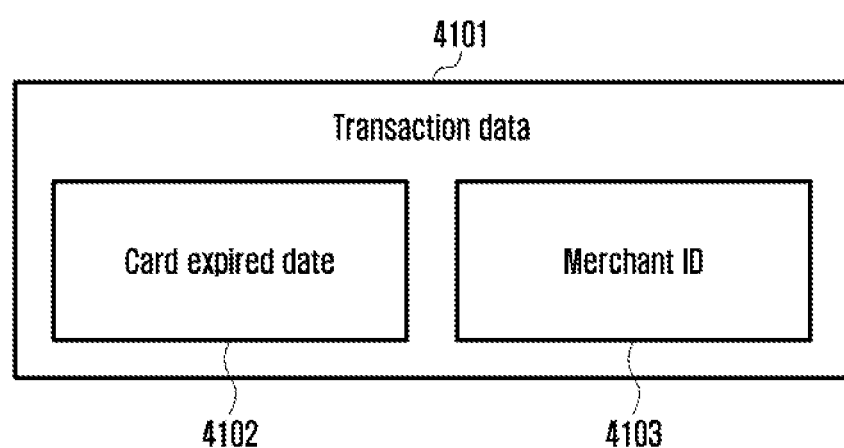
FIG. 41 is a diagram showing the structure of transaction data according to various embodiments of the present disclosure.

FIG. 41 is a diagram showing the structure of transaction data according to an embodiment of the present disclosure.

The transaction data 4101 may contain card expired date 4102 and store information 4103, e.g., a merchant ID. The electronic device may obtain the merchant ID 4103 from an external device using the communication module (e.g., 3G, 4G, Wi-Fi, NFC, etc.).

Figure 42:
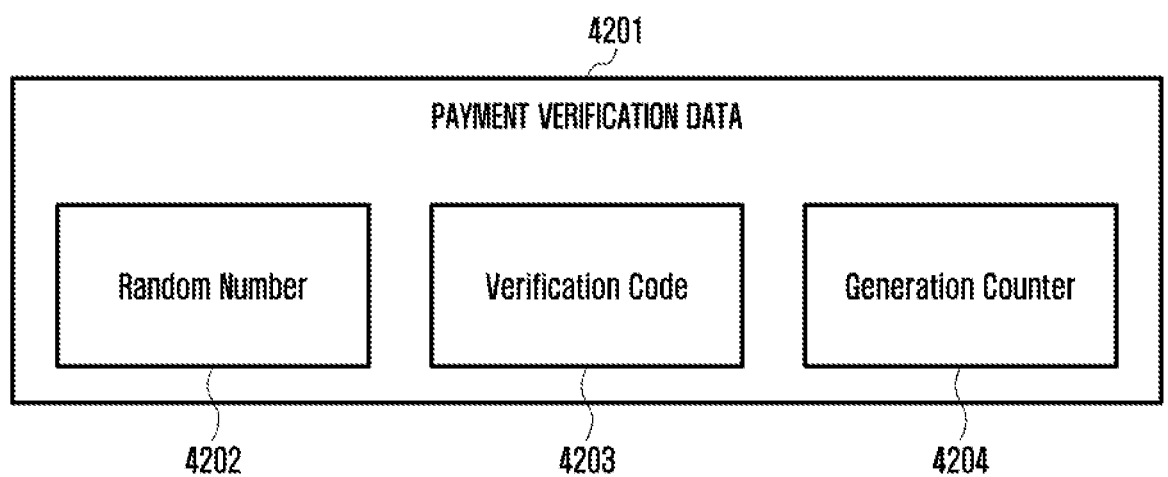
FIG. 42 is a diagram showing the structure of payment verification data according to various embodiments of the present disclosure.

FIG. 42 is a diagram showing the structure of payment verification data according to an embodiment of the present disclosure;

Referring to FIG. 42, the payment verification data 4201 is capable of containing one or more of a random number 4202, a verification code 4203 and a generation counter 4204.

In an embodiment of the present disclosure, an OTP number may be an example of a token cryptogram.

Figure 43:
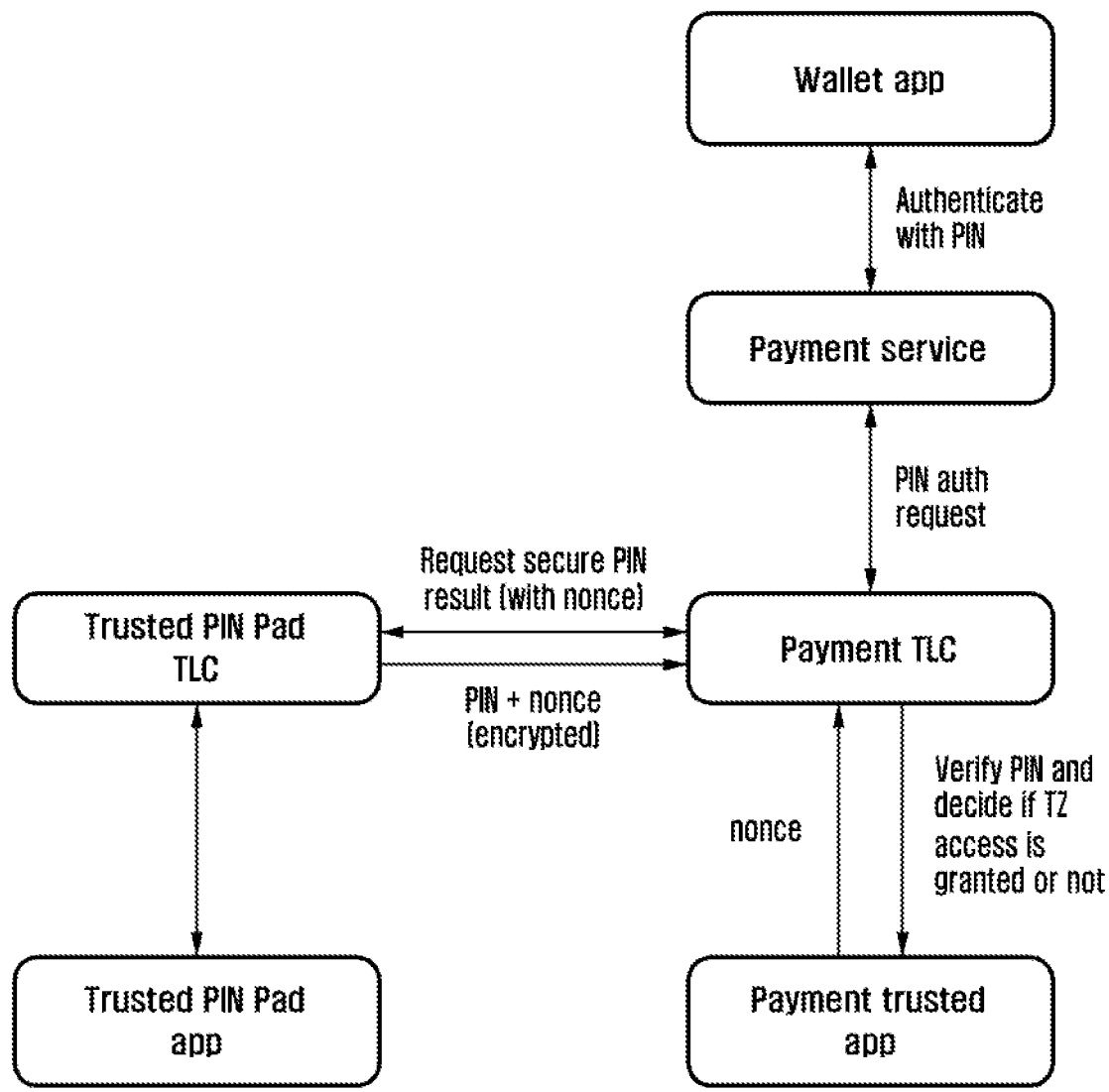
FIG. 43 is a diagram showing a function for a payment relay module to relay a verification request to a secure identifier processing module of a TEE, by inputting a personal identification number (PIN) of a payment application, according to various embodiments of the present disclosure.

FIG. 43 is a diagram showing a function for a payment relay module to relay a verification request to a secure identifier processing module of a TEE, by inputting a personal identification number (PIN) of a payment application, according to an embodiment of the present disclosure.

Referring to FIG. 43, the payment relay module is capable of including: a function for receiving a one-time random number (e.g., nonce) from a payment module of the TEE via a secure environment relay module; a function for requesting a PIN result from a secure identifier processing module via a secure environment relay module and discovering the requested PIN and an encrypted PIN result; and a function for requesting the payment module to verify the encrypted PIN result.

Figure 44:
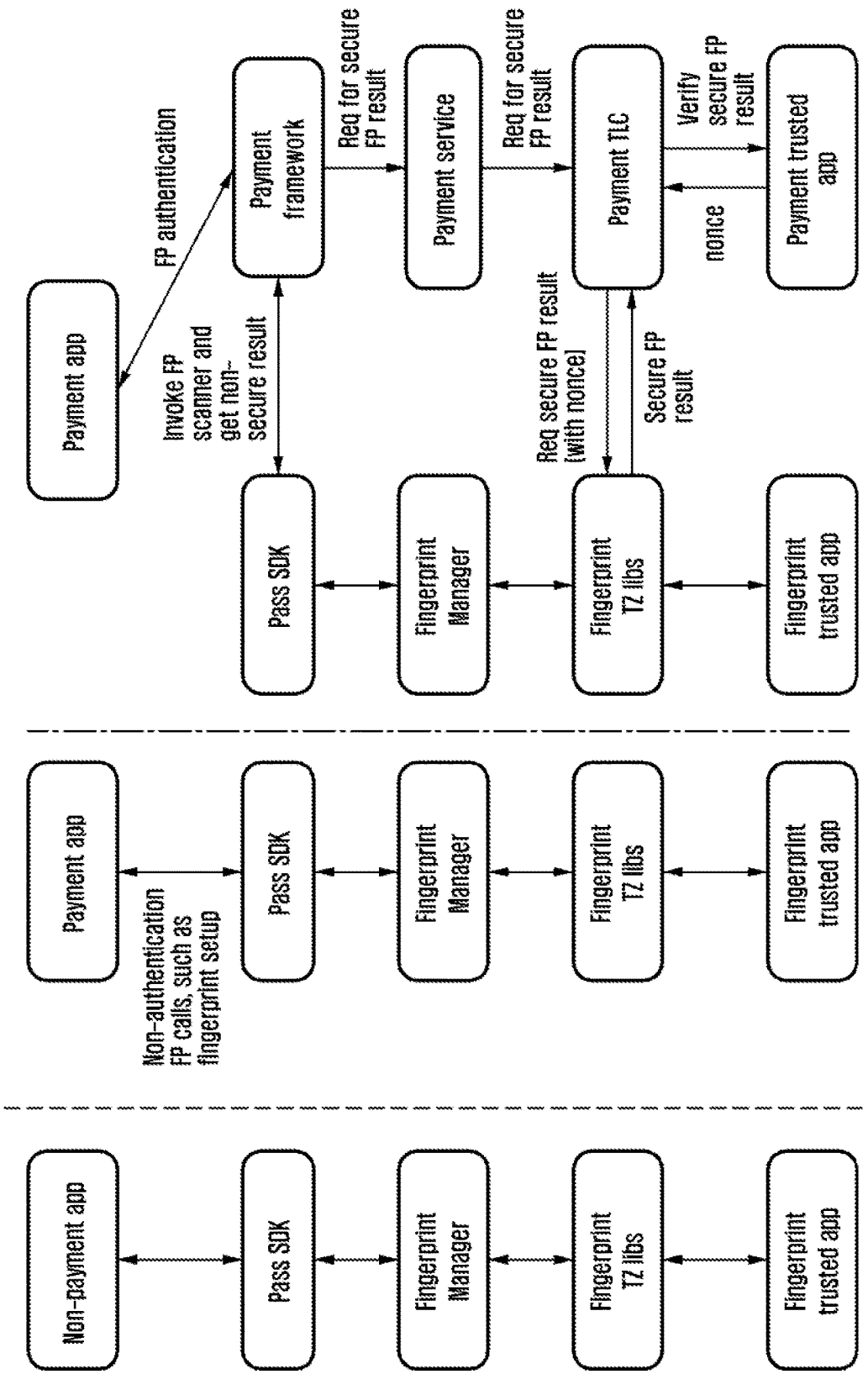
FIGS. 44 and 45 are flowcharts that describe a method for a payment relay module to perform a payment based on a verification result performed using biometric information, according to various embodiments of the present disclosure.
Figure 45:
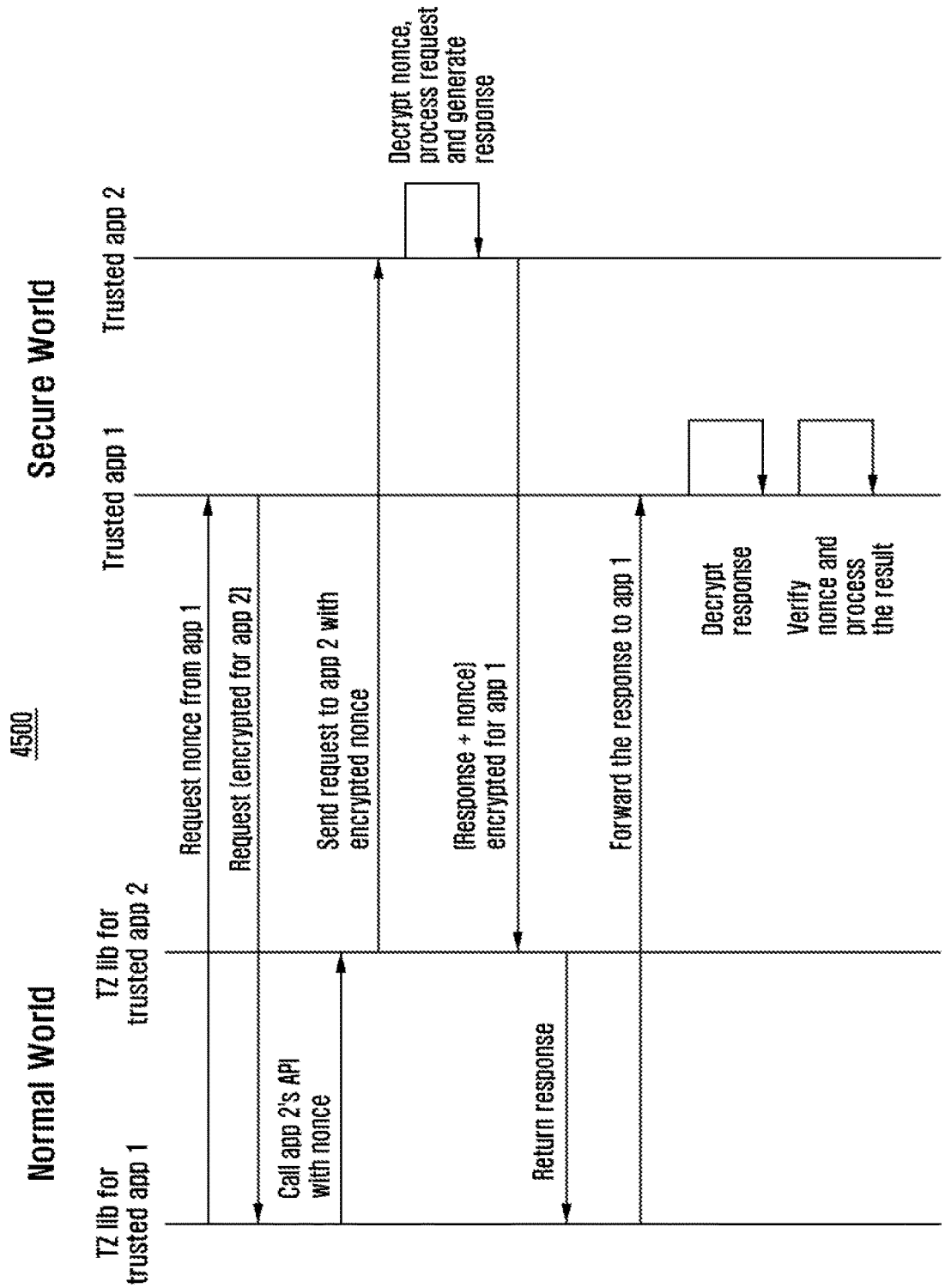

FIGS. 44 and 45 are flowcharts that describe a method 4400 (shown in FIG. 44) and a method 4500 (shown in FIG. 45) for a payment relay module 1841 (shown in FIG. 18) to perform a payment based on a verification result performed using biometric information, according to various embodiments of the present disclosure.

In an embodiment of the present disclosure, the payment relay module is capable of requesting one-time random number (e.g., nonce) from the payment module 1821 (shown in FIG. 18) of the TEE via the secure environment relay module 1846 and the secure environment driver module 1853 (shown in FIG. 18).

In an embodiment of the present disclosure, with reference to FIGS. 18 and 44, the payment module is capable of creating a one-time random number and encrypting the generated one-time random number by using a key of the TEE, e.g., a device root key (DRK). The payment module is capable of transmitting the encrypted one-time random number to the secure environment relay module 1846 via the secure environment driver module 1853. The transmission/transfer of data between modules or applications executed in the same device may include a state allowing access to data stored in a memory.

In an embodiment of the present disclosure, the secure environment relay module 1846 is capable of transmitting the encrypted one-time random number to the biometric information module 1825 via the secure environment driver module. The biometric information module 1825 is capable of decrypting the encrypted one-time random number using the key. The biometric information module is capable of authenticating a user using information obtained from a biometric sensor. The biometric information module is capable of encrypting a user authentication result along with the one-time random number, using the key. The biometric information module is capable of transmitting the encrypted, authentication result and the encrypted, one-time random number to the secure environment relay module via the secure environment driver module. The secure environment relay module is capable of transmitting the encrypted, authentication result and the encrypted, one-time random number to the payment module via the secure environment driver module.

In an embodiment of the present disclosure, the payment module is capable of decrypting the encrypted, authentication result and the encrypted, one-time random number, using the key. The payment module is capable of comparing whether the received one-time random number and the generated one-time random number are identical to each other and identifying whether the authentication result is changed in the REE, based on the comparison result. The comparison may be performed by determining whether the transmitted one-time random number and the received one-time random number are completely identical to each other. Alternatively, the comparison may be performed in such a way that, when the transmitted one-time random number and the received one-time random number are not identical to each other but one-time random number is generated based on the transmitted one-time random number, the generated one-time random number is considered to be identical to the transmitted one-time random number. When the two one-time random numbers are identical to each other and the authentication has been successful, the payment module may perform a payment. When the one-time random numbers are not identical to each other or the authentication failed, the payment module does not perform a payment.

In an embodiment of the present disclosure, the comparison may be performed in an agent (e.g., a payment manager or a kernel) or another application executed in the TEE or REE.

Figure 46:
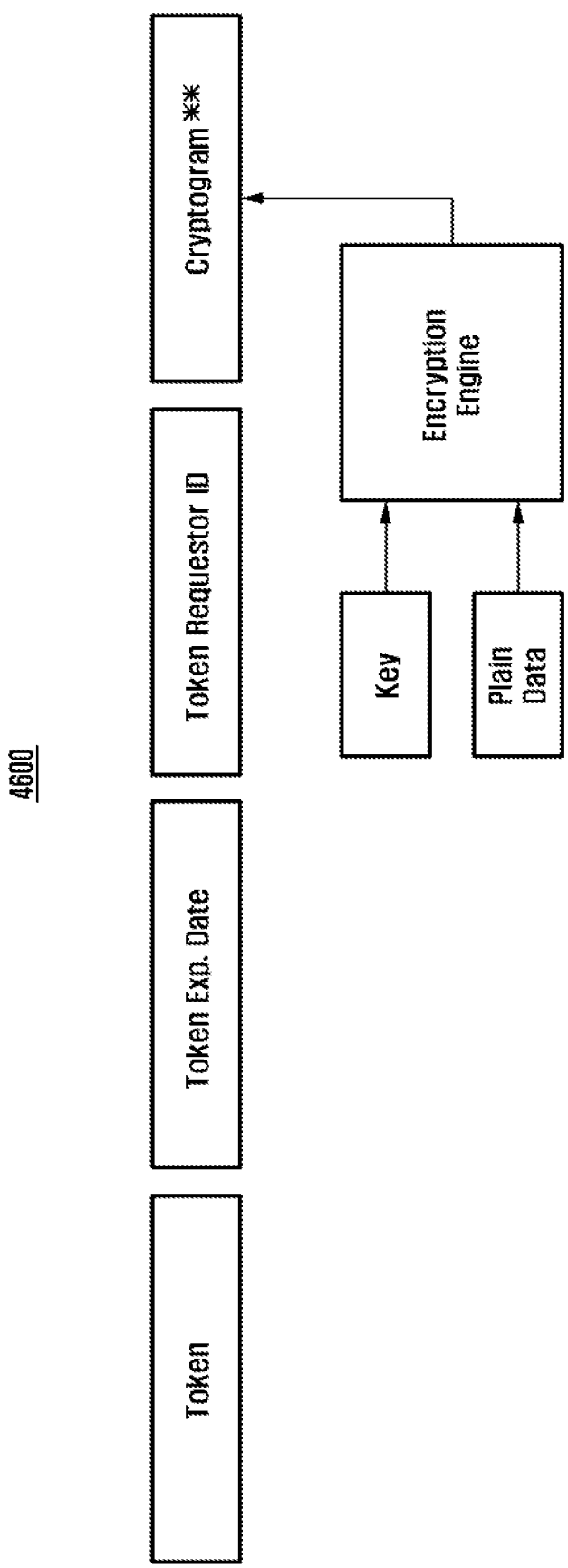
FIG. 46 is a diagram that describes a method of creating a token cryptogram according to various embodiments of the present disclosure.

FIG. 46 is a diagram that describes a method 4600 of creating a token cryptogram according to an embodiment of the present disclosure.

In an embodiment of the present disclosure, the payment module is capable of creating a token cryptogram using a key capable of creating the token cryptogram. The payment module is capable of using other keys according to preset rules, such as every transaction, a specified number of transactions, a transaction within a preset period of time, etc. The token service provider 730 (shown in FIG. 7) is capable of owning a key pairing with the key. The token service provider 730 is capable of decrypting the encrypted token cryptogram by the pair of keys.

When the payment module generates a token cryptogram using the key, the encryption engine and data encrypted via the key may vary according to an encryption method (e.g., AES, TKIP, etc.).

Figure 47:
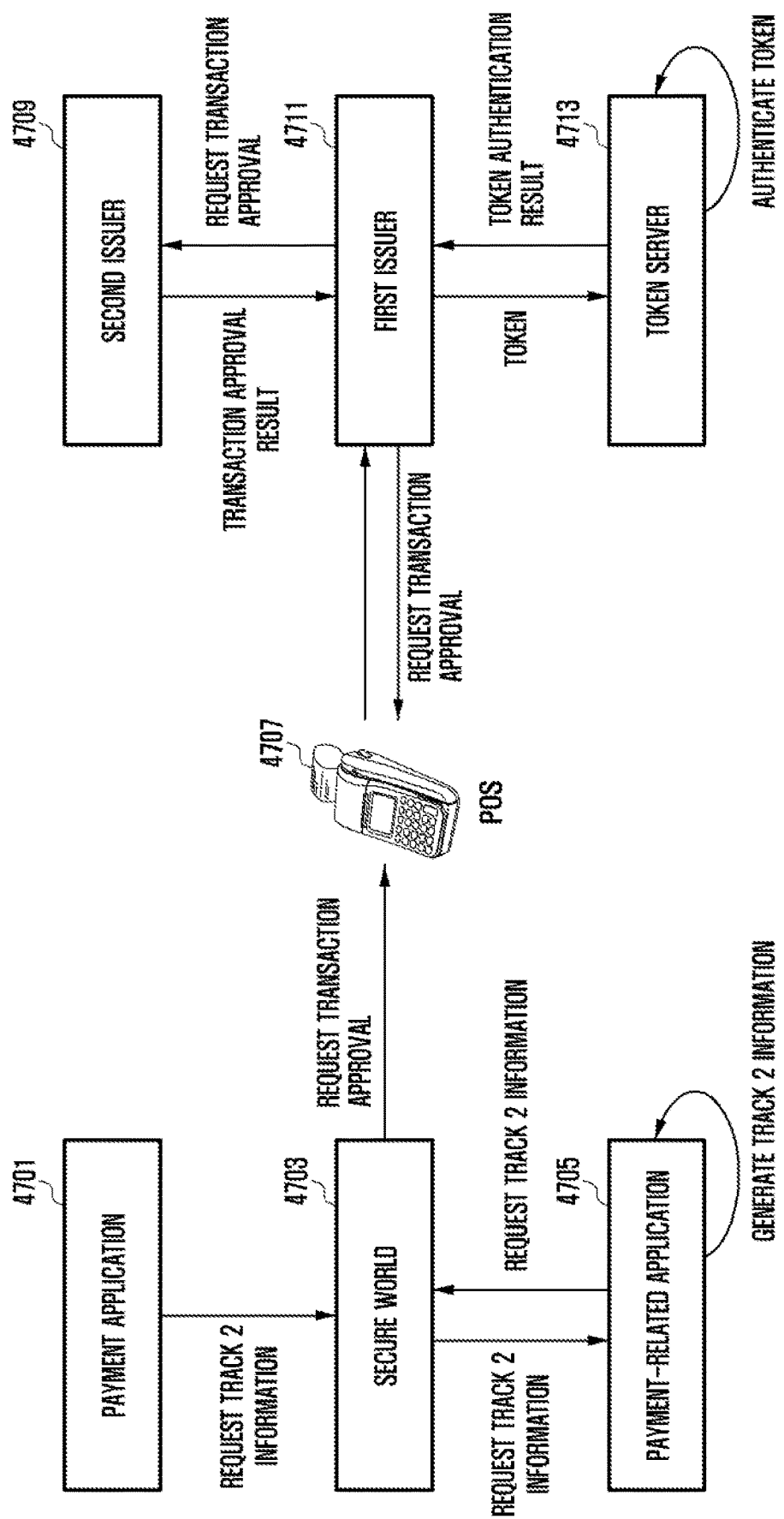
FIG. 47 is a diagram that describes a method of performing a payment using payment information generated based on timestamp information according to various embodiments of the present disclosure.

FIG. 47 is a diagram that describes a method of performing a payment using payment information generated based on timestamp information according to an embodiment of the present disclosure.

Referring to FIG. 47, the payment application 4701 (e.g., the payment application 3201 shown in FIG. 32) is capable of requesting the secure world 4703 to generate payment information (e.g., track 2 information).

When receiving a request to generate payment information (e.g., track 2 information) from the payment application 4701 through the secure world 4703, the payment-related program 4705 (e.g., the payment-related program 3204 shown in FIG. 32) is capable of creating payment information (e.g., track 2 information) using timestamp information.

When the payment information (e.g., track 2 information) is generated, the payment-related program 4705 is capable of transmitting the generated payment information (e.g., track 2 information) to the secure world 4703.

The secure world 4703 is capable of request the transaction approval from the POS 4707, using the generated payment information (e.g., track 2 information), via an MST driver module 3205 shown in FIG. 32.

When receiving the transaction approval request from the secure world 4703, the POS 4707 is capable of forwarding the generated payment information (e.g., track 2 information) and the transaction approval request to the first issuer 4711.

The first issuer 4711 (e.g., the first issuer 932 shown in FIG. 9) is capable of transmitting a token contained in the generated payment information (e.g., track 2 information) to the token server 4713 or the token service provider (TSP).

The token server 4713 or the TSP is capable of authenticating a token received from the first issuer 4711 and transmitting the token authentication result to the first issuer 4711.

The token server 4713 or the TSP is capable of: comparing timestamp information, expiry information, a service code, a random number, a verification number, version information or a sequence number, contained in the payment information, with a provisioning time, a reference time, or a validity period, stored in the token server 4713 or the TSP; and determining the validity of a token. In various embodiments of the present disclosure, the expiry information contained in the payment information may be information regarding a validity period of a credit card.

The first issuer 4711 is capable of receiving the token authentication result from the token server 4713 or the TSP. The first issuer 4711 is capable of transmitting the token authentication result to the second issuer 4709 (e.g., the second issuer 942 shown in FIG. 9) and/or requesting the transaction approval therefrom.

The second issuer 4709 is capable of determining whether it approves of the transaction, according to the token authentication result and the transaction approval request. When the second issuer 4709 ascertains that a token is valid, based on the token authentication result, it is capable of transmitting the transaction authentication result to the first issuer 4711.

The first issuer 4711 is capable of transmitting the transaction authentication result to the POS 4707.

Figure 48:
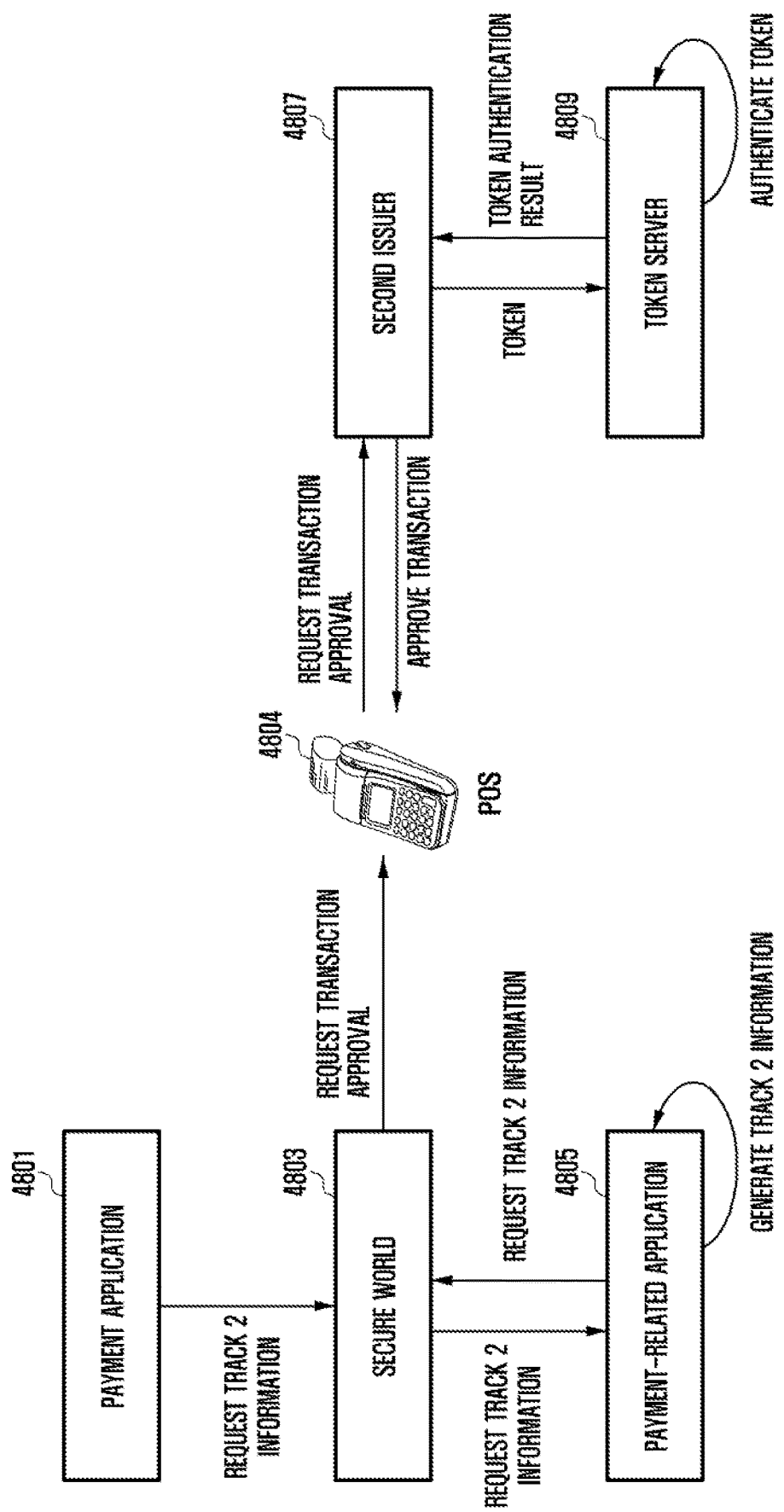
FIG. 48 is a diagram that describes a method of performing a payment using payment information generated based on timestamp information according to various embodiments of the present disclosure.

FIG. 48 is a diagram that describes a method of performing a payment using payment information generated based on timestamp information according to various embodiments of the present disclosure.

Referring to FIG. 48, the payment application 4801 (e.g., the payment application 3201 shown in FIG. 32) is capable of requesting the secure world 4803 to generate payment information (e.g., track 2 information).

When receiving a request to generate payment information (e.g., track 2 information) from the payment application 4801 through the secure world 4803, the payment-related program 4805 (e.g., the payment-related program 3204 shown in FIG. 32) is capable of creating payment information (e.g., track 2 information) using timestamp information.

When the payment information (e.g., track 2 information) is generated, the payment-related program 4805 is capable of transmitting the generated payment information (e.g., track 2 information) to the secure world 4803.

The secure world 4803 is capable of request the transaction approval from the POS 4804, using the generated payment information (e.g., track 2 information), via an MST driver module 3205 shown in FIG. 32.

When receiving the transaction approval request from the secure world 4803, the POS 4804 is capable of forwarding the generated payment information (e.g., track 2 information) and the transaction approval request to the second issuer 4807 (e.g., the second issuer 942 shown in FIG. 9).

The second issuer 4807 is capable of transmitting a token contained in the generated payment information (e.g., track 2 information) to the token server 4809 or the TSP.

The token server 4809 or the TSP is capable of authenticating a token received from the second issuer 4807 and transmitting the token authentication result to the second issuer 4807.

The token server 4809 or the TSP is capable of: comparing timestamp information, expiry information, a service code, a random number, a verification number, version information or a sequence number, contained in the payment information, with a provisioning time, a reference time, or a validity period, stored in the token server 4809 or the TSP; and determining the validity of a token. In various embodiments of the present disclosure, the expiry information contained in the payment information may be information regarding a validity period of a credit card.

The second issuer 4807 is capable of transmitting the transaction authentication result to the POS 4804.

Figure 49:
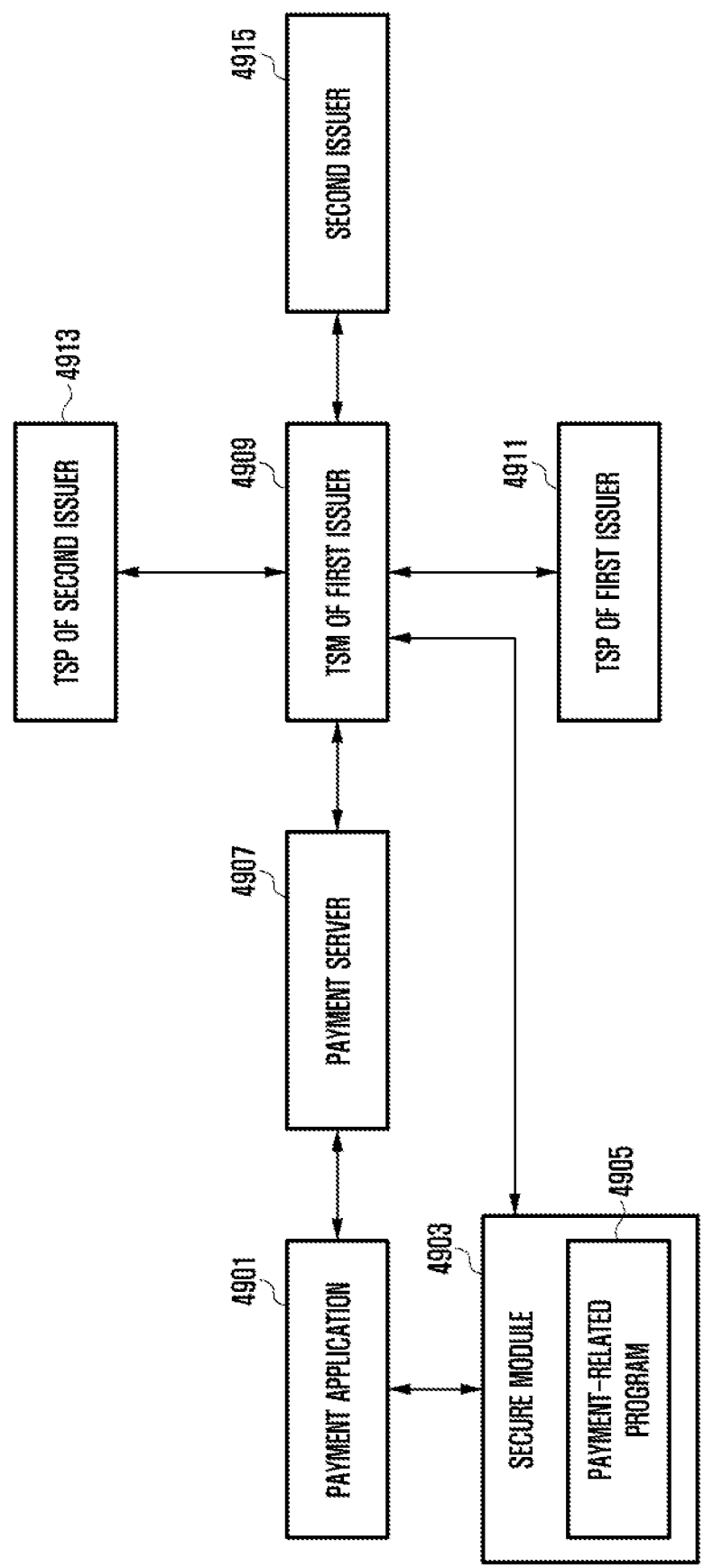
FIG. 49 is a diagram that describes a method of performing a payment transaction using a token according to various embodiments of the present disclosure.

FIG. 49 is a diagram that describes a method of performing a payment transaction using a token according to various embodiments of the present disclosure.

Referring to FIG. 49, when a payment transaction starts, the payment application 4901 (e.g., the payment application 3201 shown in FIG. 32) is capable of transmitting timestamp information to the secure module 4903 (e.g., the secure module 3203 shown in FIG. 32) via the trusted application (TA).

The secure module 4903 is capable of including a payment-related program 4905 (e.g., the payment-related program 3204 shown in FIG. 32). The payment-related program 4905 is capable of creating payment information (e.g., track 2 information), based on at least one of timestamp information and one or pieces of payment information (e.g., a token, a key for creating a token cryptogram).

The secure module 4903 is capable of transmitting/receiving information related to payment (e.g., payment information) to/from the TSM 4909 of the first issuer (e.g., the first issuer 932 shown in FIG. 9).

The payment server 4907 (e.g., the payment server 920 shown in FIG. 9) is capable of transmitting/receiving information related to payment (e.g., payment information) to/from the payment application 4901.

The TSM 4909 of the first issuer is capable of transmitting/receiving information related to payment to/from the TSP 4911 of the first issuer, the second issuer 4915 (e.g., the second issuer 942 shown in FIG. 9), and the TSP 4913 of the second issuer, and approving of the payment.

The term "module" as used in the present disclosure may mean a unit including one of hardware, software, and firmware or any combination of two or more of them. The "module" may be interchangeable with the term "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing certain operations, which are now known or will be developed in the future. At least part of the method (e.g., operations) or devices (e.g., modules or functions) according to various embodiments can be implemented with instructions as program modules that are stored in computer-readable storage media (e.g., a memory 130). One or more processors (e.g., a processor 120 shown in FIG. 1) can execute instructions, thereby performing the functions. Examples of the computer-readable storage media include: hard disks, floppy disks, magnetic media (e.g., magnetic tape), optical media (e.g., CD-ROM, DVD), magneto-optical media (e.g., floptical disks), built-in memory, etc.

In various embodiments of the present disclosure, the computer-readable recording medium stores a software program. The software program executes, in an electronic device (e.g., an electronic device 101) that includes a secure world (e.g., TEE) and at least one payment signal module (e.g., an MST module 810 or an NFC module 820 shown in FIG. 8), the following: storing, in the secure world, at least one token corresponding to at least one payment signal module respectively; creating a timestamp in the secure world; creating a payment signal in the secure world, based on at least part of the time stamp and a token corresponding to at least one payment signal module, from among the at least one token; and transmitting the payment signal to an external electronic device (e.g., a payment sever, an issuer, POS terminal, etc.).

Instructions or commands include codes generated by a compiler or codes executed by an interpreter. In various embodiments of the present disclosure, modules or program modules include at least one or more of the modules, remove part of the modules, or include new modules in the modules. In various embodiments, the operations performed by modules, program modules, or the other modules, are executed in serial, parallel, repetitive or heuristic fashion. Part of the operations can be executed in any other order, skipped, or executed with additional operations.

Various embodiments of the present disclosure are capable of providing mobile payment services, based on various communication modes. Various embodiments are also capable of providing a safer wireless payment environment, using a secure world with a relatively high level of security.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a secure storage configured to store at least one token;
   a first communication module;
   a second communication module; and
   at least one processor connecting the secure storage and the first and second communication modules to each other,
   wherein the at least one processor is configured to control to:
      transmit payment information containing a token from among a plurality of tokens to an external electronic device using the at least one of the first or second communication modules,
      determine when a response has been received within a preset period of time from the external electronic device, and
      when no response has been received, transmit further payment information containing a token from among the plurality of tokens to the external electronic device using another of the first or second communication modules.

2. The electronic device of claim 1, wherein the at least one processor is further configured to control to:
   generate the payment information using at least one of a timestamp, card expiry information, a service code, a random number, a verification number, version information or a sequence number.

3. The electronic device of claim 2, wherein the timestamp is generated based on at least one of a provisioning time, a reference time, or a validity period.

4. The electronic device of claim 1,
   wherein the at least one token comprises first and second tokens which are related to the first and second communication modules, respectively, and
   wherein the payment information comprises at least one of the first token or the second token.

5. The electronic device of claim 1, wherein the secure storage comprises at least one of a secure element and a secure world.

6. The electronic device of claim 1, wherein the first communication module comprises at least one near field communication (NFC) module.

7. The electronic device of claim 1, wherein the second communication module comprises at least one magnetic stripe data transmission (MST) communication module.

8. The electronic device of claim 1, wherein the at least one processor is further configured to control to generate at least one of:
   a timestamp in at least one of the secure storage or another secure storage connected to the at least one processor; or
   the payment information in the other secure storage, based on the token related to at least one of the first or second communication modules and the timestamp.

9. The electronic device of claim 8, wherein the at least one processor is further configured to control to generate a token cryptogram based on at least one of the token or the timestamp.

10. The electronic device of claim 1, wherein the secure storage comprises a payment applet.

11. A method of securing payment information in an electronic device that includes secure storage storing at least one token, a first communication module, a second communication module, and at least one processor connecting the secure storage and the first and second communication modules to each other, the method comprising:
   transmitting the payment signal to an external electronic device transmitting payment information containing a token from among a plurality of tokens to an external electronic device using the at least one of the first or second communication modules;
   determining when a response has been received within a preset period of time from the external electronic device; and
   when no response has been received, transmitting further payment information containing a token from among the plurality of tokens to the external electronic device using another of the first or second communication modules.

12. The method of claim 11, further comprising:
   generating a token cryptogram based on at least one of the token and a timestamp.

13. The method of claim 11, further comprising:
   generating the payment information using at least one of a timestamp, card expiry information, a service code, a random number, a verification number, version information or a sequence number.

14. The method of claim 11, wherein the timestamp is generated based on at least one of a provisioning time, a reference time, or a validity period.

15. The method of claim 11, wherein the secure storage comprises at least one of a secure element and a secure world.

16. The method of claim 11, further comprising:
generating at least one of:
- a timestamp in at least one of the secure storage or another secure storage connected to the at least one processor, or
- the payment information in the other secure storage, based on the token related to at least one of the first or second communication modules and the timestamp.

17. The method of claim 11,
wherein the at least one token comprises first and second tokens which are related to the first and second communication modules, respectively, and
wherein the payment information comprises at least one of the first token or the second token.

18. The method of claim 11, wherein the first communication module comprises at least one near field communication (NFC) module.

19. The method of claim 11, wherein the second communication module comprises at least one magnetic stripe data transmission (MST) communication module.

20. A non-transitory computer-readable recording medium storing a software program that, when executed, causes at least one processor in an electronic device that includes a secure storage storing at least one token, a first communication module and a second communication module, to perform a method, the method comprising:

transmitting payment information containing a token from among a plurality of tokens to an external electronic device using the at least one of the first or second communication modules;

determining when a response has been received within a preset period of time from the external electronic device; and when no response has been received, transmitting further payment information containing a token from among the plurality of tokens to the external electronic device using another of the first or second communication modules.

* * * * *